(12) United States Patent
Kiyono et al.

(10) Patent No.: US 7,436,633 B2
(45) Date of Patent: Oct. 14, 2008

(54) THIN-FILM MAGNETIC HEAD, HEAD GIMBAL ASSEMBLY AND HARD DISK SYSTEM

(75) Inventors: Hiroshi Kiyono, Tokyo (JP); Tetsuya Kuwashima, Tokyo (JP); Takeo Kagami, Tokyo (JP); Noriaki Kasahara, Tokyo (JP); Naoki Ohta, Tokyo (JP); Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 329 days.

(21) Appl. No.: 11/205,072

(22) Filed: Aug. 17, 2005

(65) Prior Publication Data

US 2006/0082929 A1 Apr. 20, 2006

(30) Foreign Application Priority Data

Oct. 15, 2004 (JP) ............................. 2004-301548
Nov. 8, 2004 (JP) ............................. 2004-323197
May 18, 2005 (JP) ............................. 2005-145964

(51) Int. Cl.
*G11B 5/245* (2006.01)

(52) U.S. Cl. ...................................... 360/317

(58) Field of Classification Search ................ 360/317, 360/318, 319, 323, 67
See application file for complete search history.

(56) References Cited

U.S. PATENT DOCUMENTS

| 5,452,148 | A | * | 9/1995 | Kawai et al. ................... 360/67 |
| 5,978,181 | A | * | 11/1999 | Niijima et al. ............... 360/323 |
| 6,160,688 | A | * | 12/2000 | Okumura ..................... 360/323 |
| 7,274,539 | B2 | * | 9/2007 | Kiyono et al. ............... 360/317 |
| 2002/0085316 | A1 | * | 7/2002 | Hsiao et al. .................. 360/319 |

FOREIGN PATENT DOCUMENTS

| JP | 60-59517 | 4/1985 |
| JP | 5-46929 | 2/1993 |
| JP | 5-275769 | 10/1993 |
| JP | 7-65330 | 3/1995 |
| JP | 7-182625 | 7/1995 |
| JP | 11-31311 | 2/1999 |
| JP | 2004-206790 | 7/2004 |

* cited by examiner

*Primary Examiner*—Tianjie Chen
(74) *Attorney, Agent, or Firm*—Oblon, Spivak, McClelland, Maier & Neustadt, P.C.

(57) ABSTRACT

A parasitic capacity C4 generated between a slider substrate and the first shield layer with the first insulating layer as a capacity layer is made substantially equal to a parasitic capacity C2 occurring between a lower magnetic layer and the second shield layer with the third insulating layer as a capacity layer. Preferably, a connection is made between the lower magnetic layer and the slider substrate by a resistance of preferably 100 (Ω) or lower. Thus, it is possible to provide a thin-film magnetic head that can hold back deterioration in a reproducing device and the occurrence of errors due to crosstalk between a recording device and the reproducing device and extraneous noises.

9 Claims, 41 Drawing Sheets

THIN-FILM MAGNETIC HEAD, HEAD GIMBAL ASSEMBLY AND HARD DISK SYSTEM

BACKGROUND OF THE INVENTION

1. Field of the Invention

The present invention relates to a thin-film magnetic head comprising a read magnetic head device of a CPP structure for reading the magnetic field intensity of a magnetic recording medium or the like as signals and a write-only induction type magnetic conversion device as well as a head gimbal assembly (magnetic head system) and a hard disk system (magnetic disk system), each incorporating that thin-film magnetic head.

2. Explanation of the Prior Art (1) Thin-film magnetic heads are now required to have higher sensitivity and higher output to keep up with large capacities and size reductions of hard disk drives (HDDs). To meet such demands, improvements in the properties of thin-film magnetic heads are now under intensive development.

A thin-film magnetic head is ordinarily of a composite structure wherein an induction type recording device is stacked on a reproducing device using a magneto resistive effect device (MR device) in proximate relation. As well know in the art, the recording device is broken down into two types, i.e., a longitudinal recording device wherein the recording layer of a magnetic recording medium is longitudinally magnetized, and a perpendicular recording device wherein the recording layer is magnetized perpendicularly with respect to film plane. Most MR devices forming part of the reproducing device use a spin valve layer (hereinafter called the SV film). Still, thin-film magnetic heads using a ferromagnetic tunnel junction layer (hereinafter referred to as the TMR layer), too, have been vigorously developed and now put to practical stages, because of a possible resistance change rate that is at least twice as large as that of the thin-film magnetic head using the SV film.

The SV film and the TMR layer differ in the direction of conduction of sense currents and, hence, in head structure. In general, the head structure wherein sense currents conduct parallel to film plane is called a CIP (current-in-plane) structure, and the head structure wherein sense currents conduct perpendicularly to film plane is referred to as a CPP (current-perpendicular-to-plane) structure. With the CPP structure where a magnetic shield itself can be used as an electrode, there is not essentially any short circuit (poor insulation) between the magnetic shield and the device, which becomes a grave problem with making the lead gap of the CIP structure narrow. For this reason, the CPP structure works very favorably for high-density recording.

The TMR layer, basically because of having the CPP structure, possesses the advantage as mentioned above. The SV film, too, is seeing a switchover from the heavily used conventional CIP structure to the CPP structure to ensure the advantage of the CPP structure as mentioned above. For instance, multilayer structures of the specular or dual type are exemplified.

With the CPP structure, the first and second shield layers located with the MR device sandwiched between them also serve as electrodes for supplying sense currents. The first shield layer is located on a slider substrate. The slider substrate is constructed of $Al_2O_3$—TiC (hereinafter acronymed as AlTiC) improved in terms of wear resistance, and AlTiC is higher in electric conductivity than $Al_2O_3$ or the like. Accordingly, the first insulating layer is provided on an end face of the slider substrate, and the first shield layer is formed on the first insulating layer. Then, the second insulating layer is filled in between the first shield layer and the second shield layer, and the MR device is located within the second insulating layer.

On the second shield layer, there is provided the third insulating layer, on which a recording device is provided. The recording device has a coil, a magnetic circuit and a recording gap. The coil is insulated and supported by an organic or inorganic insulating layer. The magnetic circuit is to guide a magnetic flux generated by currents passing through the coil, comprising a magnetic layer (lower magnetic layer) that opposes the second shield layer via the third insulating layer and a magnetic layer (the second magnetic layer) that forms the magnetic circuit with the lower magnetic layer. The recording gap is provided somewhere in the magnetic circuit.

In the field of magnetic recording, by the way, higher write frequencies have been applied so as to keep pace with demands for higher data transfer rates, and recording devices and reproducing devices have been slimmed down so as to meet demands for higher recording densities. Thin-film magnetic heads now on use can follow current write frequencies, and device shape can match well with high-density recording on demand as well.

However, demands for higher data transfer rates and higher-density recording know no bounds; sooner or later, they will not be met for the following reasons.

A prior art CPP type thin-film magnetic head has a typical structure in which the first insulating layer is interposed between the slider substrate having electric conductivity and the first shield layer, the second insulating layer is filled in between the first shield layer and the second shield layer, the third insulating layer is interposed between the second shield layer and a recording device-forming magnetic layer (lower magnetic layer), and the coil of the recording device is insulated and supported by an organic or inorganic insulating layer. Consequently, such a parasitic capacity as set forth below is equivalently yielded in the thin-film magnetic head.

First, between the coil of the recording device and magnetic layer (lower magnetic layer), the first parasitic capacity C1 occurs with the coil-supporting organic or inorganic insulating layer as a capacity layer, and between the magnetic layer (lower magnetic layer) and the second shield layer, the second parasitic capacity C2 occurs with the third insulating layer as a capacity layer. Further between the second shield layer and the first shield layer, the third parasitic capacity C3 occurs with the second insulating layer as a capacity layer, and furthermore between the first shield layer and the slider substrate, the fourth parasitic capacity C4 occurs with the first insulating layer as a capacity layer.

With the above parasitic capacity circuit, as high-frequency write currents are passed through the coil, it causes the first C1, the second C2, the third C3 and the fourth parasitic capacity C4 to charge by the high-frequency write currents.

In the CPP type thin-film magnetic head, the second shield layer for generating the second parasitic capacity C2 and the first shield layer for generating the fourth parasitic capacity C4 are each positioned on both sides of the MR device or they differ in position, and the third parasitic capacity C3 is generated between the second shield layer and the first shield layer.

For this reason, the terminal voltage V2 of the second parasitic capacity C2 as viewed at the second shield layer is different from the terminal voltage V4 of the fourth parasitic capacity C4 as viewed at the first shield layer, and the ensuing differential voltage (V2~V4) appears between the first shield layer and the second shield layer. In association with a voltage applied to the coil for conduction of write currents, this differential voltage (V2~V4) oscillates, appearing between the first shield layer and the second shield layer in a crosstalk form. The crosstalk caused by the voltage applied to the coil for conduction of write currents incurs reproducing device deterioration. In addition, the higher the write frequency, the sharper the change in the writing voltage becomes and, hence, the higher the crosstalk voltage becomes. Thus, as the frequency of the write current becomes high, the detrimental effect of crosstalk grows large, resulting in further deterioration in the properties of the reproducing device.

Especially with a magnetic head using a reproducing device having a reduced section so as to keep up with higher-density recording, that detrimental effect grows large. When it comes to the SV film, this offers some problems such as reduced service life due to acceleration of electromigration, and deterioration in the magnetic properties due to acceleration of intermetallic diffusion. When it comes to the TMR device, on the other hand, the insulating layer present between ferromagnetic layers is likely to break down.

Moreover, a mutual difference between the second parasitic capacity C2 as viewed at the second shield layer and the fourth parasitic capacity C4 as viewed at the first shield layer renders extraneous noises likely to enter the magnetic head from the slider substrate side, giving rise to errors.

(2) As already described, the thin-film magnetic head is now required to have more improved performance to keep pace with an improvement in the plane recording density of a hard disk system. For the thin-film magnetic head, a composite type thin-film magnetic head is widely used, having a structure wherein a reproducing head having a read-only read magnetic head device and a recording head having a write-only induction type magnetic conversion device are stacked together on a substrate.

The read magnetic head is generally broken down into two types depending on in what direction a current (sense current) for the detection of a magnetic field is conducted with respect to the stacked device structure.

That is, it is broadly divided into a device of the CIP (current-in-plane) type wherein a current is conducted along the multilayer plane of the stacked device structure and a device of the CPP (current-perpendicular-to-plane) type wherein a current is conducted in the stacking (perpendicular) direction of the stacked device structure.

The former device is exemplified by a CIP type giant magneto resistive (GMR) device, and the latter by a CPP type GMR device or a tunnel magneto resistive (TMR) effect device.

In particular, a magnetic head equipped with the latter CPP type read magnetic head device has usually a structure wherein the upper and lower surfaces are sandwiched between a lower shield layer and an upper shield layer. Usually, the lower shield layer and the upper shield layer also serve as electrodes, and a sense current is applied between the lower and the upper shield layer in such a way as to allow the current to conduct in the stacking (perpendicular) direction of the device.

Generally, the thin-film magnetic head has a structure wherein the read magnetic head device and write magnetic head device are formed on the slider substrate. For instance, the slider substrate is formed of AlTiC ($Al_2O_3$—TiC), and an underlay film typically formed of $Al_2O_3$ is formed on the substrate for the purpose of making insulation between the AlTiC and the magnetic head device.

In the thin-film magnetic head, by the way, there are Joule heat from the coil layer in the induction type magnetic conversion device and heat in association with eddy current losses from the upper and lower magnetic layers. These heats end up with the so-called TPTP (thermal pole tip protrusion) phenomenon in which the overcoat layer covering the entire device is thermally expanded to force the magnetic head toward the surface of the opposing magnetic disk.

To hold back such a TPTP phenomenon, for instance, to radiate the above coil heat and coil eddy current loss heat to $Al_2O_3$—TiC, it is effective to reduce the thickness of the underlay film. However, the inventors have found that the thickness reduction of the underlay film leads to a phenomenon in which noises entering the slider substrate from outside grow more at the lower shield layer (also serving as an electrode) close to the slider substrate. Further, the inventors have noticed that such noises are amplified by a preamplifier, bringing about an undesired result with the noises superimposed on output signals.

In some cases, a heat generator is intentionally provided to make active use of the TPTP. However, the propagation of heat to the magneto resistive effect layer (device) must be limited as much as possible to maintain the ability to read signals.

SUMMARY OF THE INVENTION

The present invention has been made to provide solutions to the prior art problems described at (1) and (2), respectively.

More specifically, the first group of the invention is addressed to the prior art problem (1). One object of the invention is to provide a solution to the first group of problems described at (1), thereby providing a thin-film magnetic head, a magnetic head system, and a magnetic disk system which is capable of holding back crosstalk between a recording device and a reproducing device, and preventing the occurrence of electromigration in an SV film, deterioration in the magnetic properties due to intermetallic diffusion, etc. and which is less susceptible of influences of extraneous noises.

(1) To achieve such an object, the first group of the invention is embodied as follows.

The thin-film magnetic head according to the invention comprises a slider substrate, a reproducing device and a recording device. The slider substrate is of electric conductivity and has a first insulating layer at one end face.

The reproducing device comprises a first shield layer, a second insulating layer, a second shield layer and an MR device, wherein the first shield layer, the second insulating layer and the second shield layer are adjacent to one another in this order on the first insulating layer. The MR device is interposed between the first shield layer and the second shield layer, and buried around it with the second insulating layer with the first shield layer and the second shield layer as electrodes.

The recording device comprises a coil and a magnetic circuit. The coil is insulated and supported in place. The magnetic circuit is to guide a magnetic flux generated by a current passing through the coil, and comprises a magnetic layer that opposes the second shield layer via a third insulating layer. The recording device could be either a longitudinal recording device or a perpendicular recording device.

A parasitic capacity occurring between the slider substrate and the first shield layer with the first insulating layer as a capacity layer and a parasitic capacity occurring between the magnetic layer and the second shield layer with the third insulating layer as a capacity layer are substantially equal to each other. The magnetic layer and the slider substrate are connected together by a resistance that should preferably be 100 Ω or lower.

In the thin-film magnetic head according to the invention, the first insulating layer is provided on the slider substrate having electric conductivity, the first shield layer, the second insulating layer and the second shield layer are adjacent to one another in this order on the first insulating layer, and the MR device is interposed between the first shield layer and the second shield layer, as described above. The first shield layer and the second shield layer also serve as electrode layers. With this arrangement, it is possible to obtain a thin-film magnetic head of the CPP structure wherein the MR device is shielded by the first shield layer and the second shield layer, and a sense current is conducted perpendicularly to film plane. With the CPP structure wherein the first shield layer and the second shield layer are used as electrodes, there is not essentially any short circuit (poor insulation) between the magnetic shields and the device, which becomes a grave problem in making the lead gap of the CIP structure narrow. Thus, this thin-film magnetic head is best suited for high recording densities.

In the recording device, the magnetic flux generated by a current passing through the coil is guide by the magnetic circuit. The magnetic circuit comprises a well-known recording gap, at which magnetic recording occurs on the medium. The magnetic circuit comprises a magnetic layer that opposes the second shield layer via the third insulating layer. Generally, this magnetic layer provides a lower magnetic layer.

In the above thin-film magnetic head, the first parasitic capacity C1 occurs between the coil of the recording device and the lower magnetic layer with the fourth insulating layer as a capacity layer; the second parasitic capacity C2 occurs between the lower magnetic layer and the second shield layer with the third insulating layer as a capacity layer; the third parasitic capacity C3 occurs between the second shield layer and the first shield layer with the second insulating layer as a capacity layer; and the fourth parasitic capacity C4 occurs between the first shield layer and the slider substrate with the first insulating layer as a capacity layer.

With the CPP type thin-film magnetic head, the occurrence of those parasitic capacities C1, C2, C3 and C4 is unavoidable in consideration of its structure. Therefore, problems ascribable to them such as a breakdown of the insulating layer in the TMR device due to cross-talk, limited service life due to acceleration of electromigration in the SV film, and deterioration in the magnetic properties due to acceleration of intermetallic diffusion, too, are unavoidable with the CPP type thin-film magnetic head.

As previously set forth, the mutual difference between the second parasitic capacity C2 as viewed at the second shield layer and the fourth parasitic capacity C4 as viewed at the first shield layer renders extraneous noises likely to enter the magnetic head from the slider substrate side, resulting in errors.

According to the invention, this problem is solved by allowing the fourth parasitic capacity C4 occurring between the slider substrate and the first shield layer with the first insulating layer as a capacity layer and the second parasitic capacity C2 occurring between the lower magnetic layer and the second shield layer with the third insulating layer as a capacity layer to have a substantially equal value, and connecting the lower magnetic layer and the slider substrate together by means of a resistance of preferably 100 Ω or lower.

With the above arrangement, the terminal voltage V2 of the second parasitic capacity C2 as viewed at the second shield layer becomes substantially equal to the terminal voltage V4 of the fourth parasitic capacity C4 as viewed at the first shield layer, and the ensuing differential voltage (V2~V4) is reduced down to almost zero.

The terminal voltage V2 of the second parasitic capacity C2 as viewed at the second shield layer becomes substantially equal to the terminal voltage V4 of the fourth parasitic capacity C4 as viewed at the first shield layer, and the ensuing differential voltage (V2~V4) is reduced down to almost zero; even when extraneous noises of any frequency enter the magnetic head from slider substrate side, they have no influences thereon at all. Thus, there is neither deterioration in the reproducing device nor errors, due to extraneous noises.

Further, even when the sectional area of the reproducing device is reduced so as to address high-density recording, any crosstalk voltage rise is stayed off. Consequently, the problems such as a breakdown of the insulating layer in the TMR device, reduced service life due to acceleration of electromigration in the SV film, and deterioration in the magnetic properties due to acceleration of intermetallic diffusion, too, are stayed off.

In the thin-film magnetic head according to the invention, the MR device is constructed of an SV film or a TMR layer, each of the CPP type.

Further, the invention includes a magnetic head system comprising the above thin-film magnetic head and a suspension as well as a magnetic disk system comprising this magnetic head and a magnetic disk.

(2) The second group of the invention has been made with the problem described at the above prior art problem (2) in mind. One object of the second group of the invention is to provide a solution to the above prior art problem (2), thereby providing a thin-film magnetic head of the structure wherein, even when the thickness of the underlay film formed on the slider substrate is reduced, adverse influences of extraneous noises entering the slider substrate from outside can be averted as well as a thin-film magnetic head that enables a heat radiation effect on the substrate side to be so enhanced that the propagation of heat to the magneto resistive effect layer can be limited as much as possible. Another object of the second group of the invention is to provide a head gimbal assembly and a hard disk system, each comprising the thus improved thin-film magnetic head.

To achieve such objects, the second group of the invention is embodied as follows.

That is, the thin-film magnetic head according to the invention comprises a substrate, an underlay film formed on said substrate, a lower shield layer located and formed on said underlay film, an upper shield layer located and formed on said lower shield layer, a read magnetic head device of a CPP (current-perpendicular-to-plane) structure interposed between said lower shield layer and said upper shield layer, and a lower magnetic pole layer of a write magnetic head device formed on said upper shield layer, wherein said thin-film magnetic head comprises a heat sink layer at a site in the rear of said lower shield layer, said upper shield layer and said magnetic pole layer (in an opposite direction to an ABS that is a recording/reproducing side surface), wherein said heat sink layer is substantially connected to said lower magnetic pole layer, and said lower magnetic pole layer and said substrate are connected together via said heat sink layer.

In one preferable embodiment of the invention, the thin-film magnetic head comprises a heat sink layer at a site in the rear of said lower shield layer, said upper shield layer and said magnetic pole layer (in an opposite direction to an ABS that is a recording/reproducing side surface), wherein said heat sink layer comprises a structure substantially separated from said lower shield layer, said upper shield layer and said lower magnetic pole layer, and upon formation of an upper magnetic pole layer to be formed on said lower magnetic pole layer, connection sites for making a connection between said upper shield layer and said heat sink layer are provided, so that those connection sites are connected together to make a connection between said lower magnetic pole layer and said substrate via said heat sink layer.

In another preferable embodiment of the thin-film magnetic head of the invention, said connection sites are connected together by a connection member formed of the same material as a coil-formation member to make a connection between said lower magnetic pole layer and said substrate via said heat sink layer.

In yet another embodiment of the thin-film magnetic head of the invention, C2 and C4 have a substantially identical value provided that C4 is a parasitic capacity occurring between said substrate and said lower shield layer, and C2 is a parasitic capacity occurring between said lower magnetic pole layer and said upper shield layer by making a connection between said lower magnetic pole layer and said substrate.

In a further preferable embodiment of the thin-film magnetic head of the invention, the value of C2/C4 that is a C2 to C4 ratio ranges from 0.6 to 1.4 inclusive, provided that C4 is a parasitic capacity occurring between said substrate and said lower shield layer, and C2 is a parasitic capacity occurring between said lower magnetic pole layer and said upper shield layer by making a connection between said lower magnetic pole layer and said substrate.

In a further preferable embodiment of the thin-film magnetic head of the invention, said read magnetic head device of the CPP structure is constructed of a CPP-giant magneto resistive (GMR) device or a tunnel magneto resistive (TMR) effect device.

The head gimbal assembly of the invention comprises a slider that includes the above thin-film magnetic head and is located in opposition to a recording medium, and a suspension for resiliently supporting said slider.

The hard disk system of the invention comprises a slider that includes the above thin-film magnetic head and is located in opposition to a disk form of rotationally driven recording medium, and a positioning device for supporting and positioning said slider with respect to said recording medium.

The thin-film magnetic head of the invention comprises the read magnetic head device of the CPP structure interposed between the lower shield layer and the upper shield layer, and the lower magnetic pole layer of the write thin-film magnetic head device formed on the upper shield layer, wherein there is provided a heat sink layer at a site in the rear of the lower shield layer, the upper shield layer and the lower magnetic pole layer (in the opposite direction to the ABS that is a recording/reproducing side surface), wherein the heat sink layer is connected to the lower magnetic pole layer, and the lower magnetic pole layer and the substrate are connected together via the heat sink layer; the thin-film magnetic head of the invention provides break-through advantages over the prior art in that even when the thickness of the underlay film formed on the (slider) substrate is reduced, adverse influences of extraneous noises entering the slider substrate from outside can be averted, and that the heat radiation effect on the substrate side is so enhanced that the propagation of hat to the magneto resistive effect layer can be limited as much as possible.

BRIEF EXPLANATION OF THE DRAWING

FIG. 519(B) is a schematic section of FIG. 51(A).

DETAILED EXPLANATION OF THE INVENTION

Specific embodiments of the first group of the invention are now explained in more details.

(1) Explanation of the First Group of the Invention (Explanation of the Thin-Film Magnetic Head)

Figure 1:
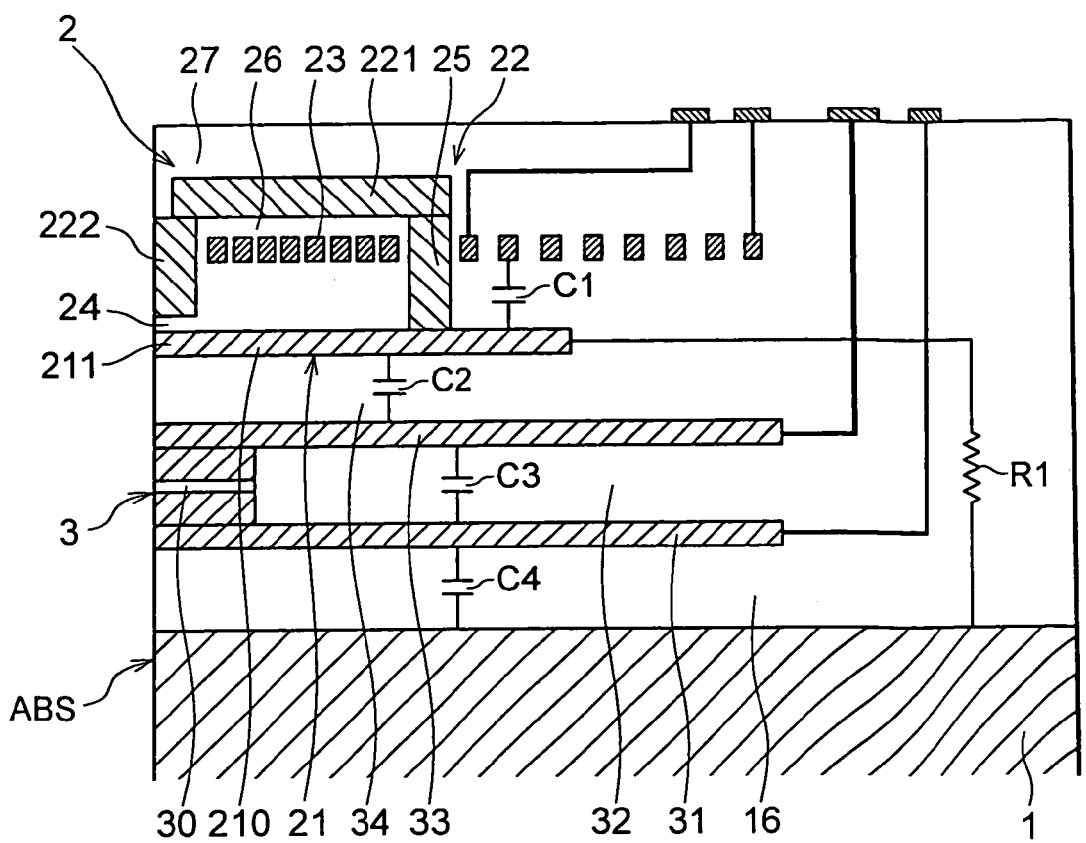
FIG. 1 is illustrative in schematic of the structure of the thin-film magnetic head according to the first group of the invention.
Figure 2:
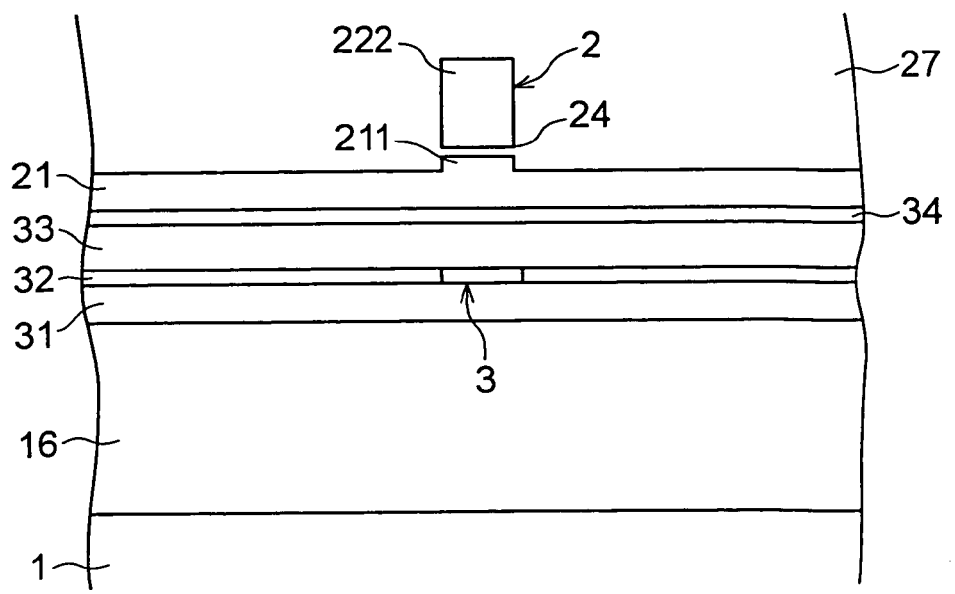
FIG. 2 is illustrative of a more specific embodiment of the thin-film magnetic head shown in FIG. 1, as viewed from its surface opposite to a medium.

FIG. 1 is illustrative in schematic of the structure of the thin-film magnetic head according to the invention, and FIG. 2 is illustrative of a more specific embodiment of the thin-film magnetic head depicted in FIG. 1. The thin-film magnetic head illustrated in FIGS. 1 and 2 comprises a slider substrate 1, a recording device 2 and a reproducing or playback device 3. Notice here that the ordering of ordinals such as the first, second and third is with respect to the slider substrate 1.

The slider substrate 1, for instance, is formed of AlTiC having improved wear resistance. The slider substrate 1 has a levitation capability control geometrical configuration on its medium opposing surface, which provides an ABS. For such a geometrical configuration, various patterns, structures and shapes have been proposed, and any of them could be used in the invention. Although the slider substrate 1 formed of AlTiC is better in wear resistance and lubrication than inorganic insulating materials such as $Al_2O_3$, yet it has higher electrical conductivity. For this reason, a first insulating layer 16 formed of an inorganic insulating material such as $Al_2O_3$ or $SiO_2$ is deposited on the surface of the slider substrate 1, on which devices are to be mounted.

The reproducing device 3 comprises a first shield layer 31, a second insulating layer 32, a second shield layer 33 and an MR device 30. For instance, the first 31 and the second shield layer 32 are each formed of a NiFe/Au multilayer, and the second insulating layer is formed of a metal oxide insulating material such as $Al_2O_3$ or $SiO_2$. The first shield layer 31, the second insulating layer 32 and the second shield layer 33 are adjacent to one another in this order on the first insulating layer 16.

The MR device 30 is interposed between the first 31 and the second shield layer 32, and receives sense currents with the first 31 and the second shield layer 32 working as electrode layers. The MR device 30 is buried around it in the second insulating layer 32. The MR device 30 is formed of an SV film or a TMR layer, each of the CPP type.

Figure 3:
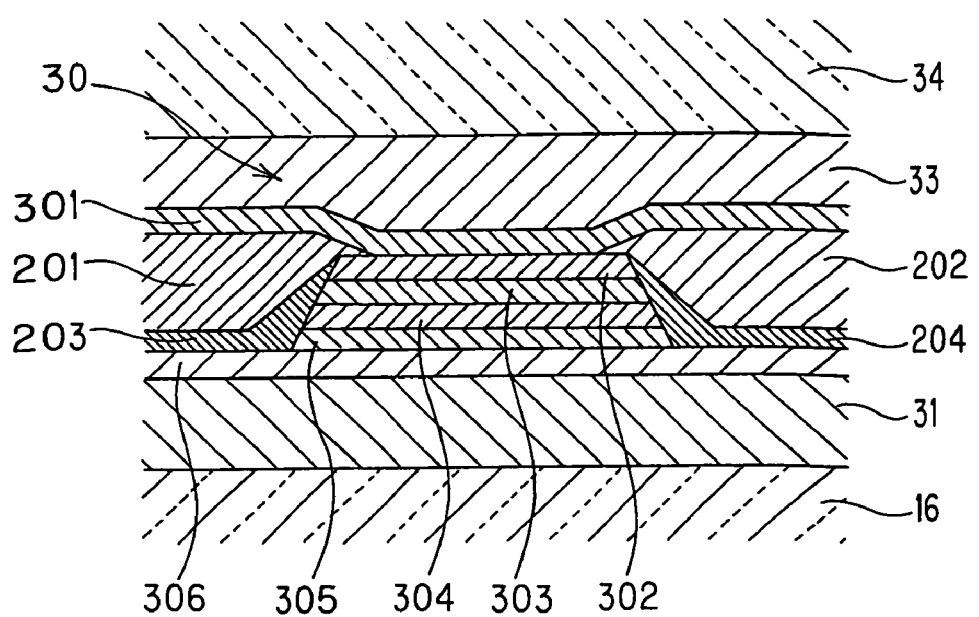
FIG. 3 is illustrative in section of one specific layer structure of a CPP type MR device.

FIG. 3 is illustrative in section of a specific layer structure of the CPP type MR device 30. The MR device 30 includes a free layer 302 and a nonmagnetic layer 303 adjacent to the free layer 302, with a pinned layer 304 adjacent onto the nonmagnetic layer 303. On the pinned layer 304 there is located an antiferromagnetic layer 305. The pinned layer 304 has a magnetization direction fixed in one direction by exchange bonding with the antiferromagnetic layer 305.

For the layer structure, composition, material and so on of the free layer 302, nonmagnetic layer 303, pinned layer 304 and antiferromagnetic layer 305, techniques known so far in the art could be used as desired. Typically, the free layer 302 and the pinned layer 304 are each formed of NiFe, NiFeCo, and CoFe, and the anti-ferromagnetic layer 305 is formed of FeMn, MnIr, NiMn, and CrMnPt. The nonmagnetic layer 303, in an SV film form, is formed of an electrically conductive material composed mainly of Cu or the like and, in a TMR layer form, is formed of an insulating material layer such as an $Al_2O_3$ layer. An upper electrode layer 26 is adjacent to the antiferromagnetic layer 305, and is covered with an insulating layer 46.

Magnetic domain control layers 201 and 202 are located on widthwise both sides of the MR device 30 with spaces defined by insulating layers 203 and 204. The magnetic domain control layers 201 and 202 control magnetic domains in the free layer 302.

The first 31 and the second shield layer 32 are adjacent to both surfaces of the MR device 30 by way of underlay layers 301 and 305, respectively. Thus, the MR device 30 enables sense currents to pass in a perpendicular direction to its film surface.

Comprising at least one free layer 302, the SV film or TMR layer of the CPP structure must hold back Barkhausen noises that may occur at the free layer 302. The MR device 30 in the illustrated embodiment comprises the magnetic domain control layers 201 and 202, and the magnetic domain control layers 201 and 202 are located on widthwise both sides of the MR device 30 to control the magnetic domains in the free layer 302.

The insulating layers 203 and 204, each in a layer form, are interposed between the magnetic domain control layers 201, 202 and the first and second shield layers 31, 33, and there is a complete cutoff between those layers and the MR device 30.

Referring again to FIGS. 1 and 2, the recording device 2 comprises a lower magnetic layer 21, a second magnetic layer 22, a thin-film coil 23 and a recording gap layer 24. The lower magnetic layer 21 is formed of a plated layer such as NiFe, CoNiFe or CoFe, comprises a first magnetic pole layer 210 and a first magnetic pole 211, and is formed on a third insulating layer 34 adjacent to the second shield layer 33. The third insulating layer 34, for instance, is formed of $Al_2O_3$ (alumina).

The first magnetic pole 211 is located at an end of the first magnetic pole layer 210 on a side opposite to the recording medium, i.e., its ABS side.

The second magnetic layer 22 comprises a second magnetic pole layer 221 and a second magnetic pole 222. The second magnetic pole layer 221 is spaced away from the first magnetic pole layer 210, and magnetically bonded to the first magnetic pole layer 210 via a rear junction 25 positioned in the rear. The second magnetic pole layer 221 is adjacent at its front end to the second magnetic pole 222, and formed of a magnetic material such as NiFe, CoNiFe, and CoFe. The front end of the second magnetic pole layer 221 is at a position slightly retracted off the surface of the second magnetic pole 222 opposite to the second magnetic pole 222. Via the recording gap layer 24, the second magnetic pole 222 is opposite to the first magnetic pole 211 with the same track width (see FIG. 3).

The thin-film coil 23 is wound around the rear junction 25. The thin-film coil 23 is supported by an insulating layer 26 filled in an inner gap occurring between the first magnetic pole layer 210 and the second magnetic pole layer 221. The thin-film coil 23 is provided in the form of a plated layer such as Cu.

With the above arrangement, the second magnetic pole layer 221, the second magnetic pole 222, the recording gap layer 24, the first magnetic pole 211, the first magnetic pole layer 210 and the rear junction 25 form together a thin-film magnetic circuit for a magnetic flux produced by currents through the thin-film coil 23.

Figure 4:
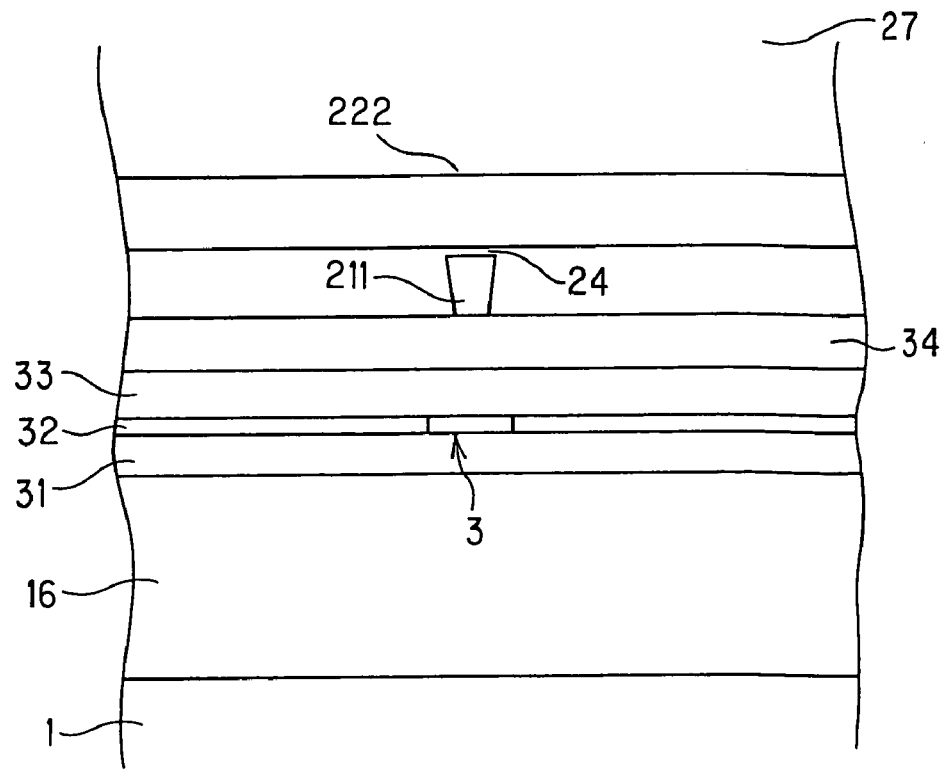
FIG. 4 is illustrative of the vertical thin-film magnetic head according to the invention, as viewed from its surface opposite to a medium.

Although FIGS. 1 and 2 show the longitudinal recording device, it is understood that the invention could be applied to a perpendicular recording device wherein a recording layer is magnetized perpendicularly to a film plane. As well known in the art, a structural difference between the longitudinal recording device and the perpendicular recording device appears as a structural difference of the pole portion. One example is shown in FIG. 4. Referring to FIG. 4 that is an illustration as viewed from an ABS side, there is a gap 24 between a first magnetic pole layer 210 that provides a main magnetic pole and a second magnetic pole 222 that forms a light shield. The second magnetic pole layer 221 forms a light shield together with the second magnetic pole 222. The perpendicular recording device is clearly different from the longitudinal recording device in that the second magnetic pole 222 that forms the light shield sprawls out in the track direction.

The advantages of, and the requirements for, the thin-film magnetic head according to the invention are now explained. First of all, the first insulating layer 16 is located on the electrically conductive slider substrate 1. On the first insulating layer 16, the first shield layer 31, the second insulating layer 32 and the second shield layer 33 come adjacent to one another in this order, and the MR device 30 is interposed between the first shield layer 31 and the second shield layer 33. The first shield layer 31 and the second shield layer 33 also serve as electrode layers. With this arrangement, a thin-film magnetic head of the CPP structure is obtained, wherein the MR device 30 is shielded off by the first 31 and the second shield layer 33, and sense currents pass perpendicularly to the film surface. With the CPP structure using the first 31 and the second shield layer 33 as electrode layers, there is essentially no short circuit (poor insulation) between the magnetic shield and the device. This short circuit becomes a grave problem in making the lead gap of the CIP structure narrow. Thus, it is possible to obtain a thin-film magnetic head well fit for high recording densities.

A magnetic flux occurring by currents passing through the coil 23 in the recording device 2 is induced by a magnetic circuit comprising the lower magnetic layer 21, the second magnetic layer 22, etc. The magnetic circuit comprises the recording gap 24 in which magnetic recording takes place with respect to the medium.

With the thin-film magnetic head as described above, a first parasitic capacity C1 with a fourth insulating layer as a capacity layer is generated between the coil 23 and the lower magnetic layer 21 in the recording device 2, and a second parasitic capacity C2 with the third insulating layer 34 as a capacity layer is generated between the lower magnetic layer 21 and the second shield layer 33. Further, a third parasitic capacity C3 with the second insulating layer 32 as a capacity layer is generated between the second shield layer 33 and the first shield layer 31, and a fourth parasitic capacity C4 with the first insulating layer 16 as a capacity layer is generated between the first shield layer 31 and the slider substrate 1.

With the CPP type thin-film magnetic head, such parasitic capacities C1 to C4 are unavoidable in consideration of structure. Consequently, the CPP type thin-film magnetic head unavoidably involves some problems such as a breakdown of the insulating layers in the TMR device 30 due to the ensuing crosstalk, decreases in the service life of the SV film due to acceleration by electromigration, and deterioration in the magnetic properties due to acceleration of intermetallic diffusion. Further, because the second parasitic capacity C2 as viewed at the second shield layer 33 is mutually different from the fourth parasitic capacity C4 as viewed at the first shield layer 31, extraneous noises are likely to enter the thin-film magnetic head from the slider substrate side, resulting in errors.

In accordance with the invention, this problem can be solved by allowing the fourth parasitic capacity C4 generated between the slider substrate 1 and the first shield layer 31 with the first insulating layer 16 as a capacity layer and the second parasitic capacity C2 generated between the lower magnetic layer 21 and the second shield layer 33 with the third insulating layer 34 as a capacity layer to have a substantially equal value.

With the above arrangement, the terminal voltage V2 of the second parasitic capacity C2 as viewed at the second shield layer 33 bebomes substantially equal to the terminal voltage V4 of the fourth parasitic capacity C4 as viewed at the first shield layer 31; that is, the ensuing differential voltage (V2~V4) becomes almost zero.

This enables the occurrence of crosstalk due to write currents to be held back. Even with entrance of extraneous noises of any frequency from the slider substrate, it is possible to get around deterioration and errors in the reproducing device by extraneous noises, because of no influences of extraneous noises, resulting in improvements in reliability.

Even when the area of the reproducing device 3 is reduced, it is possible to get around problems such as decreases in the service life of the SV film due to acceleration of electromigration and deterioration in the magnetic properties of the SV film due to acceleration of intermetallic diffusion as well as a breakdown of the insulating layers in the TMR device 30.

Further, the lower magnetic layer 21 and the slider substrate 1 are connected together by means of a resistance R1 of 100 Ω or lower. This ensures that the differential voltage (V2~V4) between the terminal voltage V2 of the second parasitic capacity C2 as viewed at the second shield layer 33 and the terminal voltage V4 of the fourth parasitic capacity C4 as viewed at the first shield layer 31 can be kept at a stable value of almost zero.

Thus, even with entrance of extraneous noises of any frequency from the slider substrate, it is possible to get around errors due to extraneous noises, because of no influences of extraneous noises, resulting in improvements in the reliability of the reproducing device.

Figure 5:
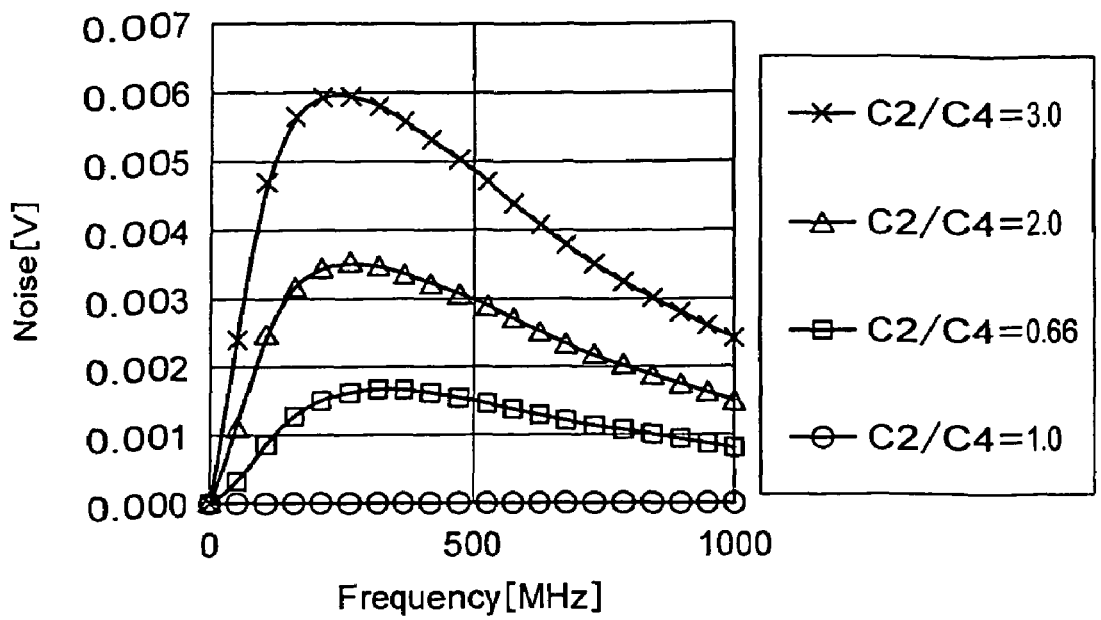
FIG. 5 is illustrative of a frequency (MHz) versus noise (V) relation wherein the frequency is that of extraneous noise and the noise is that included in output signals.

The advantages of the invention are now explained specifically with reference to data. Here FIG. 5 is illustrative of the frequency (MHz) of extraneous noises versus the noises (V) included in output signals. Referring to FIG. 5, when (C2/C4)=3.0, there are noises of at most 0.005 (V); when (C2/C4)=2.0, there are noises of at most about 0.0035 (V); and when (C2/C4)=0.66, there are noises of at most about 0.0018 (V). When (C2/C4)=1.00, on the contrary, there is no or little noise.

The parasitic capacities C2 and C4 could be made equal to each other by designing the thickness and specific dielectric constant of the first 16 and the third insulating layer 34, the area of an overlap of the first shield layer 31 with the slider substrate 1, and the area of an overlap of the second shield layer 34 and the lower magnetic layer 21.

Preferably, the lower magnetic layer 21 and the slider substrate 1 should be connected together by way of the resistance R1 of 100 Ω or lower. In this regard, for instance, see FIG. 1 and FIG. 2. If this is done, then the differential voltage (V2~V4) between the terminal voltage V2 of the parasitic capacity C2 as viewed at the second shield layer 33 and the terminal voltage V4 of the fourth parasitic capacity C4 as viewed at the first shield layer 31 can be kept at a stabilized value of almost zero.

Figure 6:
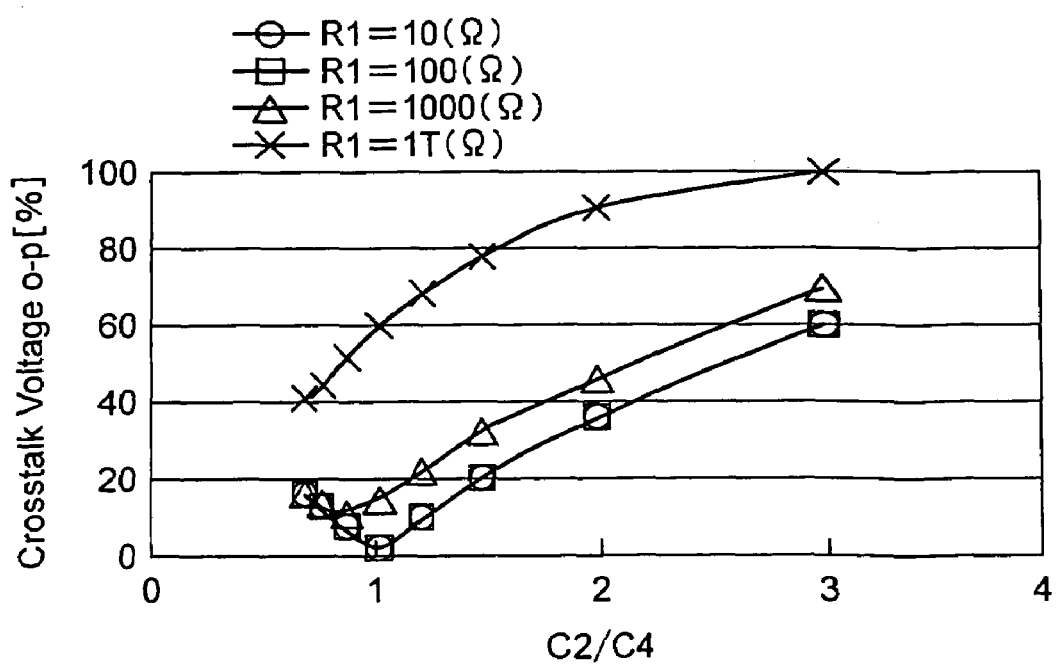
FIG. 6 is illustrative of a ratio (C2/C4) versus crosstalk voltage relation provided that a resistance R1 is applied as a parameter.

FIG. 6 is a graphical illustration showing the (C2/C4) ratio versus crosstalk voltage relation with the resistance R1 as a parameter. FIG. 6 teaches that as the resistance R1 exceeds 1,000 (Ω), there is crosstalk even when the (C2/C4) ratio is 1.

In the range with a resistance R1 value of 100 (Ω) or lower, on the other hand, crosstalk is reduced down to almost zero irrespective of whether or not there is a resistance value change, as long as (C2/C4)=1.

Figure 7:
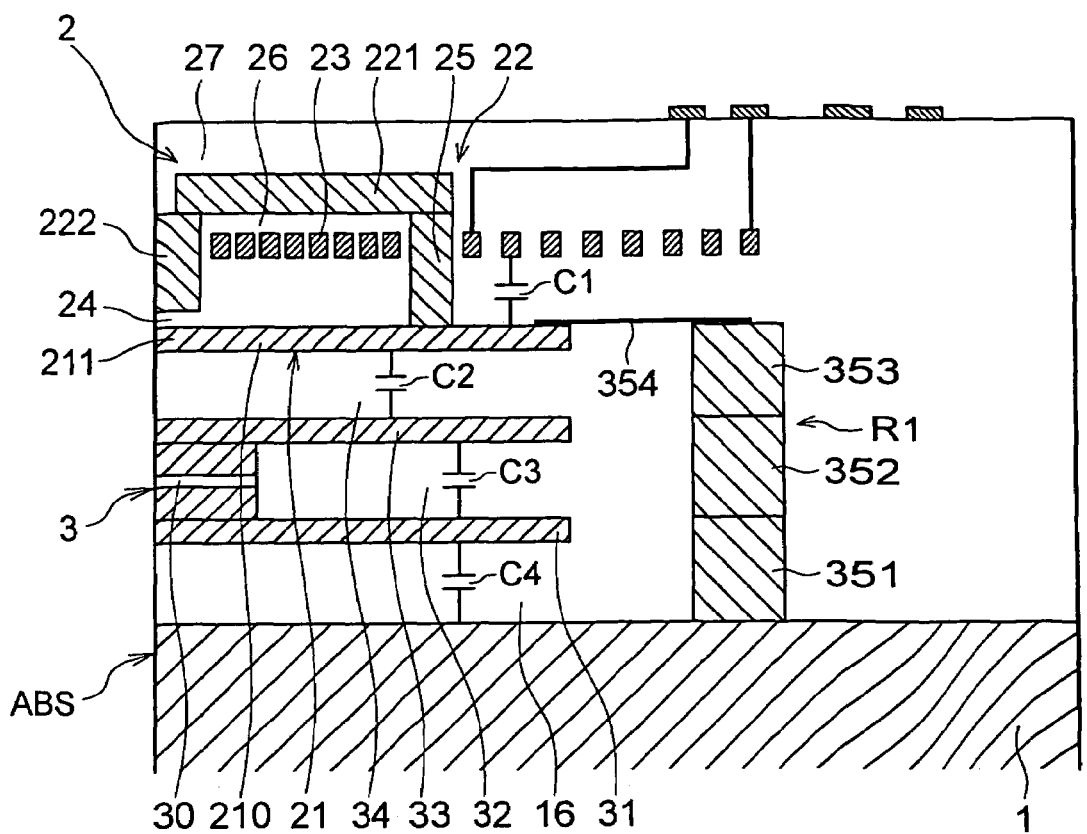
FIG. 7 is illustrative of another embodiment of the thin-film magnetic head according to the invention.
Figure 8:
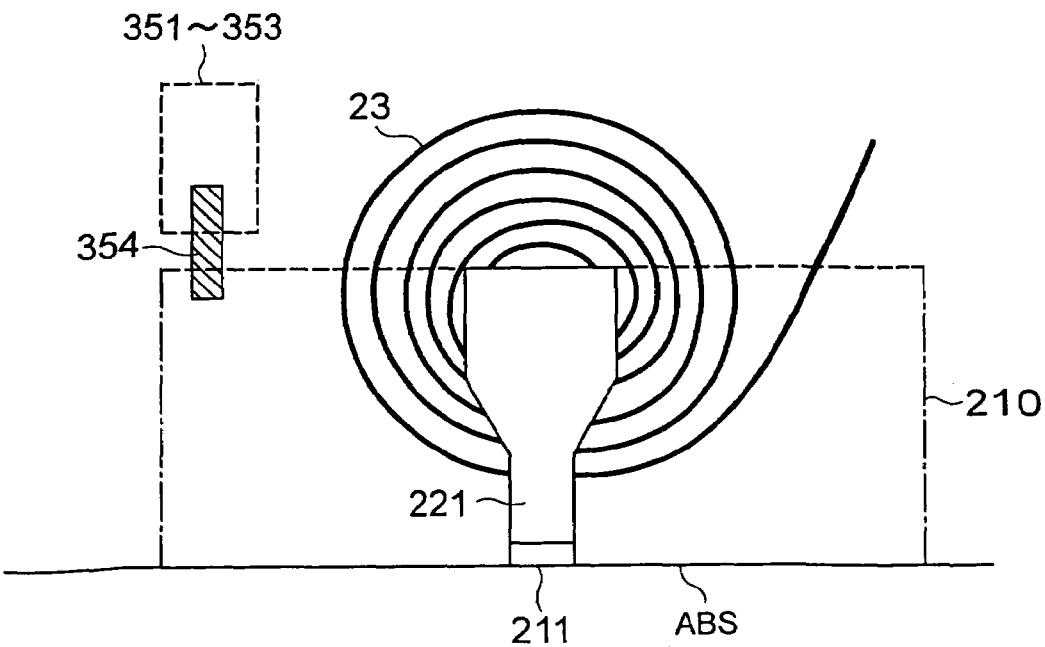
FIG. 8 is a schematic plan view of the structure of the thin-film magnetic head shown in FIG. 7.

FIG. 7 is illustrative of another embodiment of the thin-film magnetic head according to the invention, and FIG. 8 is a plan view of the thin-film magnetic head depicted in FIG. 7, as viewed at the surface of the first magnetic pole layer 210 of the lower magnetic layer 21. In FIGS. 7 and 8, portions corresponding to the parts appearing in FIG. 1 are indicated by the same reference numerals, and any further account thereof will not be given. Specifically in this embodiment, the resistance R1 is formed of a multilayer comprising suitable first, second and third resistance layers 351, 352 and 353, wherein the lowermost first resistance layer 351 is provided on the slider substrate 1, and the second and third resistance layers 352 and 353 are stacked in this order on that layer 351. The uppermost resistance layer 353 is connected by a conductor layer 354 to the first magnetic pole layer 210.

The first 351, the second 352 and the third resistance layer 353 are located in the rear of the first magnetic pole layer 210, as depicted in FIG. 7. It is to be understood that the first 351, the second 352 and the third resistance layer 353 could be positioned as desired. For instance, they may be located at suitable positions laterally of the first magnetic pole layer 210.

Figure 9:
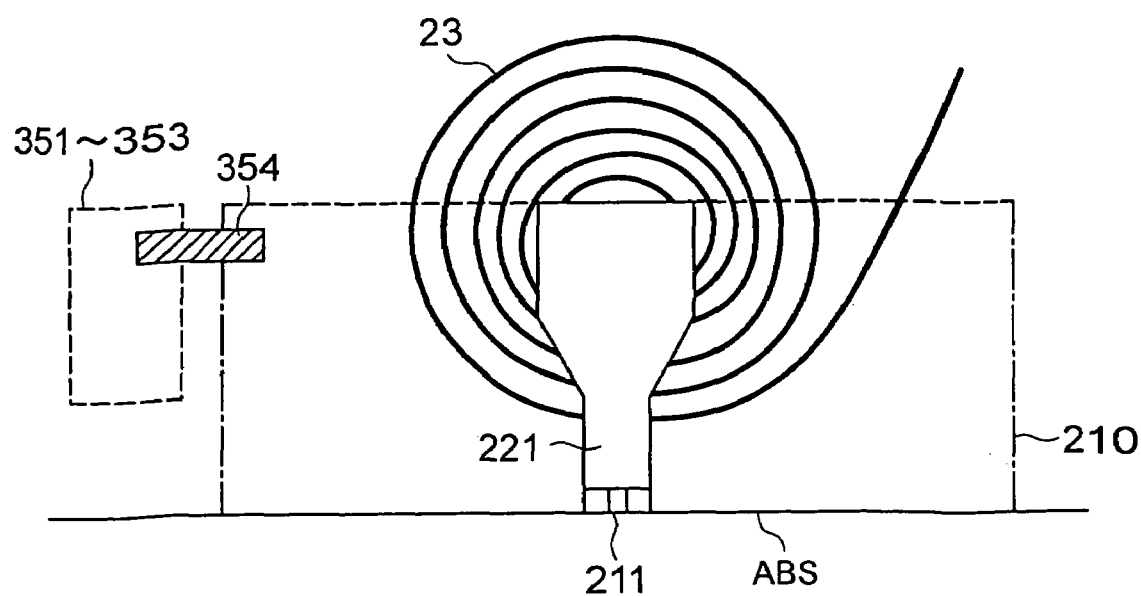
FIG. 9 is a plan view of yet another embodiment of the thin-film magnetic head according to the invention.
Figure 10:
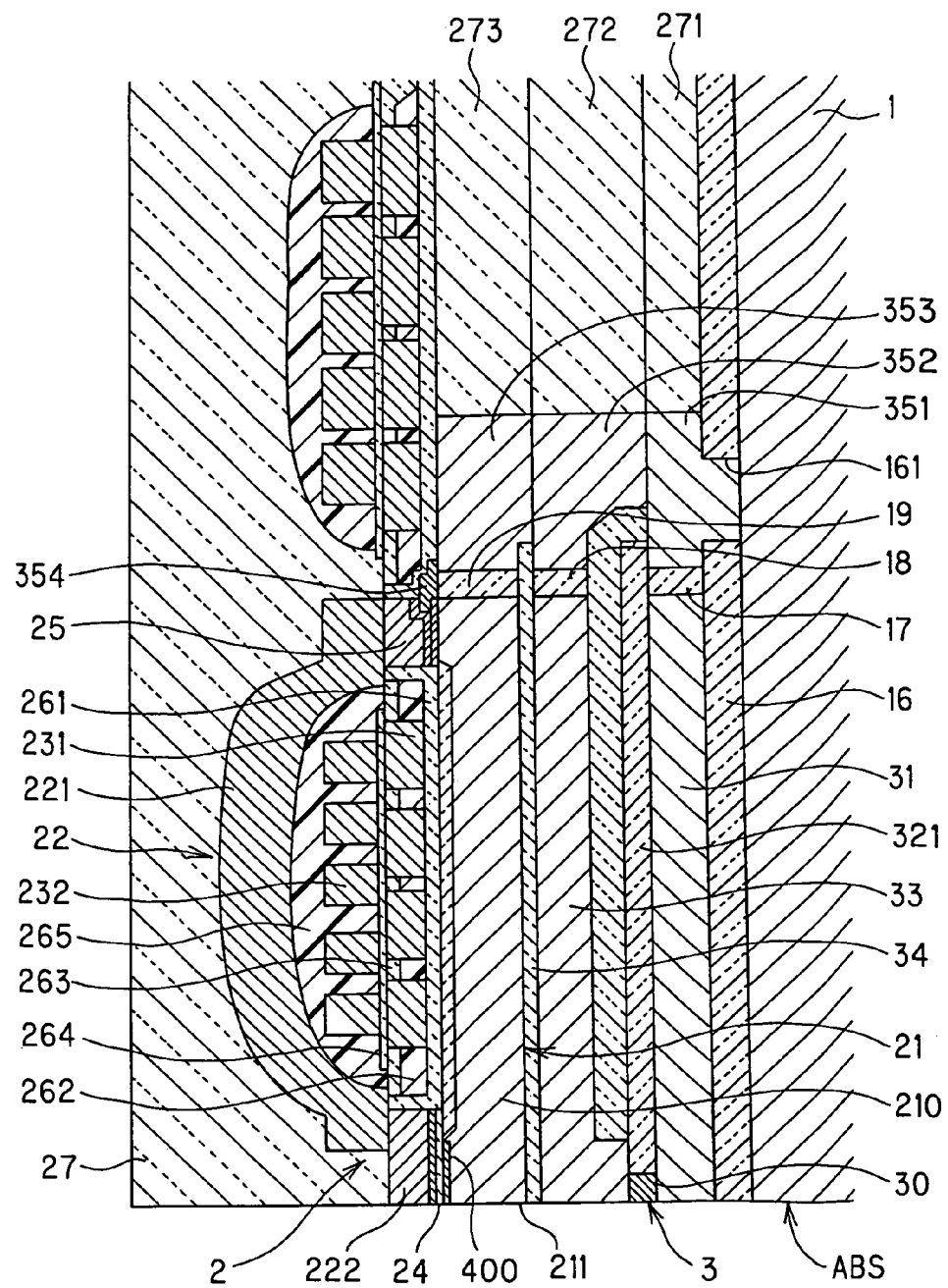
FIG. 10 is illustrative of a more specific embodiment of the thin-film magnetic head according to the invention.

FIG. 10 is illustrative of a more specific embodiment of the thin-film magnetic head according to the invention. Again, portions equivalent to the parts appearing in FIGS. 7-9 are indicated by the same reference numerals, and any further account thereof will not be given. In this embodiment, too, the resistance R1 is formed of a multilayer comprising first, second and third resistance layers 315, 352 and 353. On the surface of the slider substrate 1 the insulating layer 16 is mounted, and the first resistance layer 351 is adjacent to the slider substrate 1 through an opening 161 formed in the insulating layer 16.

The first resistance layer 351 is formed by the co-process with the first shield layer 31; however, it is electrically insulated by the insulating layer 17 from the first shield layer 31. Insulating layers 321 and 322 that correspond to the second insulating layer 32 in FIG. 7 are formed between and across the first resistance layer 351 and the first shield layer 31. The insulating layer 321 is formed on the first shield layer 31, and provided at the end of its ABS side with the MR device 30 that provides the read device 3. The insulating layer 322 is formed in such a way to cover the insulating layer 321 except some portion of the MR device 30.

The second resistance layer 352 is formed by the co-process with the first shield layer 31; however, it is electrically insulated by the insulating layer 18 from the second shield layer 33. The third insulating layer 34 is formed between and astride the second resistance layer 352 and the second shield layer 33.

The third resistance layer 353 is adjacent to the second resistance layer 352 in the rear of the third insulating layer 34. The third resistance layer 353 is formed by the co-process with the lower magnetic layer 21; however, it is separated by the insulating layer 19 from the lower magnetic layer 21.

A conductor layer 354 is formed between and astride the third resistance layer 353 and the lower magnetic layer 21. Thus, the resistance R1 comprising the first 351, the second 352 and the third resistance layer 353 is connected between the lower magnetic layer 21 and the slider substrate 1 through the conductor layer 354.

The conductor layer 354 is formed of a nonmagnetic metallic material such as Cu, Ti, and Ta, and must have a length enough to stride the third insulating layer 19 for the following reason.

That is, in the illustrated embodiment, the first resistance layer 351 is formed by the co-process with the first shield layer 31; the second resistance layer 352 is formed by the co-process with the second shield layer 33; and the third resistance layer 353 is formed by the co-process with the first magnetic pole layer 210. Thus, the first 351, the second 352 and the third magnetic layer 353 are each formed of a magnetic material.

In this arrangement, suppose now that the conductor layer 354 was formed of a magnetic material. There will be formed a magnetic circuit running from the first magnetic pole layer 210 through the conductor layer 354 and arriving at the third 353, the second 352 and the first resistance layer 351. Then, the first 31 and the second shield layer 33 will be saturated with respect to an external magnetic field, rendering QST (quasi state test) capability worse.

To get around such a problem as mentioned above, the conductor layer 354 is herein formed of a nonmagnetic metallic material such as Cu, Ti, and Ta. From a similar point of view, a high saturation-magnetic-flux-density material layer 400 adjacent to the underside (as illustrated) of the recording gap film 24 is terminated at the position of the third insulating layer 19 in such a way as not to extend in the rear of the conductor layer 354.

Further, on the lower magnetic layer 21, the third resistance layer 353 and the conductor layer 354, there are provided a first thin-film coil 231 insulated by an insulating layer 261, the recording gap layer 24, the second magnetic pole 222, the rear junction 25, etc. The first thin-film coil 231 is covered with an organic insulating layer 262 and an inorganic insulating layer 263.

The first thin-film coil 231, the recording gap layer 24, the second magnetic pole 222, the rear junction 25 and the inorganic insulating layer 26 are flattened as by CMP processing in such a way as to make their end surfaces flush with one another into the same plane. On the thus flattened plane there is formed the second insulating film 232 while insulated by an insulating layer 264.

The second thin-film coil 232 is covered around it with an insulating layer 265 comprising such an organic insulating material as novolac resin, and on the insulating layer 265 there is formed the second magnetic pole layer 221 that forms the second magnetic layer 22. The second magnetic pole layer 221 is covered up with a protective layer 27.

In the thin-film magnetic head as described above, the first parasitic capacity C1 with the insulating layers 261-265 as a capacity layer occurs between the first and second thin-films 231, 232 and the lower magnetic layer 21, and the second parasitic capacity C2 with the third insulating layer as a capacity layer occurs between the lower magnetic layer 21 and the second shield layer 33. Likewise, the third parasitic capacity C3 with the second insulating layer 32 as a capacity layer occurs between the second shield layer 33 and the first shield layer 31, and the fourth parasitic capacity C4 with the first insulating layer 16 as a capacity layer occurs between the first shield layer 31 and the slider substrate 1 (for C1, C2, C3 and C4, for instance, see FIG. 7 and so on).

In the thin-film magnetic head according to this embodiment, the resistance R1 comprising the first 351, the second 352 and the third resistance layer 353 is connected between the lower magnetic layer 21 and the slider substrate 1 through the conductor layer 354, so that the differential voltage (V2~V4) between the terminal voltage V2 of the parasitic capacity C2 as viewed the second shield layer 33 and the terminal voltage V4 of the parasitic capacity C4 as viewed at the first shield layer 31 can be kept at a stabilized value of almost zero.

Thus, even with entrance of extraneous noises of any frequency from the slider substrate, it is possible to get around errors due to extraneous noises, because of no influences of extraneous noises, resulting in improvements in the reliability of the reproducing device.

Explanation of the Thin-Film Magnetic Head
Fabrication Process

Figure 11:
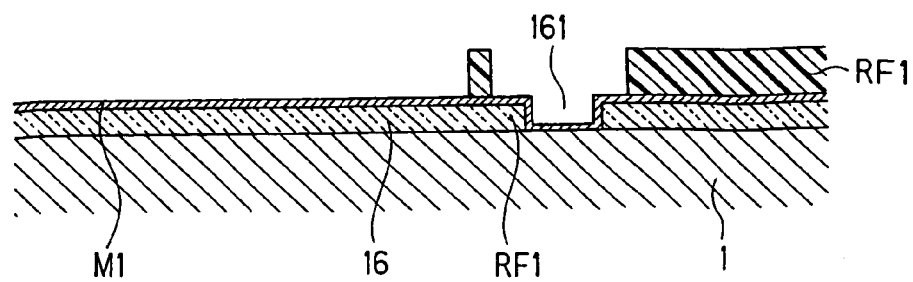
FIG. 11 is illustrative of a fabrication process step for the thin-film magnetic head depicted in FIG. 1

The process for fabricating the thin-film magnetic head depicted in FIG. 10 is now explained with reference to FIGS. 11 through 25. As depicted in FIG. 11, the first insulating layer 16 made of $Al_2O_3$ or the like is first formed by sputtering or other techniques on a slider substrate 1 formed of an AlTiC material as an example. Then, an opening 161 is provided in the first insulating layer 16 by ion milling or other techniques to form on the surfaces of the first insulating layer 16 and the opening 161 a seed electrode film M1 that becomes a plating undercoat by sputtering or other techniques. Subsequently, a resist frame RF1 is formed on the surface of the seed electrode film M1 in a given pattern.

Figure 12:
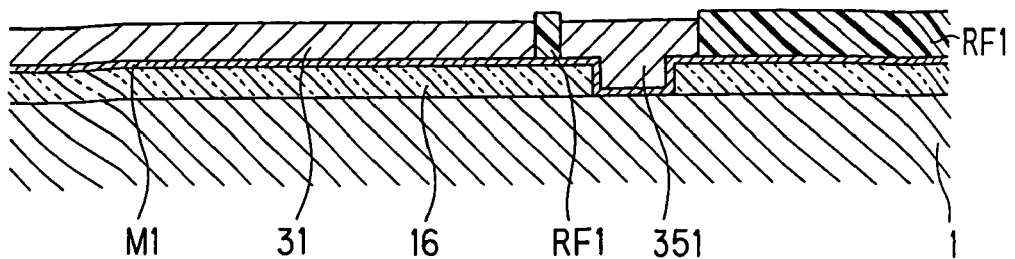
FIG. 12 is illustrative of a process step following the step depicted in FIG. 11.

Then, as depicted in FIG. 12, plating is applied to an area that is not covered with the resist frame RF1 to form the first shield layer 31 and the first resistance layer 351. The first shield layer 31 and the first resistance layer 351 are simultaneously formed by plating; they are made up of the same material.

Figure 13:
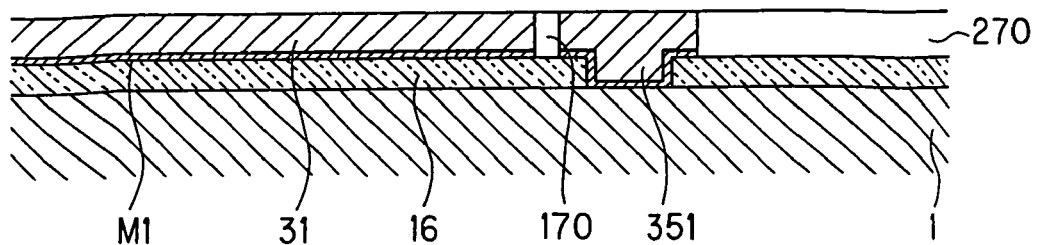
FIG. 13 is illustrative of a process step following the step depicted in FIG. 12.

Then, the resist frame RF1 is removed off by known techniques, after which portions of the seed electrode film M1 present on the bottoms of 270 and 170 are eliminated by milling or other techniques, whereby the first shield layer 31 is electrically separated from the first resistance layer 351. FIG. 13 is illustrative of a state in which the seed electrode film M1 has been removed off.

Figure 14:
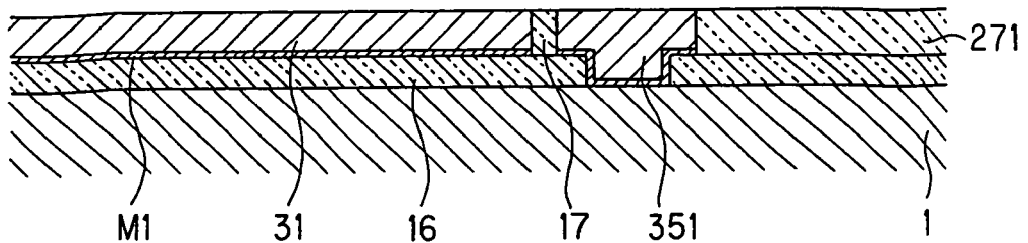
FIG. 14 is illustrative of a process step following the step depicted in FIG. 13.

After removal of the seed electrode film M1, the insulating layer 17 and the insulating layer 271 are formed all over the surface inclusive of 270 and 170 by sputtering or other techniques, after which the surface is flattened by the CMP process. FIG. 14 is illustrative of a state after the CMP flattering.

Figure 15:
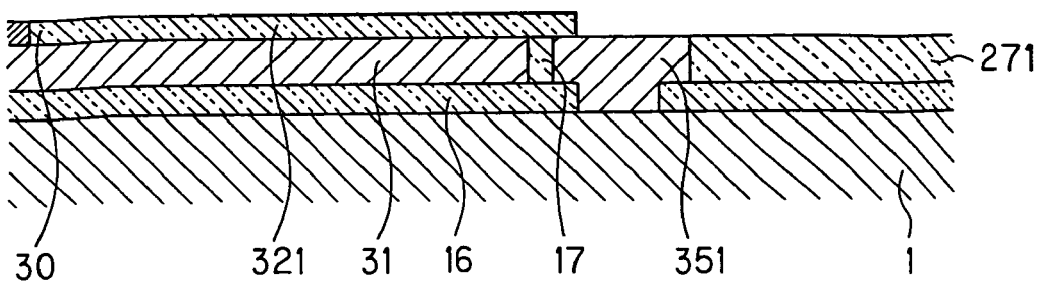
FIG. 15 is illustrative of a process step following the step depicted in FIG. 14.

Then, the insulating layer 321 and the MR device 30 are formed on the surface of the first shield layer 31, as depicted in FIG. 15. The insulating layer 321 is formed in such a way that its outer edge extends from the surface of the first shield layer 31 beyond the insulating layer 17. When the insulating layer 321 and the MR device 30 are formed, for instance, it is possible to rely upon a process that involves forming a multilayer for the MR device 30 extensively over the surface of the first shield layer 31 by the application of sputtering technique or the like, then dry etching the multilayer according to the required pattern, and finally forming the insulating layer 321 by sputtering or the like.

Figure 16:
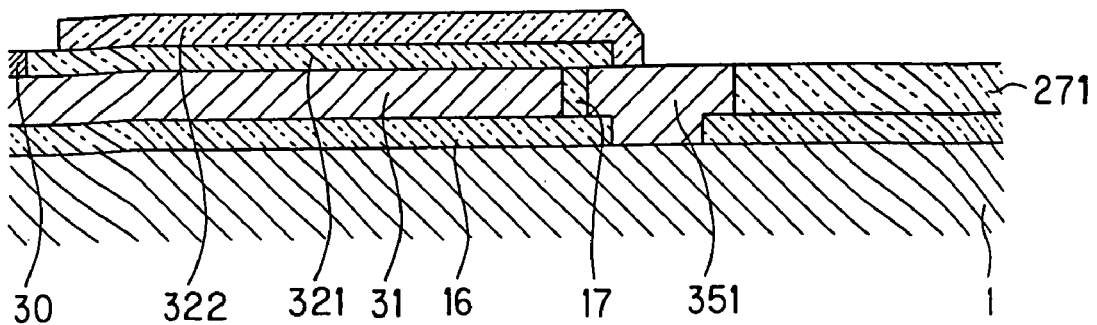
FIG. 16 is illustrative of a process step following the step depicted in FIG. 15.

Then, as depicted in FIG. 16, the insulating layer 322 that covers the insulating layer 321 is formed by sputtering or other techniques. The insulating layer 322 is located in the rear of the MR device 30 and spaced slightly away from it in such a way as not to be deposited onto the surface of the MR device 30.

Figure 17:
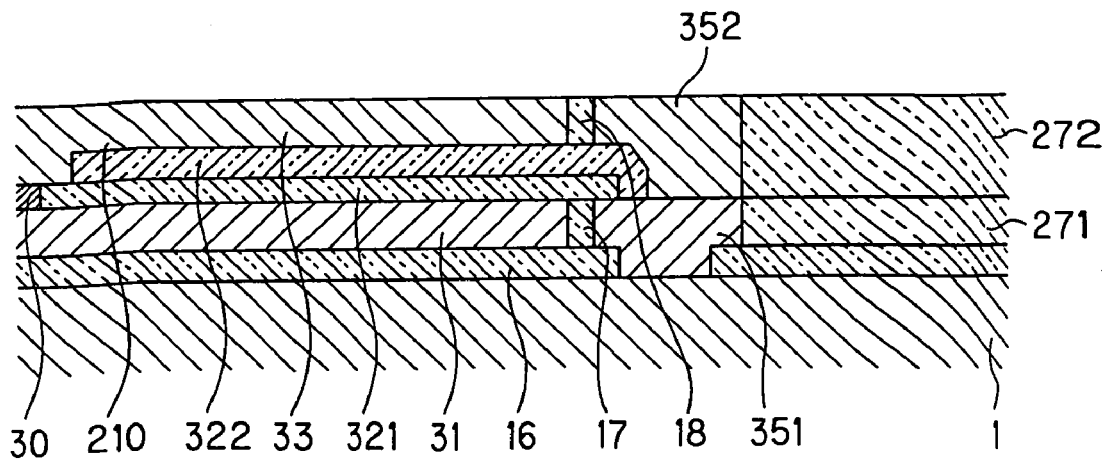
FIG. 17 is illustrative of a process step following the step depicted in FIG. 16.

Then, as shown in FIG. 17, the insulating layer 18 is formed on the insulating layer 322, and the second shield layer 33 and the second resistance layer 352 are formed outside and inside the insulating layer 18. That process is the same as in FIGS. 11-14. The insulating layer 18 is formed above the insulating layer 17 in such a way as to have the same shape as the insulating layer 17. The second shield layer 33 is connected to the MR device 30 through an opening that is not covered with the insulating layer 322, and cooperates with the first shield layer 31 to serve also as an electrode layer for the MR device 30. The second resistance layer 352 is connected to the first resistance layer 351, and insulated by the insulating layer 18 from the second shield layer 33. The second shield layer 33 and the second resistance layer 352 could be formed by the same plating process.

Figure 18:
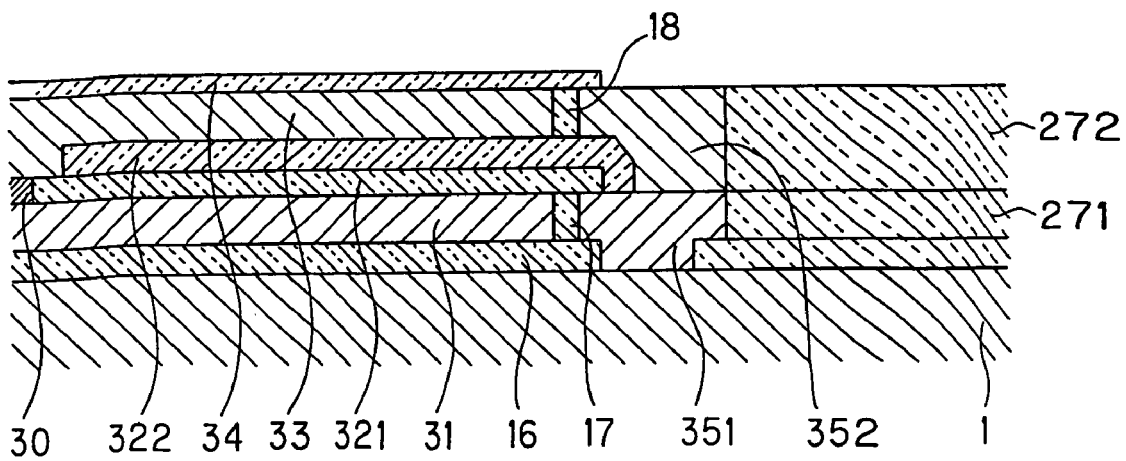
FIG. 18 is illustrative of a process step following the step depicted in FIG. 17.

Then, as depicted in FIG. 18, the third insulating layer 34 is formed. The third insulating layer 34 is formed in such a way that its outer edge extends beyond the insulating layer 18. The third insulating layer 34 could be sputtered or otherwise formed by allowing it to sprawl on the surface of the second shield layer 33 and then dry etching it according to the necessary pattern.

Figure 19:
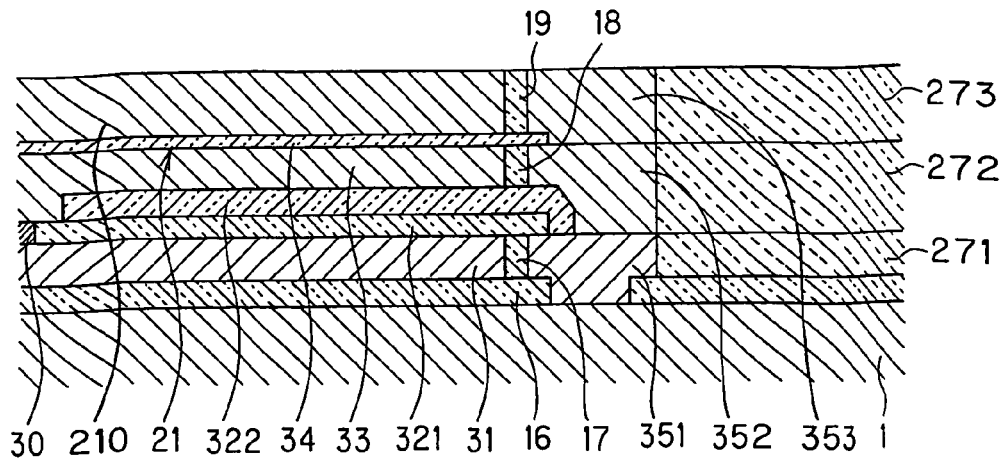
FIG. 19 is illustrative of a process step following the step depicted in FIG. 18.

Then, as depicted in FIG. 19, the insulating layer 19 is formed on the third insulating layer 34, and the first magnetic pole layer 210 and the third resistance layer 353 are formed outside and inside the insulating layer 19. That process is the same as in FIGS. 11-14. The insulating layer 19 is formed above the insulating layer 18 in such a way as to have the same shape as the insulating layer 17, 18. The third resistance layer 353 is connected to the second resistance layer 352, and insulated by the insulating layer 19 from the first magnetic pole layer 210. The first magnetic pole layer 210 and the third resistance layer 353 could be formed by the same plating process.

Figure 20:
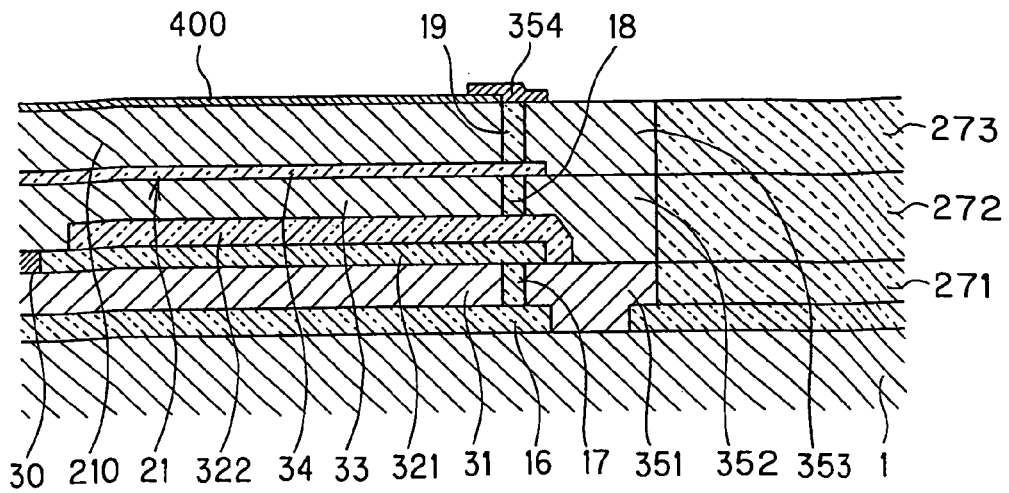
FIG. 20 is illustrative of a process step following the step depicted in FIG. 19.

Then, the surfaces of the first magnetic pole layer 210, the third insulating layer 19, the third resistance layer 353 and the insulating layer 273 are flattened by the CMP process, and the high saturation-magnetic-flux-density material layer 400 is formed on the thus flattened surface by sputtering or other techniques. Subsequently, the high saturation-magnetic-flux-density material layer 400 is patterned, followed by formation of the conductor layer 354 thereon by sputtering or other techniques, as depicted in FIG. 20. This conductor layer 354 makes an electric connection between the first magnetic pole layer 210 and the third resistance layer 353. To stay off such problems as previously stated, the conductor layer 354 is composed of a nonmagnetic metallic material such as Cu, Ti, and Ta, and must have a length enough to stride the third insulating layer 19. For similar purposes, the high saturation-magnetic-flux-density material layer 400, too, is patterned in such a way that its rear end is terminated at the position of the third insulating layer 19.

Figure 21:
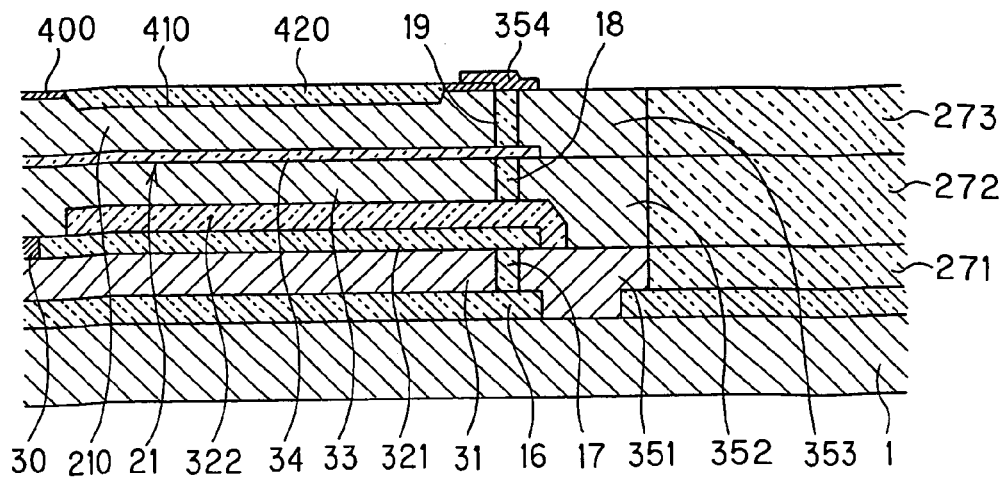
FIG. 21 is illustrative of a process step following the step depicted in FIG. 20.
Figure 22:
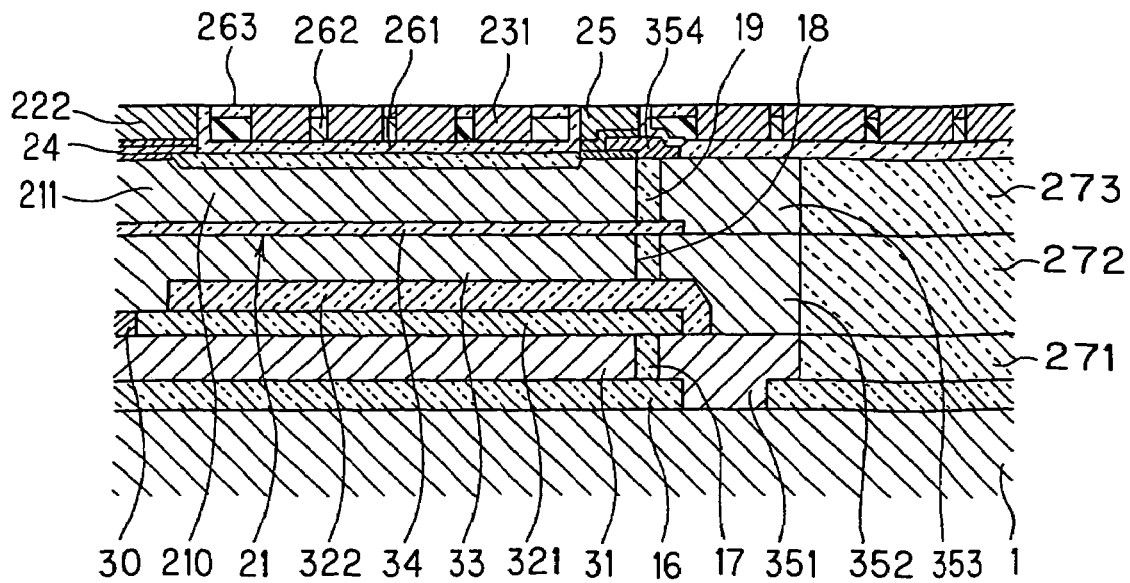
FIG. 22 is illustrative of a process step following the step depicted in FIG. 21.

Then, as depicted in FIG. 21, a trench 410 is formed in the first magnetic layer 210, and then filled in it with an inorganic insulating material 420 such as $Al_2O_3$, followed by flattening of the surface of the material by CMP or other process. Thereafter, as depicted in FIG. 22, the recording gap layer 24, the second magnetic pole 222, the first thin-film coil 231, the second magnetic pole 222, the rear junction 25, etc. are formed. The first thin-film coil 231 is electrically insulated by the insulating layer 261 from the first magnetic pole layer 210, and buried around it with the organic insulating layer 262 and the inorganic insulating layer 263.

Figure 23:
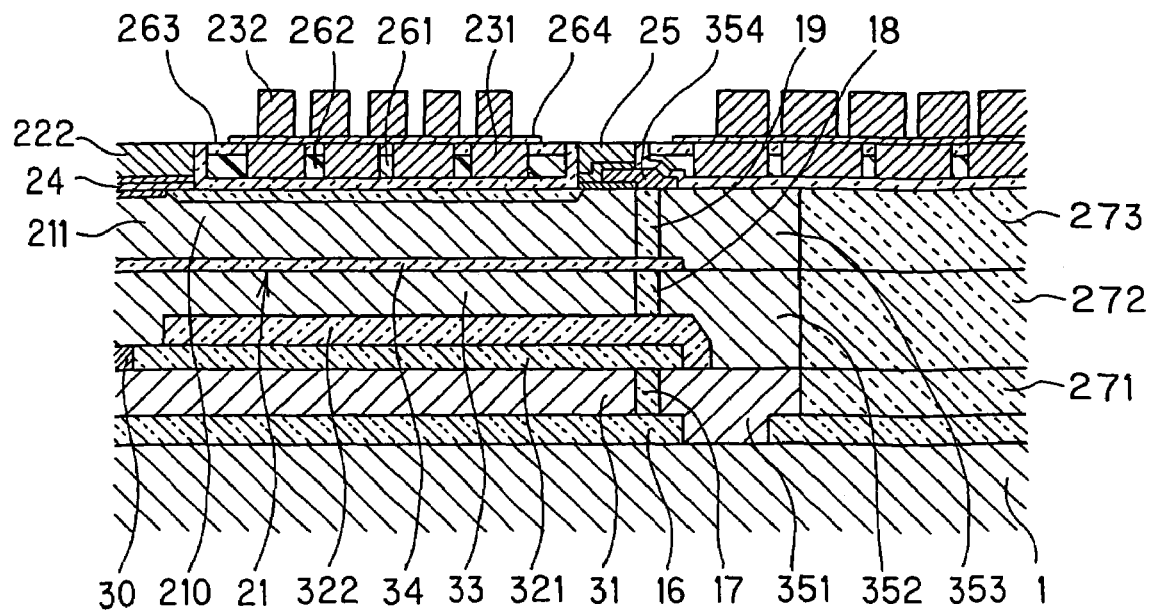
FIG. 23 is illustrative of a process step following the step depicted in FIG. 22.

Then, the first thin-film coil 231, the recording gap layer 24, the second magnetic pole 222, the rear junction 25 and the inorganic insulating layer 263 are flattened on their surfaces by CMP processing, after which, as depicted in FIG. 23, the insulating layer 264 is formed by sputtering on the flattened surface to form the second thin-film coil 232 on the surface of the insulating layer 264. The second thin-film coil 232 is formed by frame plating.

Figure 24:
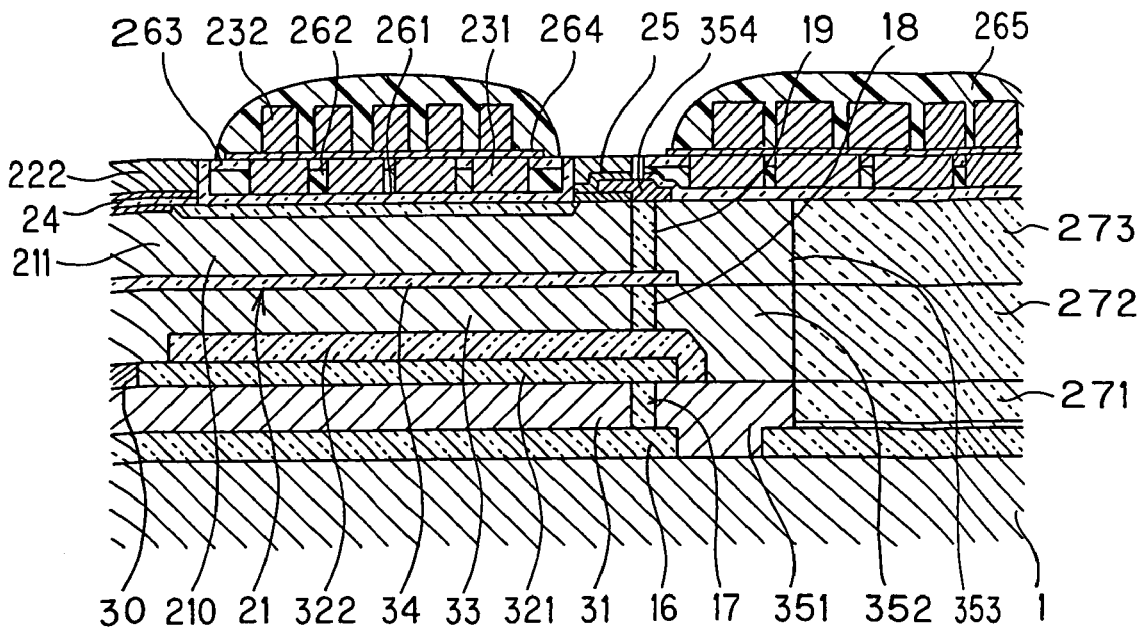
FIG. 24 is illustrative of a process step following the step depicted in FIG. 23.
Figure 25:
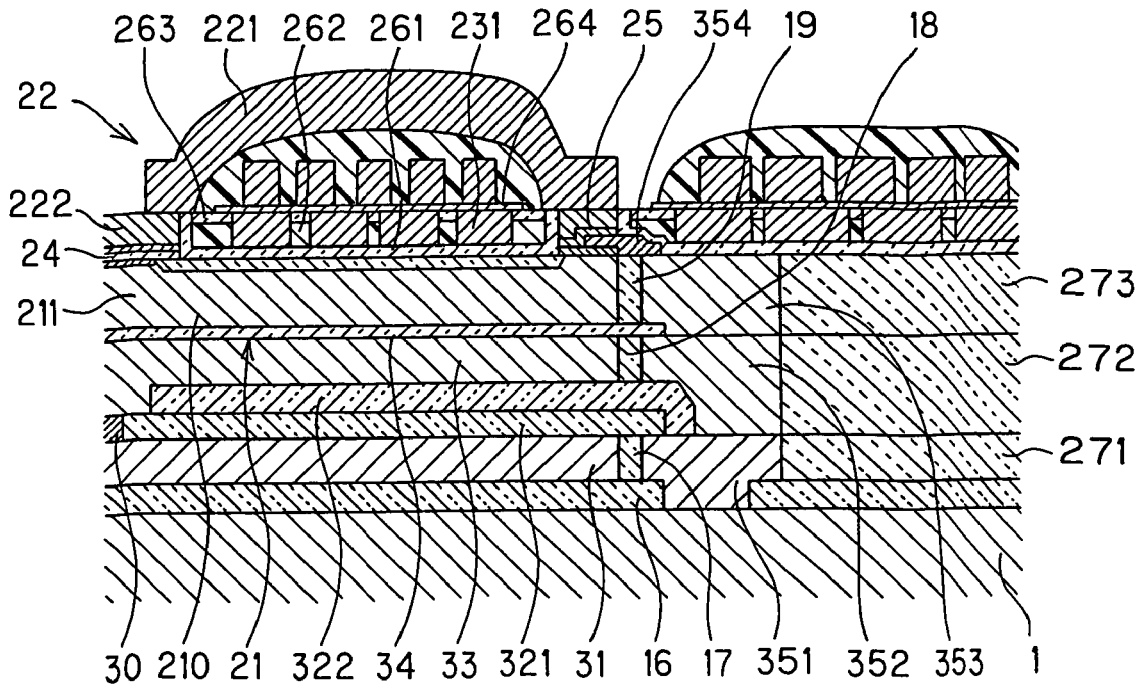
FIG. 25 is illustrative of a process step following the step depicted in FIG. 24.

After that, as depicted in FIG. 24, the organic insulating layer 265 comprising novolac resin is formed around the second thin-film coil 232. Subsequently, as depicted in FIG. 25, the second magnetic pole layer 211 is formed on the surface of the organic insulating layer 265 by frame plating. Finally, a protective layer 277 (see FIG. 10) is formed by sputtering.

In this connection, it is to be noted that the above fabrication process is only one example of those usable with the invention and carried out on wafers, and it is applicable to the fabrication of the perpendicular thin-film magnetic heads as well.

Explanation of the Magnetic Head System (Head Gimbal Assembly)

The term "magnetic head system" used herein is understood to refer to a conception encompassing a head gimbal assembly with a thin-film magnetic head mounted on a gimbal (hereinafter acronymized as HGA), a head arm assembly with an HGA mounted on an arm (hereinafter acronymized as HAA) and a head stack assembly comprising a stack of HAAs (hereinafter acronymized as HSA).

Figure 26:
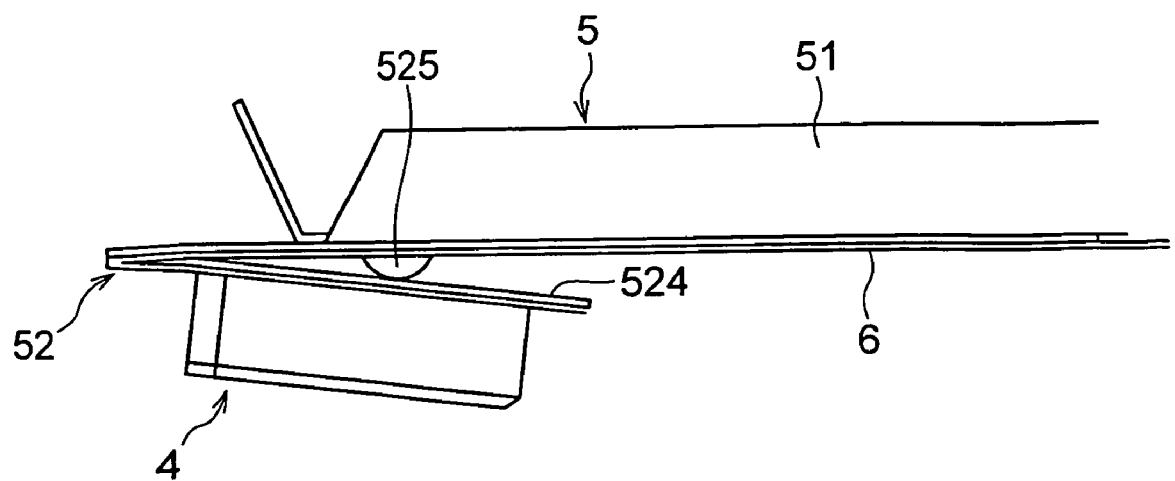
FIG. 26 is a front view showing a part of the magnetic head system.

FIG. 26 is a front view showing a part of the magnetic head system. The illustrated magnetic head system comprises the previously referred-to inventive thin-film magnetic head 4 and a head support device 5. The head support device 5 supports the thin-film magnetic head 4.

The head support device 5 supports the thin-film magnetic head 4 at one end. The head support device 5 has a structure wherein a support member 51 formed of a thin metal sheet is provided at a free end that is one end in its longitudinal direction with a flexible member again formed of a thin metal sheet, and the thin-film magnetic head 4 is mounted on the underside surface of that flexible member. Specifically, the flexible member includes a tongue piece 524 with the distal end of the support member 51 as a free end. The support member 51 is provided at its underside surface with a loading projection 525 that, for instance, is in a semicircular form. This loading projection 525 transmits loading force from the free end of the support member 51 to the tongue piece 524. The head support device 5 that is applicable to the invention is not always limited to the above embodiment; a wide spectrum of head support devices 5 that have been or will be proposed in the art could be used.

The thin-film magnetic head 4 is mounted and supported on the underside surface of the tongue piece 524 by adhesion or other means in such a way as to pitch or roll.

The head support device 5 that is applicable to the invention is not always limited to the above embodiment; a wide spectrum of head support devices 5 that have been or will be proposed in the art could be used. For instance, use could be made of a combined support member 51 and tongue piece 524 that are integrated using a flexible polymeric wire board such as a tab tape, and a combination having a gimbal structure well known so far in the art could be used as desired.

Invention Regarding the Magnetic Disk System (Hard Disk System)

The magnetic disk system according to the invention comprises a magnetic head device and a magnetic disk. This magnetic head device is the previously stated inventive magnetic head device. The magnetic disk cooperates with the magnetic head device for writing and reading of magnetic recordings.

Figure 27:
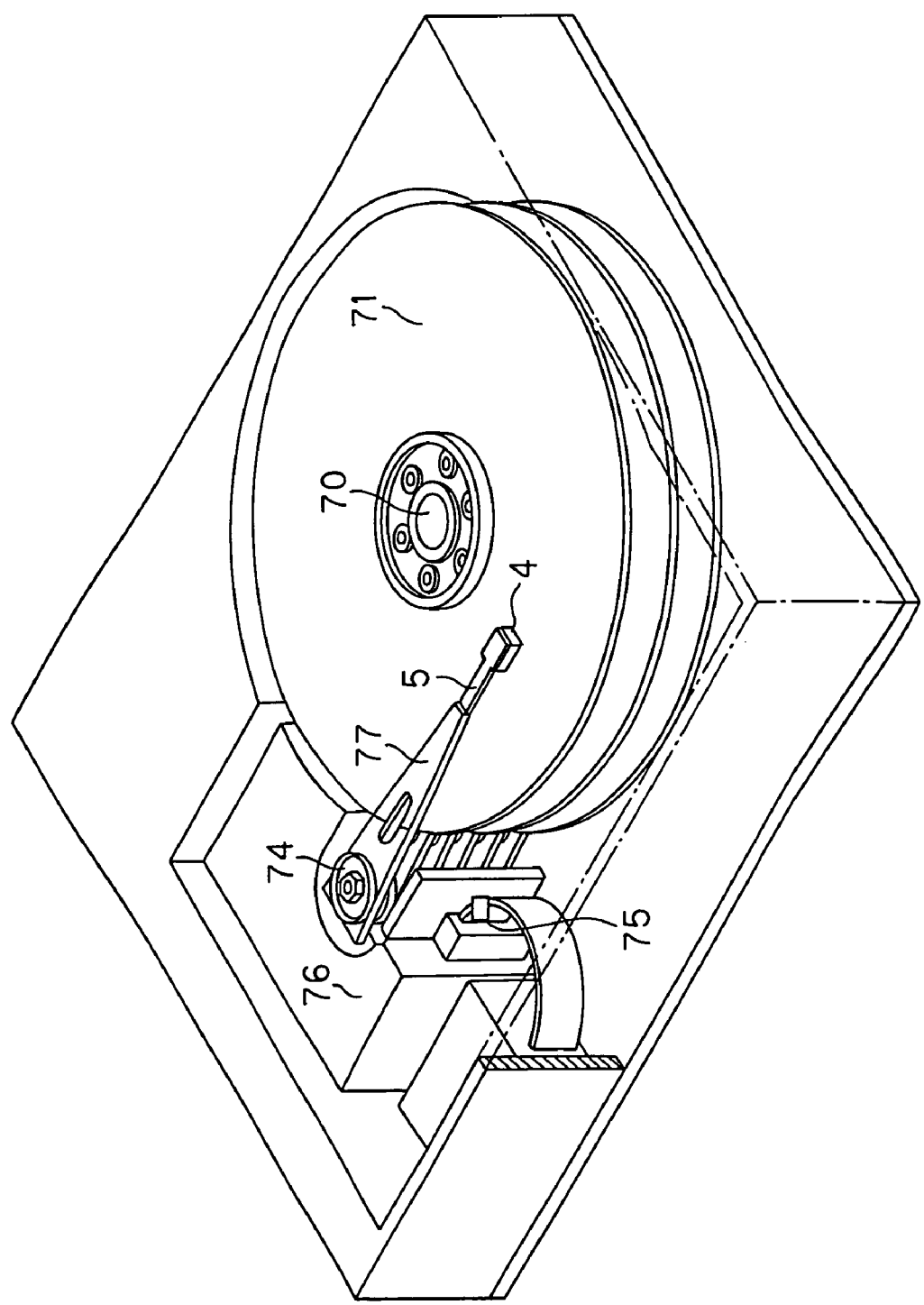
FIG. 27 is illustrative in perspective of a magnetic disk system that incorporates the magnetic head system shown in FIG. 26.

FIG. 27 is a perspective view of the magnetic disk system that incorporates the magnetic head device shown in FIG. 26. The illustrated magnetic disk system comprises a magnetic disk 71 rotatable about a shaft 70, a thin-film magnetic head 4, and an assembly carriage device for positioning the thin-film magnetic head 4 on the track of the magnetic disk 71.

The assembly carriage device is mainly constructed of a carriage 75 rotatable about a shaft 74 and an actuator 76 that comprises, for instance, a voice coil motor (VCM) to drive the rotation of the carriage 75.

The carriage 75 is provided with the proximal ends of a plurality of drive arms 77 stacked together in the direction of the shaft 74, and each drive arm 77 is fixedly provided at its distal end with the head support device 5 with the thin-film magnetic head 4 mounted on it. Each head support device 5 is located at the distal end of the drive arm 77 in such a way that the thin-film magnetic head 4 at its distal end opposes the surface of each magnetic disk 71.

While the invention has been explained specifically with reference to its preferred embodiments, it would be self-explanatory for those skilled in the art to make various modifications to them in the light of the rudimental technical ideas and teachings of the invention.

(2) Explanation of the Second Group of the Invention

The best mode for carrying out the second group of the invention is now explained with reference to the drawings.

Figure 28:
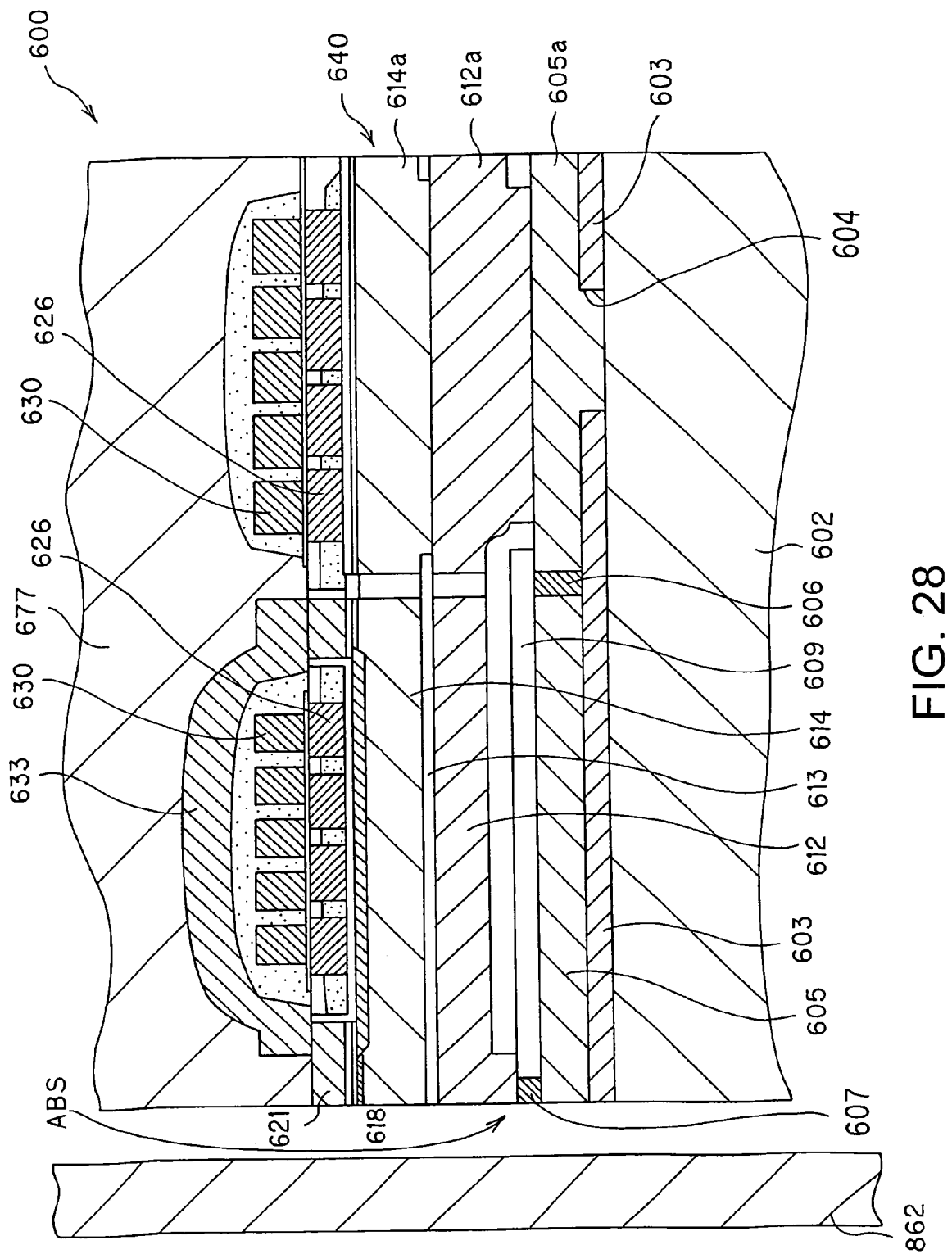
FIG. 28 is illustrative in schematic of the construction of one embodiment of the thin-film magnetic head according to the second group of the invention, showing a section of the thin-film magnetic head vertical to its ABS (air bearing surface) and substrate.
Figure 29:
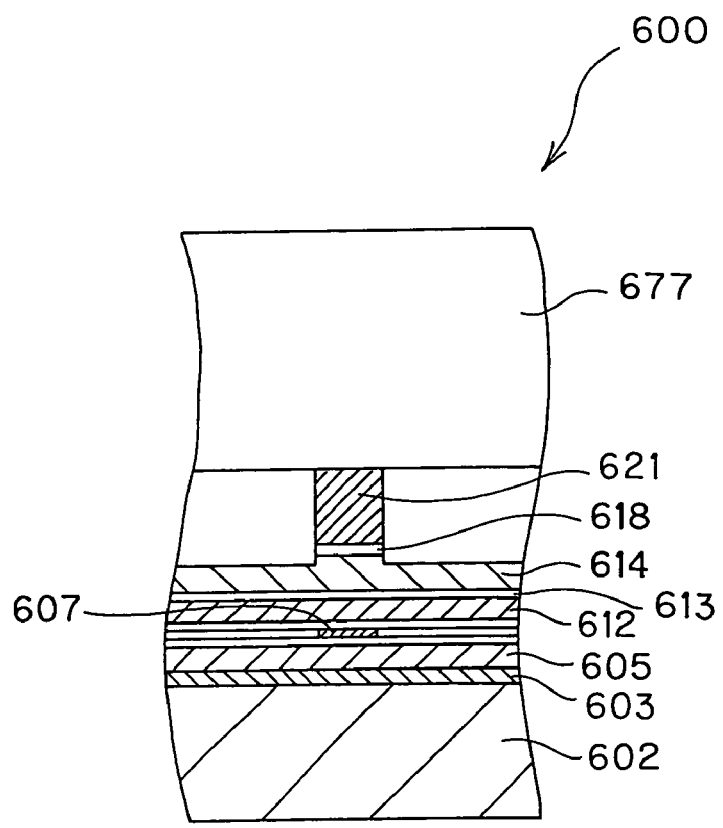
FIG. 29 is illustrative of the construction of one preferable embodiment of the thin-film magnetic head according to the invention, as viewed from its ABS side.

FIG. 28 is illustrative in schematic of the construction of the thin-film magnetic head according to one preferable embodiment of the invention, schematically showing the ABS (air bearing surface) and the section of the thin-film magnetic head perpendicular to a substrate. FIG. 29 is illustrative of the construction of the thin-film magnetic head according to one preferable embodiment of the invention, as viewed on the ABS side of the thin-film magnetic head that is in opposition to a magnetic recording medium.

As shown in FIGS. 28 and 29, a thin-film magnetic head 600 of the invention comprises a substrate 602 (usually, the so-called slider substrate), an underlay film 603 formed on the substrate 602, a lower shield layer 605 located and formed on the underlay film 603, and an upper shield layer 612 located and formed on the lower shield layer. Between the lower shield layer 605 and the upper shield layer 612, there is interposed a read magnetic head device 607 of the CPP (perpendicular to plane) structure.

The lower shield layer 605, and the upper shield layer 612 primarily functions as an electrode for passing sense currents through the read magnetic head device 607 of the CPP (current perpendicular to plane) structure in the stacking direction, and as a magnetic shield against the read magnetic head device 607.

Further, above the upper shield layer 612 there is formed a lower magnetic pole layer 614 for a write magnetic head device that constitutes a write-only induction type magnetic conversion device. The lower magnetic pole layer 614 is combined with upper magnetic pole layers (indicated by reference numerals 621, 633, etc.) including a pole 621, thereby setting up a substantially closed magnetic path for write purposes via a gap layer 618. This lower magnetic pole layer 614 also functions as a magnetic shield.

No particular limitation is placed on how many thin-film coil layers are used for magnetic induction for the write magnetic head device; however, two double-layer coil structures 626 and 630 are ordinarily used. Each double-layer coil structure will be easily understood from the step-by-step explanation of the fabrication process given later.

In the write or read mode as shown in FIG. 28, the thin-film magnetic head 600 is levitated from the surface of a magnetic disk 862 in rotation with a hydro-dynamically predetermined gap.

Between the lower shield layer 605 and the read magnetic head device 607, and between the read magnetic head device 607 and the upper shield layer 612, there is usually provided a gap layer formed of alumina or the like. In FIG. 28, notice that reference numeral 677 stands for an overcoat. In the invention, a heat generator for the so-called thermal distortion balance could be used, although it is not essential.

Referring here to part of the thin-film magnetic head 600 of the invention, at a site (in the opposite direction of the ABS that is a write/read side) in the rear of the lower shield layer 605, the upper shield layer 612 and the lower magnetic pole layer 614, there is provided a heat sink layer 640 for escape of heat generated in the head to the substrate 602 side. The heat sink layer 640 is substantially connected by a connection member or connection bar 631 to the lower magnetic pole layer 614 for the write magnetic head device, and the lower magnetic pole layer 614 is electrically connected to the substrate 602 via the heat sink layer 640.

It is here to be noted that the structure of the connection member or connection bar 631 is not shown in the center section of FIG. 28. For the details of that connection structure, therefore, see the explanation of the process of fabricating the structure of part of the thin-film magnetic head, given later. More exactly, that connection structure is shown in FIGS. 57-59.

The heat sink layer 640 has a primary function of letting the heat generated in the head go toward the substrate via protective films (overcoat layer, alumina layer).

The heat sink layer 640 is made up of a heat sink multilayer structure (indicated by reference numerals 605a, 612a and 614a in FIGS. 28 and 29) substantially separated from the lower shield layer 605, the upper shield layer 612 and the lower magnetic pole layer 614 during the fabrication process. The members 605a, 612a and 614a are built up of the same materials as the upper shield layer 612 and the lower magnetic pole layer 614, respectively. The corresponding same material is concurrently formed in a film form.

It is noted that the heat sink layer 640 is connected to the substrate 602 by a material filled in a contact hole 4 formed by removal of the underlay film 603 at a given site and indicated by reference numeral 605a.

In FIG. 28, the connection bar 631 is not drawn as mentioned above, because it is not present at a center section position. Referring now in detail to that connection, connection sites for connecting the lower magnetic pole layer 612 to the heat sink layer 640 (614a) are each formed upon formation of the upper magnetic pole layer 621 to be formed on the lower magnetic pole layer 614, and those connection sites are connected together by the connection bar 631 formed of the same material as the coil-formation member, whereby the lower magnetic pole layer 621 and the substrate 602 are connected together via the heat sink layer 640.

Although it appears difficult to have a quick understanding of such a structure from FIG. 28, those skilled in the art could have an easy understanding of it from the step-by-step explanation of the fabrication process given later. Whatever connection form is adopted, the lower magnetic pole layer 614 for the write magnetic head device is substantially connected by the connection bar 631 to the heat sink layer 640.

The use of such part structure of the invention ensures far more enhanced advantages: adverse influences of extraneous noises entering the slider substrate 602 from outside are stayed off even when the underlay film 603 formed on the (slider) substrate 602 is slimmed down, and transmission of heat to the magneto resistive effect device side is reduced as much as possible by an enhanced heat radiation effect to the substrate side.

Such advantages, especially prevention of adverse influences of extraneous noises may be described with reference to the phenomenal mode representation of FIG. 30. That is, when the underlay film 603 is slimmed down, there is a parasitic capacity C4 between the lower shield layer 605 and the substrate 602. Usually, without any protective action taken, noises entering from the slider substrate 602 will become more on the side of the lower shield layer 605 functioning as an electrode, resulting in superimposition on output signals upon amplification by a preamplifier.

Figure 36:
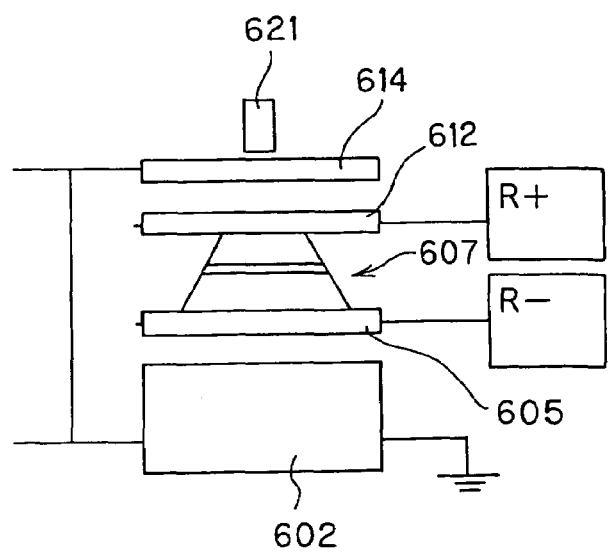
FIG. 36 is a simplified multilayer structure illustration of in what state a lower magnetic pole layer and a substrate are connected together.

According to the invention, such a problem is solved by making an electric connection between the lower magnetic pole layer 614 and the substrate 602 of the write magnetic head device. Consequently, there is a parasitic capacity C2 between the upper shield layer 612 and the lower magnetic pole layer 614. If, in this case, specifications are set such that the parasitic capacity C2 is substantially equal to the parasitic capacity C4, then it is possible to prevent adverse influences of extraneous noises. The value of C2/C4 that is the C2/C4 ratio should more specifically range from 0.6 to 1.4 inclusive, preferably from 0.8 to 1.2 inclusive. FIG. 36 is illustrative of a more simplified multilayer structure showing the state of connection.

The thickness of the underlay film 103 should desirously be reduced as much as possible; it should be 0.05 to 1 μm, preferably 0.05 to 0.6 μm, more preferably 0.05 to 0.4 μm. As the thickness of the underlay film 603 is greater than 1 μm, the significance of the construction of part of the invention will become tenuous. The thickness of the underlay film 603 being less than 0.05 μm will get rid of the effect itself of the provision of the underlay film Such an underlay film 603 could be formed of a nonmagnetic material such as $Al_2O_3$, and $SiO_2$.

The read magnetic head device of the CPP structure used herein includes a CPP-giant magneto resistive (GMR) effect device, and a tunnel magneto resistive (TMR) effect device.

For the substrate 602 in the invention, for instance, use is made of AlTiC ($Al_2O_3$—TiC).

The lower shield layer 605 and the upper shield layer 612 in the invention, for instance, are each formed of FeAlSi, NiFe, CoFe, CoFeNi, FeN, FeZrN, FeTaN, CoZrNb, and CoZrTa, and provided by sputtering, plating or other techniques with a thickness of about 1.5 to 3.0 μm. The lower magnetic pole layer 614, for instance, is formed of FeAlSi, NiFe, CoFe, CoFeNi, FeN, FeZrN, FeTaN, CoZrNb, and CoZrTa, and provided by sputtering, plating or other techniques with a thickness of about 1.5 to 5.0 μm.

To have a clear understanding of the structure of part of the invention, the process of fabricating that structure of part is now explained step by step.

Explanation of the Structure of Part of the Thin-Film Magnetic Head of the Invention The process of fabricating the structure of part of the thin-film magnetic head according to the invention is now explained step by step with reference to FIGS. 37-59. In each drawing, (A) at the upper half of the paper is a plan view and (B) at the lower half is a schematic section taken on line α-α' of that plan view.

(1) Formation of the Contact Hole in the Substrate

Figure 37A:
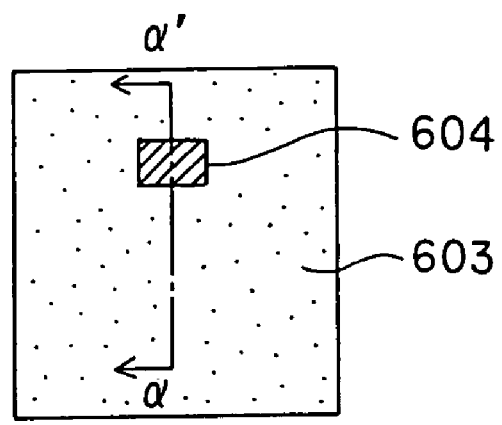
FIG. 37(A) is a plan view for illustrating the fabrication process for the structure of part of the thin-film magnetic head according to the invention.
Figure 37B:
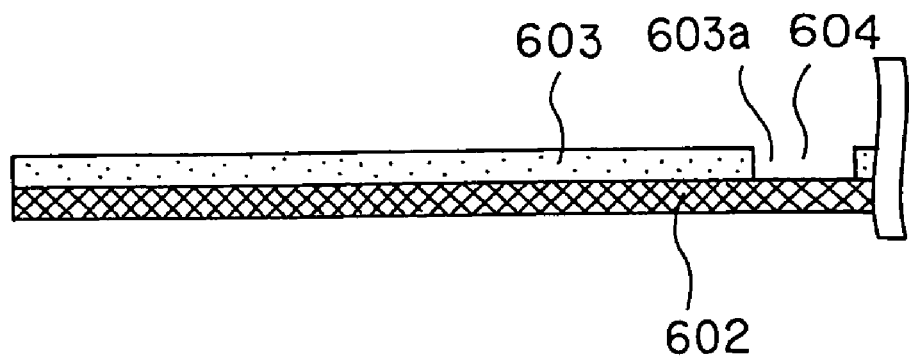
FIG. 37(B) is a schematic section of FIG. 37(A).

As depicted in FIGS. 37(A) and 37(B), an underlay film 603 formed typically of $Al_2O_3$ is provided on a slider substrate 602 formed typically of AlTiC material, followed by removal of an $Al_2O_3$ underlay film 603a at a given site to form a contact hole 604.

Specifically, the $Al_2O_3$ underlay film 603 is formed on the AlTiC slider substrate 2. Then, the photoresist technique is applied in such a way as to expose a portion of the contact hole 604. Then, the $Al_2O_3$ underlay film 603a corresponding to the portion of the contact hole 604 is etched out. Finally, the resist is stripped off.

(2) Formation of the Lower Shield Layer

Figure 38A:
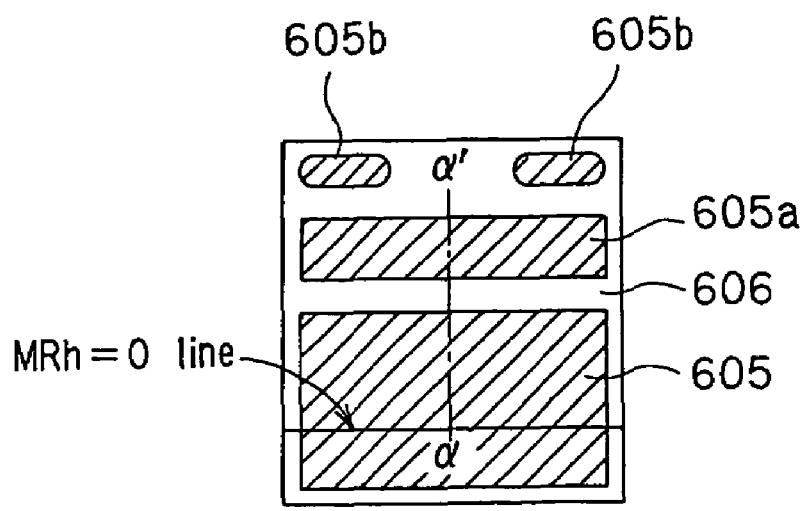
FIG. 38(A) is a plan view for illustrating the fabrication process for the structure of part of the thin-film magnetic head according to the invention.
Figure 38B:
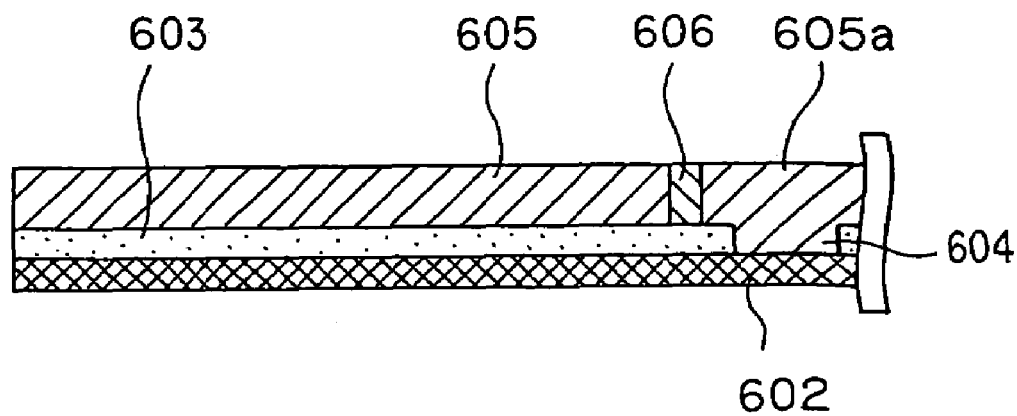
FIG. 38(B) is a schematic section of FIG. 38(A).

As depicted in FIGS. 38(A) and 38(B), a plating undercoat electrode film is formed all over the surface. Then, the photoresist technique is applied to form the lower shield portion 605, heat sink portion 605a and connection electrode portion 605b of the magnetic head. Then, plating is carried out and the resist is stripped off, followed by removal of the primer electrode film. Finally, an $Al_2O_3$ insulating film is formed all over the surface, followed by CMP processing. In this way, the lower shield portion, heat sink portion and connection electrode portion of the magnetic head are formed while they are separated by the insulating film 606 from one another, as depicted in FIG. 38(B).

It is here noted that the portion of the contact hole 604 is filled with the lower shield layer material, so that the heat sink portion 605a is in conduction to the substrate 602.

In FIG. 38(A), an MR height=0 line (MRh=0 line) is drawn. The MR height is indicative of the depth dimension of a reproducing head necessary to obtain proper characteristics for it. The position of MR height=0 defines the rear end of this MR height opposite to the ABS.

(3) Formation of the Read Magnetic Head Device Film of the CPP Structure

Figure 39A:
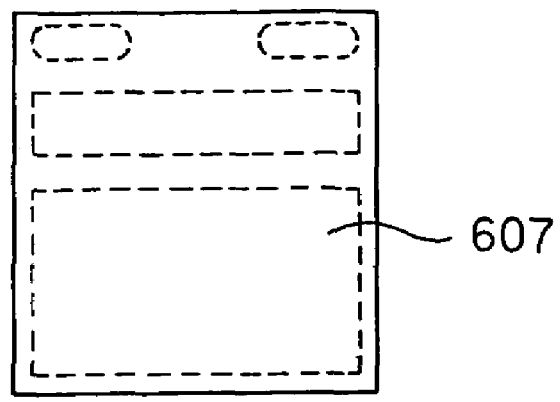
FIG. 39(A) is a plan view for illustrating the fabrication process for the structure of part of the thin-film magnetic head according to the invention.
Figure 39B:
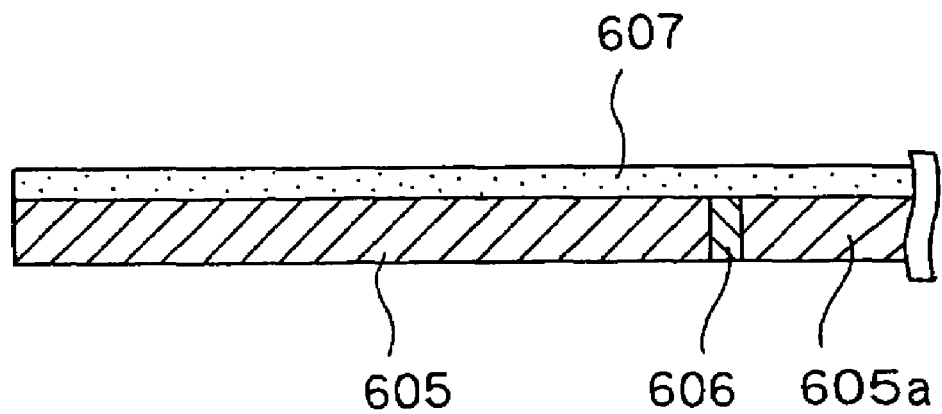
FIG. 39(B) is a schematic section of FIG. 39(A).

As depicted in FIGS. 39(A) and 39(B), for instance, a TMR film 607 that is a read magnetic head device film of the CPP structure is formed. It is here noted that the TMR film is drawn in a simple single-layer film form, although it has usually a multilayer structure, and that throughout FIGS. 39-59, the structure of portions below the lower shield layer 605 (the substrate 602 and underlay film 603 in FIG. 38) are not shown.

(4) Formation of the Through Hole

Figure 40A:
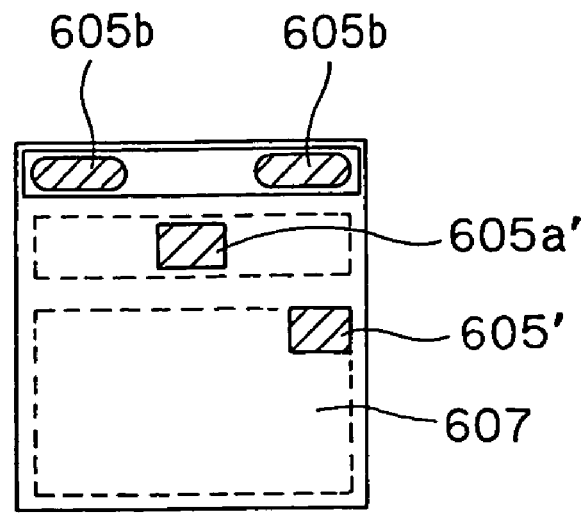
FIG. 40(A) is a plan view for illustrating the fabrication process for the structure of part of the thin-film magnetic head according to the invention.
Figure 40B:
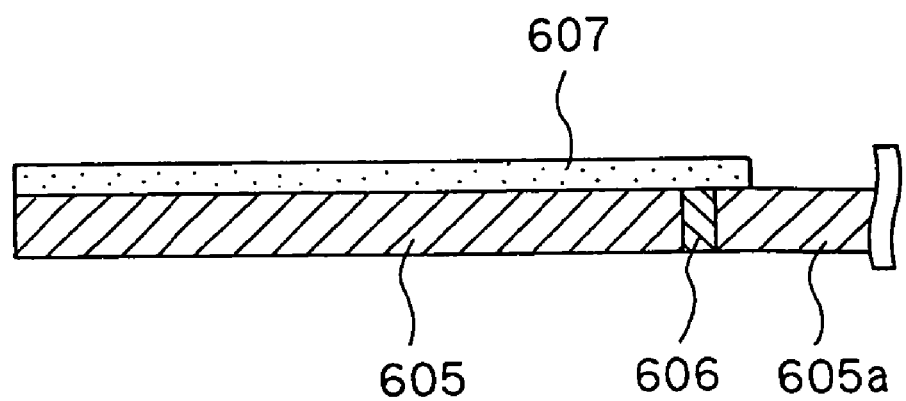
FIG. 40(B) is a schematic section of FIG. 40(A).

As depicted in FIGS. 40(A) and 40(B), the photo-resist technique is applied in a given pattern, milling is carried out, and the resist is stripped off to expose a corner portion 605' of the lower shield portion 605, an almost center portion 605a' of the heat sink portion and connection electrode portions 605b in the magnetic head, respectively.

(5) Formation of the Track Width

Figure 41A:
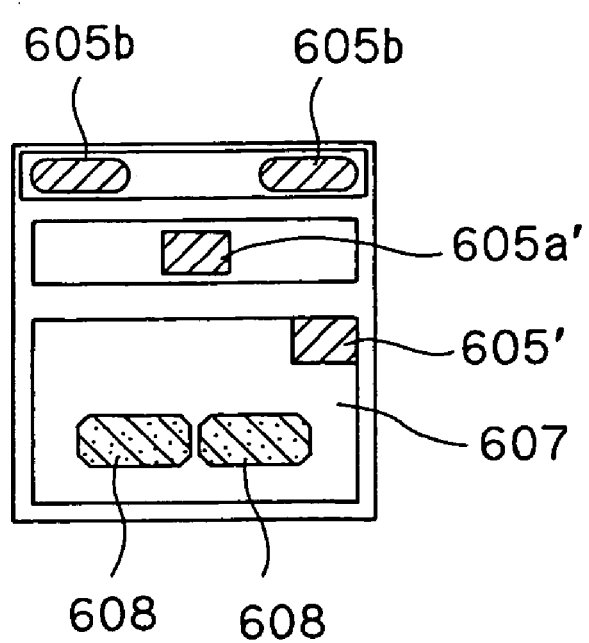
FIG. 41(A) is a plan view for illustrating the fabrication process for the structure of part of the thin-film magnetic head according to the invention.
Figure 41B:
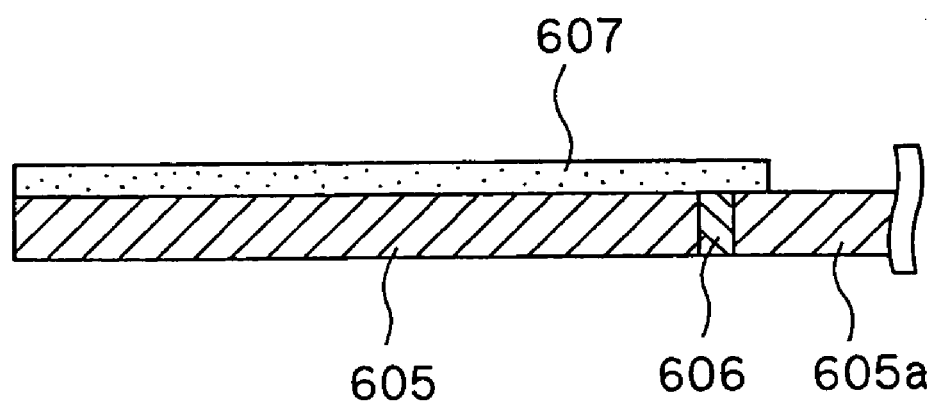
FIG. 41(B) is a schematic section of FIG. 41(A).

As depicted in FIGS. 41(A) and 41(B), the photo-resist technique is applied in a given pattern, milling is then performed in such a way as to define the track width of the TMR device, an insulating film/hard magnetic film 608 (layer for the application of bias to the TMR device) is formed, and liftoff is finally carried out.

(6) Formation of the MR Height

Figure 42A:
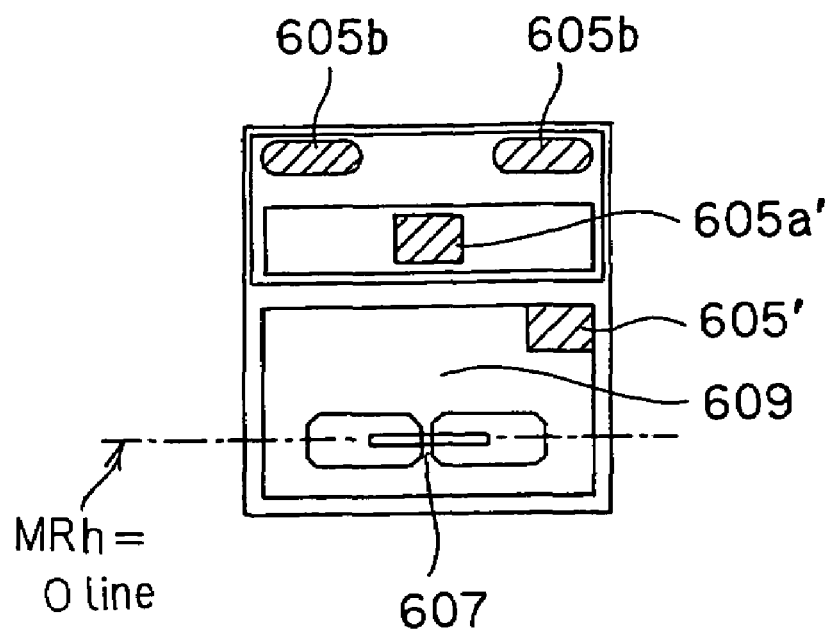
FIG. 42(A) is a plan view for illustrating the fabrication process for the structure of part of the thin-film magnetic head according to the invention.
Figure 42B:
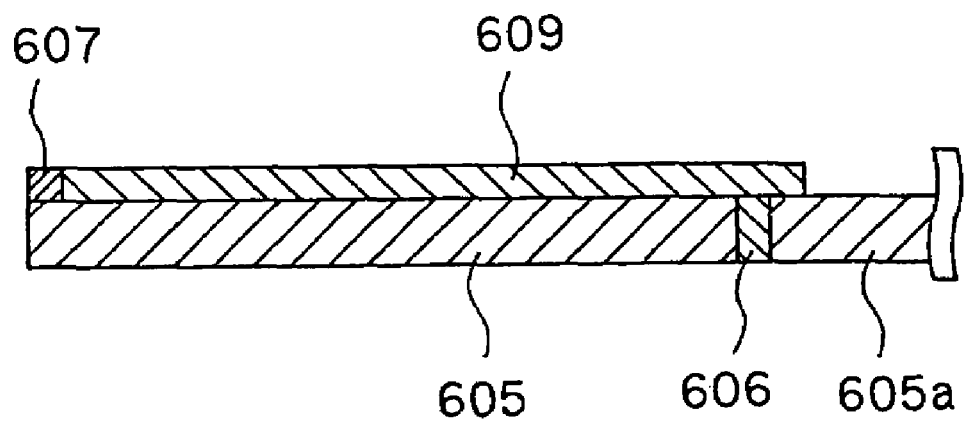
FIG. 42(B) is a schematic section of FIG. 42(A).

As depicted in FIGS. 42(A) and 42(B), the photo-resist technique is applied in a given pattern, milling is then carried out in such a way as to define the so-called MR height of the TMR device, an insulating layer 609 is then formed, and liftoff is finally done.

(7) Formation of the Leads

Figure 43A:
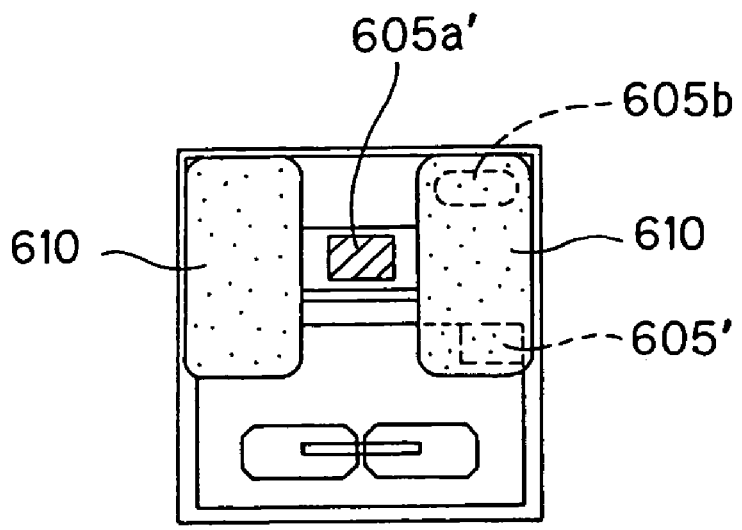
FIG. 43(A) is a plan view for illustrating the fabrication process for the structure of part of the thin-film magnetic head according to the invention.
Figure 43B:
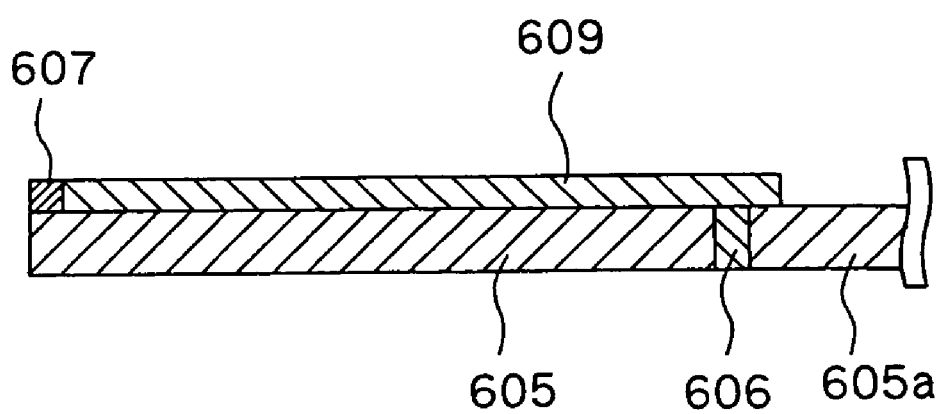
FIG. 43(B) is a schematic section of FIG. 43(A).

As depicted in FIGS. 43(A) and 43(B), the photo-resist technique is applied in such a given pattern as to form leads, thereby forming lead films 610, followed by liftoff. The corner portion 605' of the lower shield portion 605 is connected by the right lead 610 in FIG. 43(A) to the right connection electrode portion 605b in FIG. 43(A).

(8) Formation of the Lead Cover

Figure 44A:
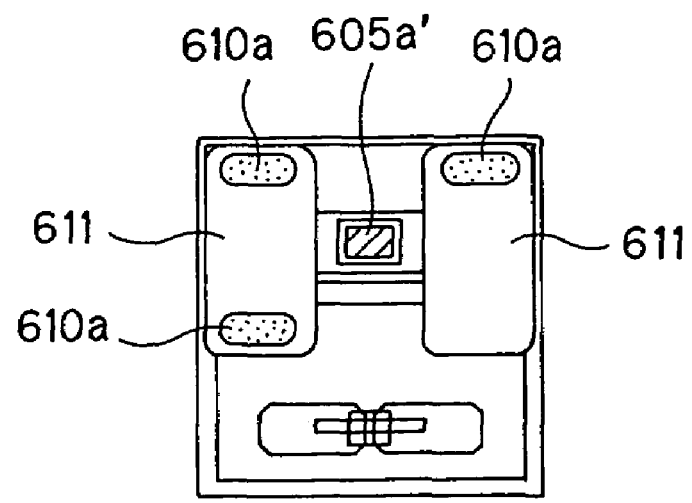
FIG. 44(A) is a plan view for illustrating the fabrication process for the structure of part of the thin-film magnetic head according to the invention.
Figure 44B:
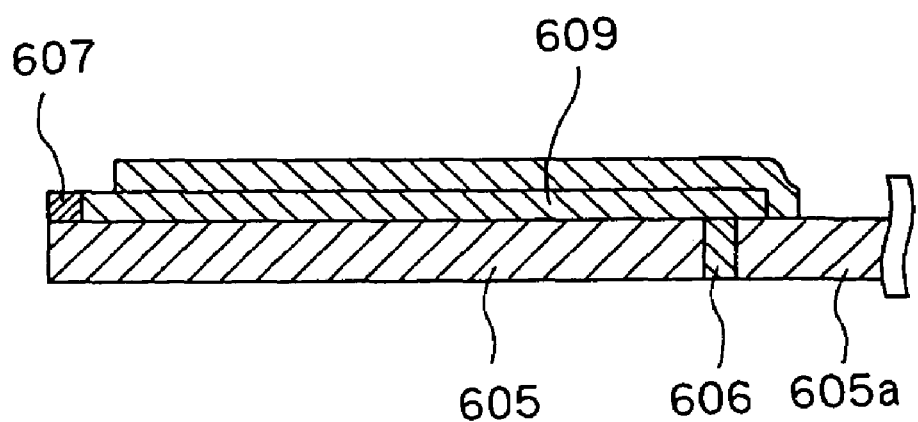
FIG. 44(B) is a schematic section of FIG. 44(A).

As depicted in FIGS. 44(A) and 44(B), the photo-resist technique is applied in such a given pattern as to form a lead cover, thereby forming an insulating film for a lead cover 611, followed by liftoff. As depicted in FIG. 44(A), three lead portions 610a are exposed, and an almost center portion 605a' of the heat sink portion is exposed as well.

(9) Formation of the Upper Shield Layer

Figure 45A:
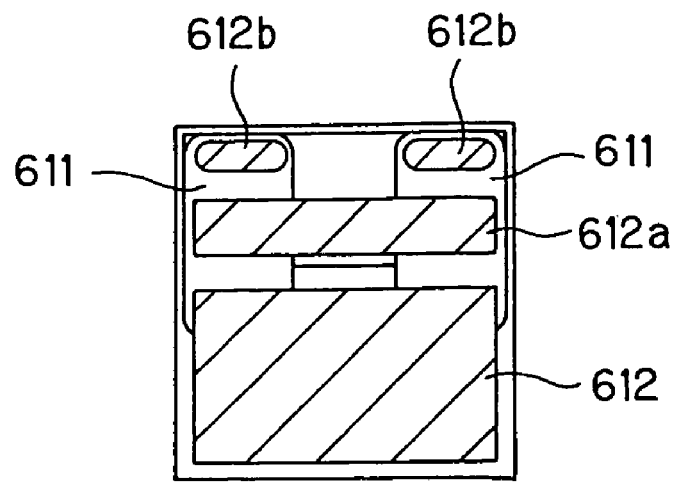
FIG. 45(A) is a plan view for illustrating the fabrication process for the structure of part of the thin-film magnetic head according to the invention.
Figure 45B:
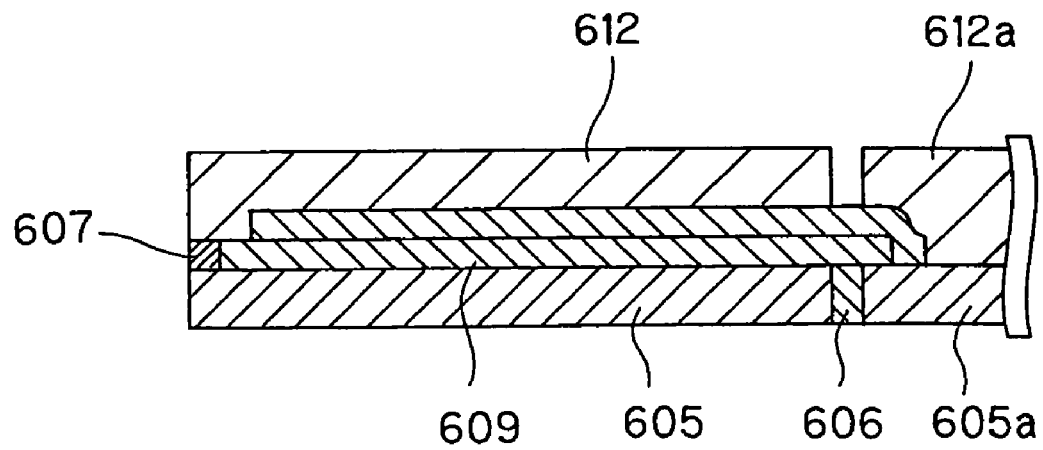
FIG. 45(B) is a schematic section of FIG. 45(A).

As depicted in FIGS. 45(A) and 45(B), a plating undercoat electrode film is formed all over the surface. The photoresist technique is then applied to form the upper shield portion 612, heat sink portion 612a and connection electrode portion 612b of the magnetic head. Plating is then performed and the resist is stripped off, followed by removal of the undercoat electrode film. In this way, the upper shield portion 612, the heat sink portion 612a and the connection electrode portion 612b are formed in a separate fashion.

(10) Formation of the Shield-to-Shield Gap

Figure 46A:
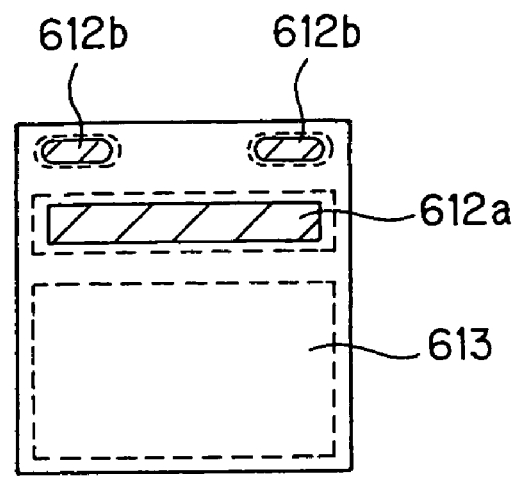
FIG. 46(A) is a plan view for illustrating the fabrication process for the structure of part of the thin-film magnetic head according to the invention.
Figure 46B:
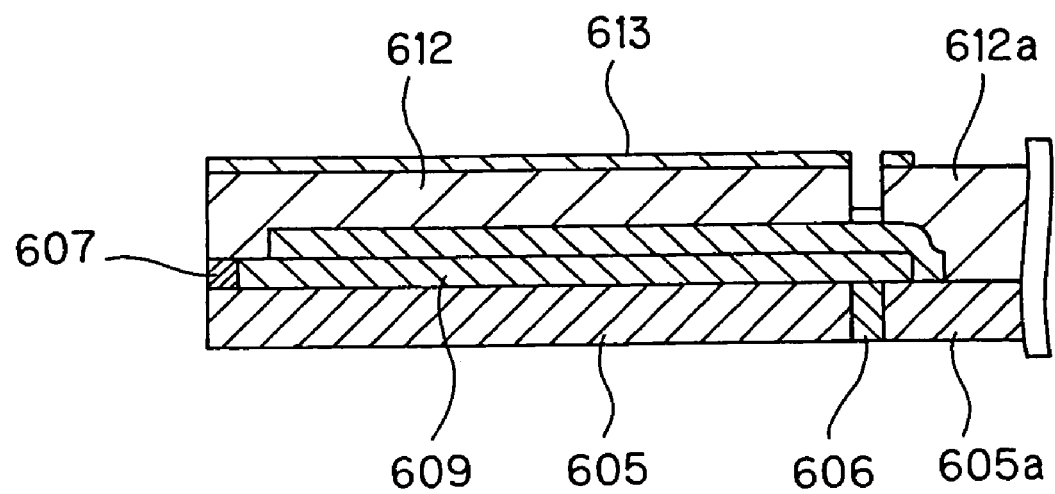
FIG. 46(B) is a schematic section of FIG. 46(A).

As depicted in FIGS. 46(A) and 46(B), an $Al_2O_3$ insulating film is formed as a shield-to-shield gas layer 613 all over the surface. The photoresist technique is then applied for milling in such a way as to expose a substantial portion of the heat sink except its peripheral edge and a substantial portion of the connection electrode (612a and 612b in FIGS. 46(A) and 46(B)). Finally, the resist is stripped off.

(11) Formation of the Upper Second Shield (the Lower Magnetic Pole Layer of the Write Magnetic Head Device)

Figure 47A:
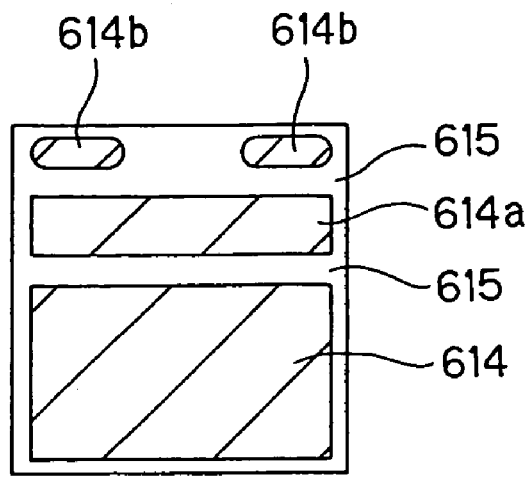
FIG. 47(A) is a plan view for illustrating the fabrication process for the structure of part of the thin-film magnetic head according to the invention.
Figure 47B:
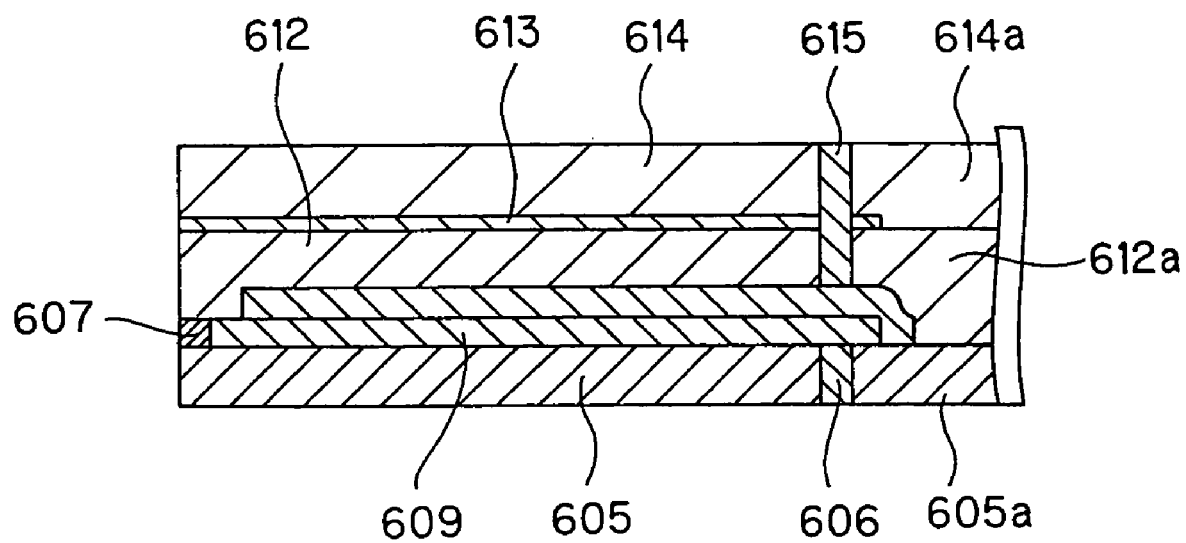
FIG. 47(B) is a schematic section of FIG. 47(A).

As depicted in FIGS. 47(A) and 47(B), a plating undercoat electrode film is formed all over the surface. The photoresist technique is then applied to form a lower magnetic pole portion 614, a heat sink portion 614a and a connection electrode portion 614b for the write magnetic head. Plating is then carried out and the resist is stripped of, followed by removal of the undercoat electrode film. After that, the resist is stripped off, and an $Al_2O_3$ insulating film 615 is formed all over the surface, followed by CMP processing. In this way, the lower magnetic pole portion, heat sink portion and connection electrode portion for the write magnetic head are formed while they are separated by the insulating film 615 from one another, as depicted in FIG. 47(B).

In the heat sink portion in the FIG. 47 state, electric connection is made from the substrate 602 to the heat sink portion 614a.

(12) Padding of the High-Bs Material

Figure 48A:
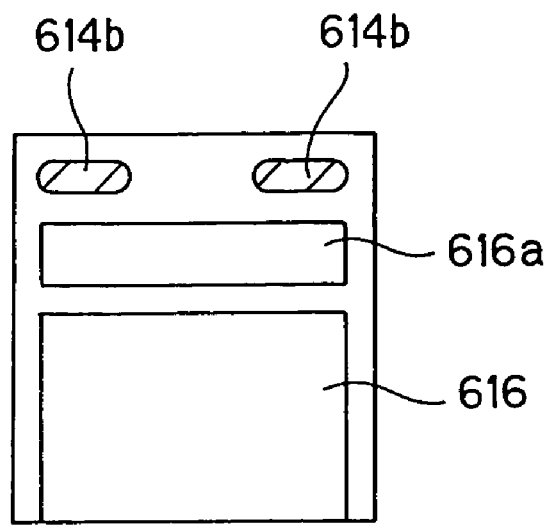
FIG. 48(A) is a plan view for illustrating the fabrication process for the structure of part of the thin-film magnetic head according to the invention.
Figure 48B:
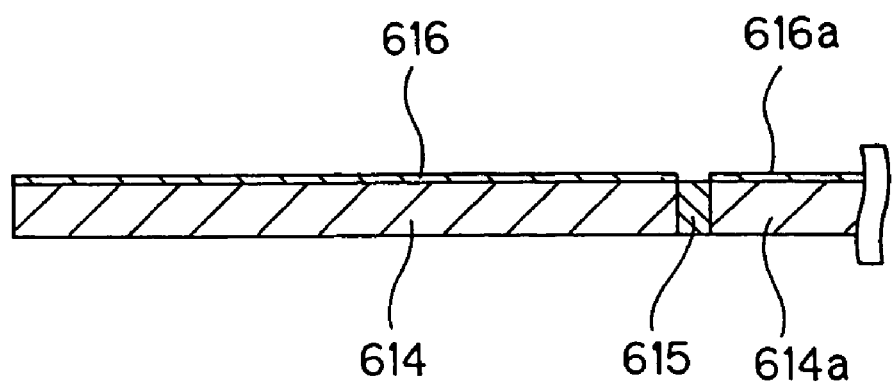
FIG. 48(B) is a schematic section of FIG. 48(A).

As depicted in FIGS. 48(A) and 48(B), the photo-resist technique is applied to form high-Ba materials 616 and 616a, each in a film form, on a lower magnetic pole portion 614 and a heat sink portion 614a for the write magnetic head, respectively, followed by liftoff.

Throughout FIGS. 48-59, the structures of parts below the lower magnetic pole layer (upper second shield layer) of the write magnetic head device are not shown.

(13) Formation of the Trench

Figure 49A:
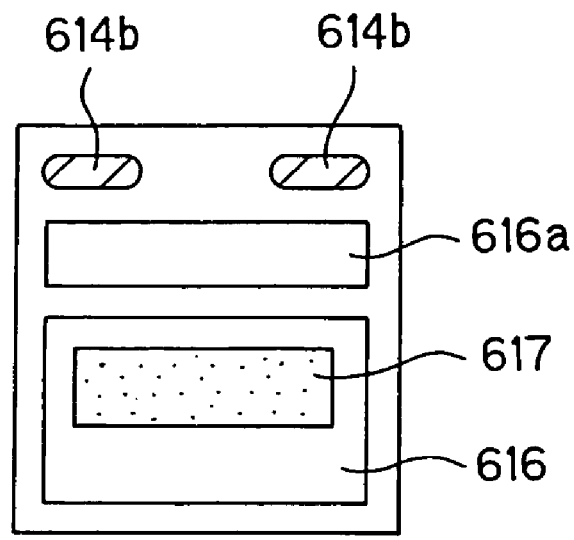
FIG. 49(A) is a plan view for illustrating the fabrication process for the structure of part of the thin-film magnetic head according to the invention.
Figure 49B:
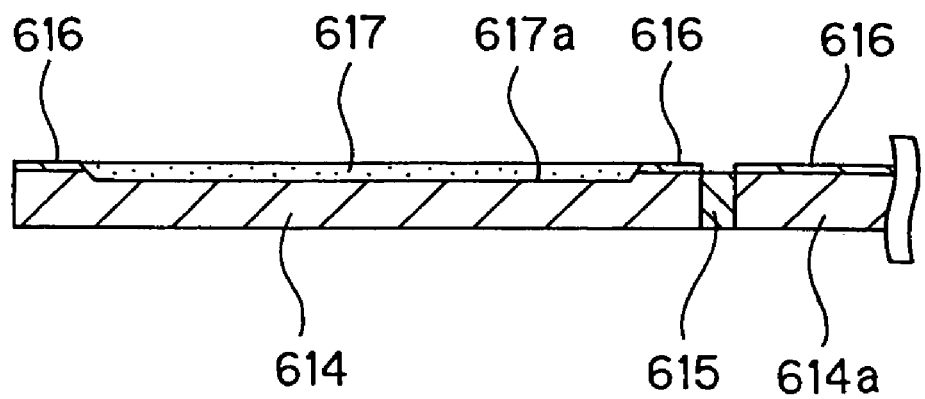
FIG. 49(B) is a schematic section of FIG. 49(A).

As depicted in FIGS. 49(A) and 49(B), the photo-resist technique is applied to mill an exposed trench-formation portion 617a, after which an $Al_2O_3$ insulating film 617 is provided to form a trench 617, followed by liftoff. Finally, CMP processing is applied for surface flattening.

(14) Formation of the Light Gap

Figure 50A:
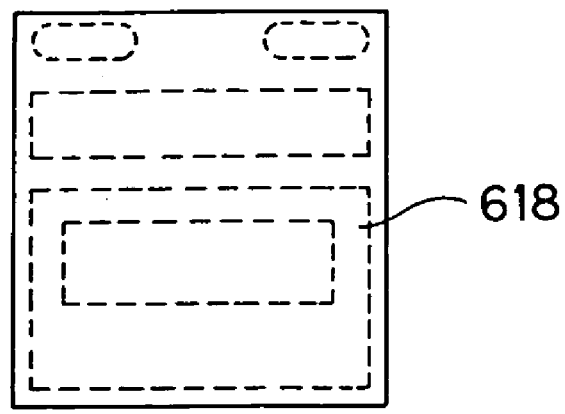
FIG. 50(A) is a plan view for illustrating the fabrication process for the structure of part of the thin-film magnetic head according to the invention.
Figure 50B:
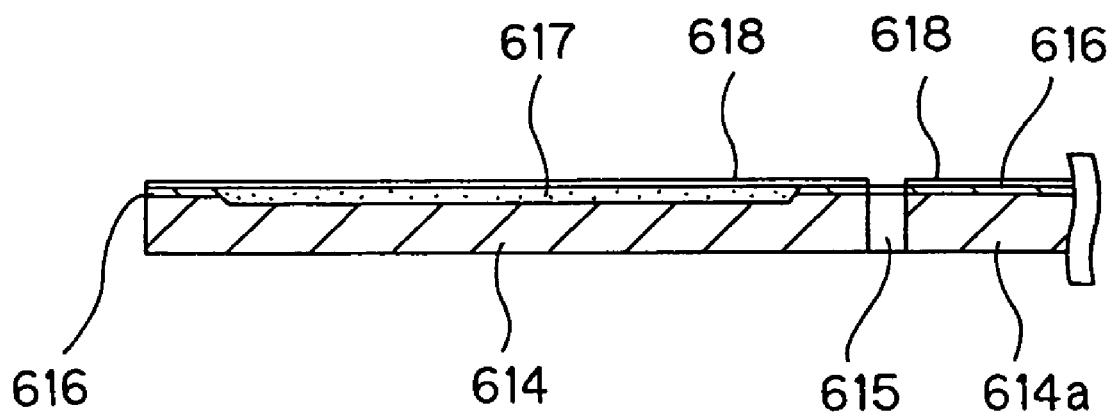
FIG. 50(B) is a schematic section of FIG. 50(A).

As depicted in FIGS. 50(A) and 50(B), a light gap film 618 formed typically of Ru is provided.

(15) Formation of the Back Gap

Figure 51A:
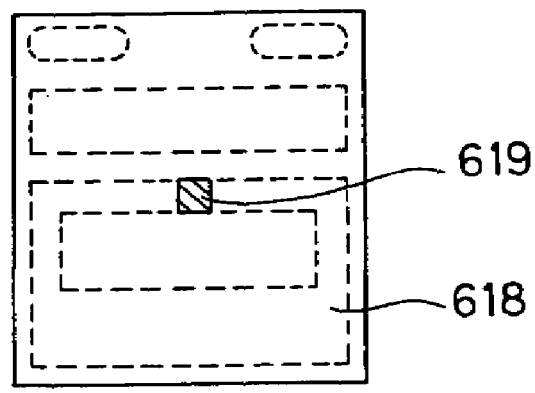
FIG. 51(A) is a plan view for illustrating the fabrication process for the structure of part of the thin-film magnetic head according to the invention.
Figure 51B:
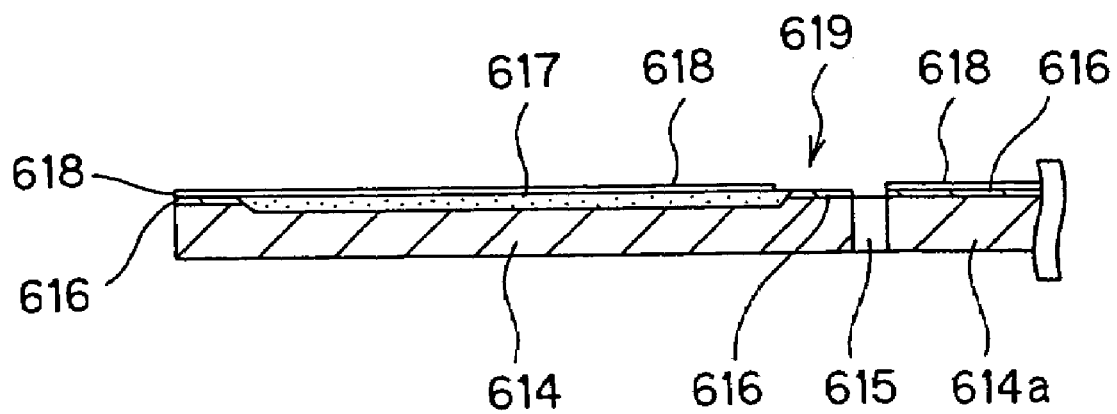

As depicted in FIGS. 51(A) and 51(B), the photo-resist technique is applied to mill an exposed back gap 619-formation portion, thereby forming a back gap 619. Finally, the resist is stripped off. The high-Bs material 616 is visible at the site with the exposed back gap 619 formed.

(16) Formation of the Pole

Figure 52A:
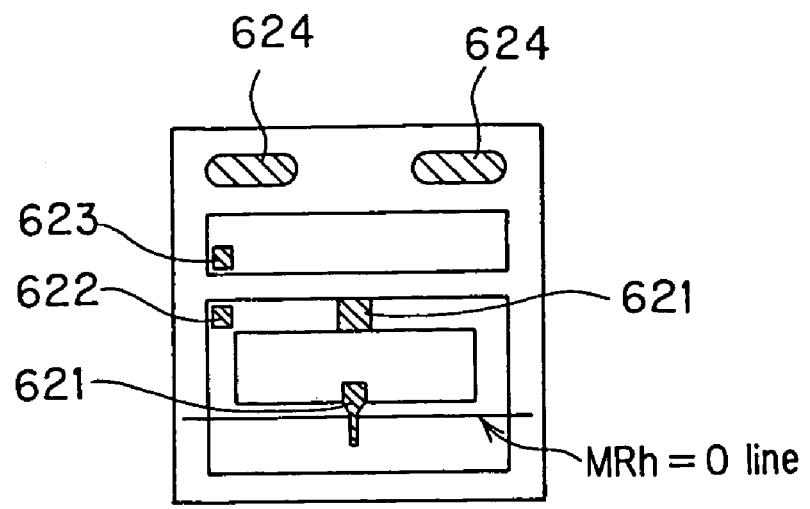
FIG. 52(A) is a plan view for illustrating the fabrication process for the structure of part of the thin-film magnetic head according to the invention.
Figure 52B:
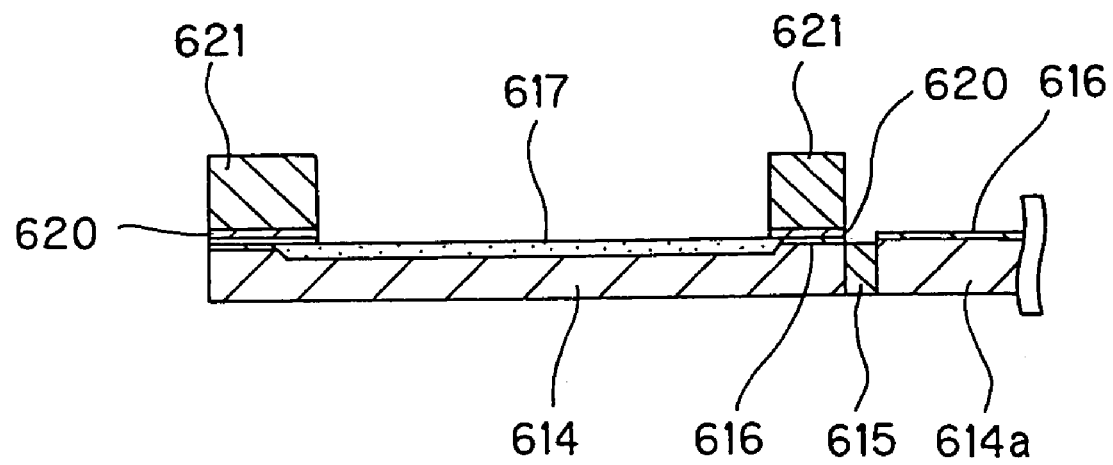
FIG. 52(B) is a schematic section of FIG. 52(A).

As depicted in FIGS. 52(A) and 52(B), a high-Bs material film 620 is formed as a pole underlay film 620, to which the photoresist technique is then applied in a given pattern. Then, a thick film 621 for the formation of a pole 621 is formed by plating, after which the resist is stripped off for cover photo purposes. Then, the pole, 621 is trimmed off, finally followed by stripping-off of the resist.

Simultaneously with the formation of the pole 621 at that pole-formation step, the first junction portion 622 is connected to the corner of the pole underlay film of the magnetic head; the second junction portion 623 to the corner of the pole underlay film of the heat sink portion; and a junction portion formed of the same material as the pole-formation member to a connection electrode portion 624, as depicted in FIG. 52(A).

(17) Formation of the Insulating Film and the First Layer Portion of the Coil

Figure 53A:
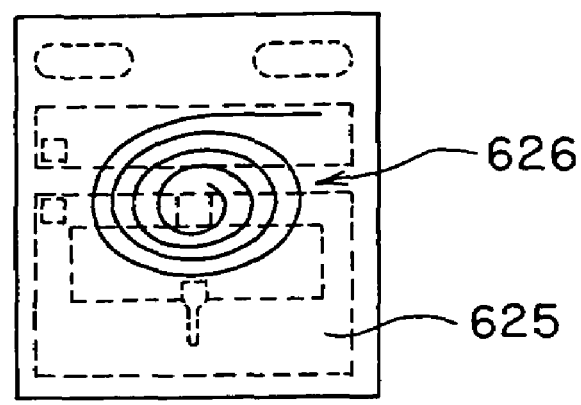
FIG. 53(A) is a plan view for illustrating the fabrication process for the structure of part of the thin-film magnetic head according to the invention.
Figure 53B:
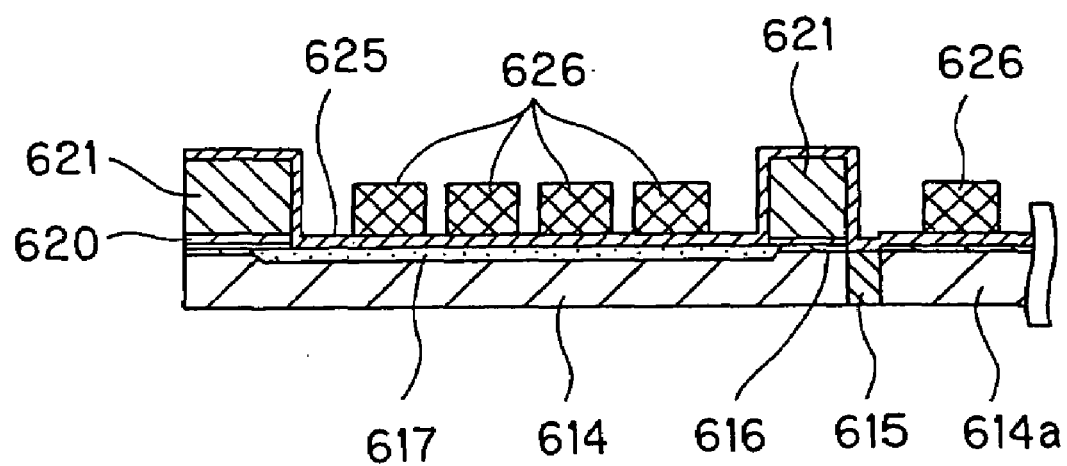
FIG. 53(B) is a schematic section of FIG. 53(A).

As depicted in FIGS. 53(A) and 53(B), an insulating film 625 is formed all over the surface including a pole 621, and the first layer portion of a coil is then formed by the photoresist technique. More specifically, after the formation of an underlay electrode film (plating undercoat film), not shown, a coil pattern is prepared with a photoresist, after which a thick film 626 in a coil pattern is formed by plating. After removal of the resist, an unnecessary portion of the underlay electrode film is finally milled off.

Figure 54A:
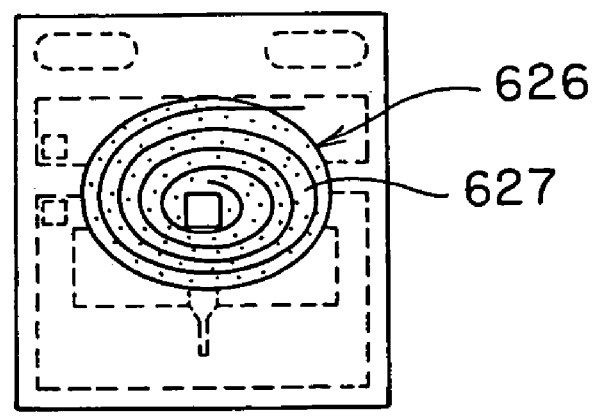
FIG. 54(A) is a plan view for illustrating the fabrication process for the structure of part of the thin-film magnetic head according to the invention.
Figure 54B:
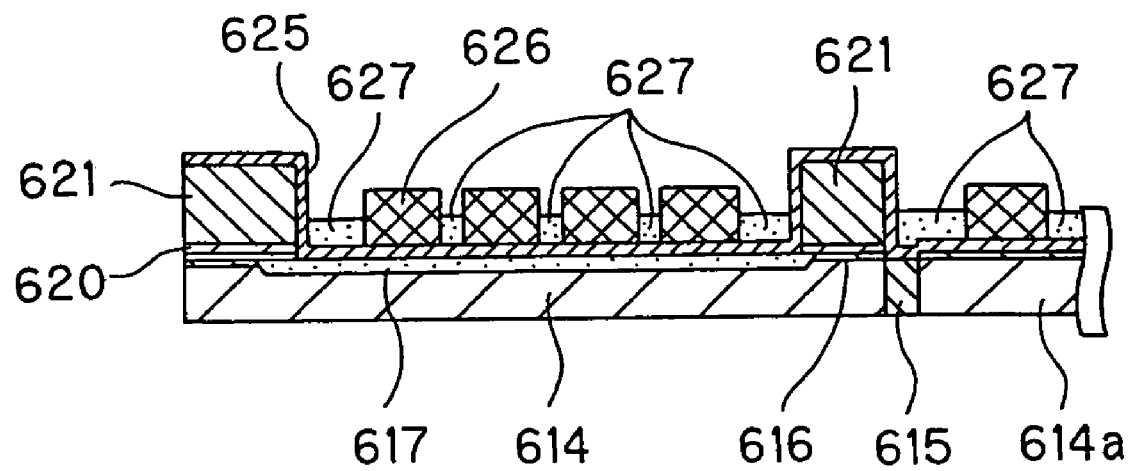
FIG. 54(B) is a schematic section of FIG. 54(A).

(18) Formation of the Interlayer Insulating Film of the First Layer Portion of the Coil As depicted in FIGS. 54(A) and 54(B), an interlayer insulating film 627 is formed between adjacent windings of the first layer 625 of the coil, followed by annealing.

(19) CMP Processing

Figure 55A:
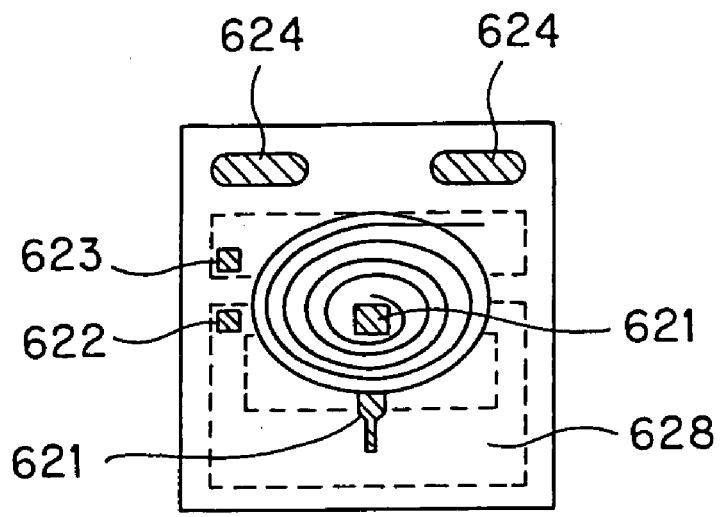
FIG. 55(A) is a plan view for illustrating the fabrication process for the structure of part of the thin-film magnetic head according to the invention.
Figure 55B:
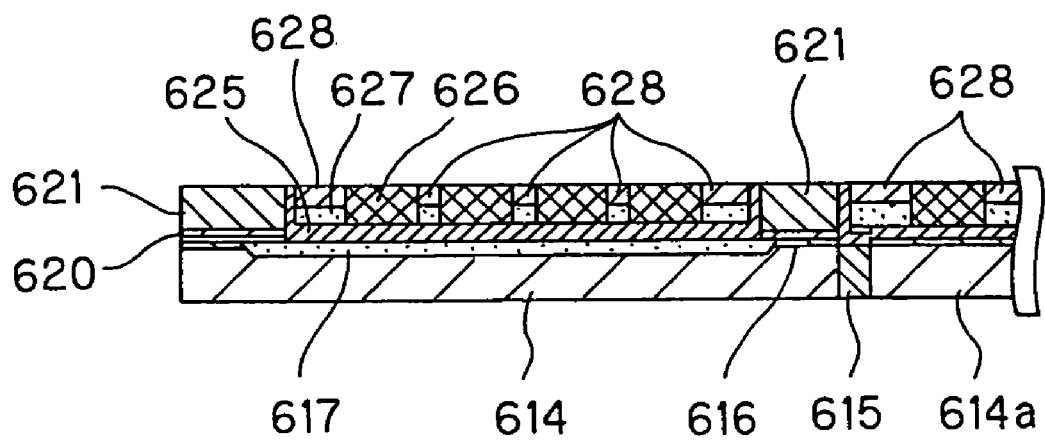
FIG. 55(B) is a schematic section of FIG. 55(A).

As depicted in FIGS. 55(A) and 55(B), after the formation of an $Al_2O_3$ insulating film 628 all over the surface, CMP processing is applied to trim down the surface for flattening, during which a pole 621, the first junction portion 622 of the pole underlay film at the corner of the pole underlay film of the magnetic head, the second junction portion 623 at the corner of the pole underlay film of the heat sink portion and a connection electrode portion 624 are exposed.

(20) Liftoff of the Insulating Film

Figure 56A:
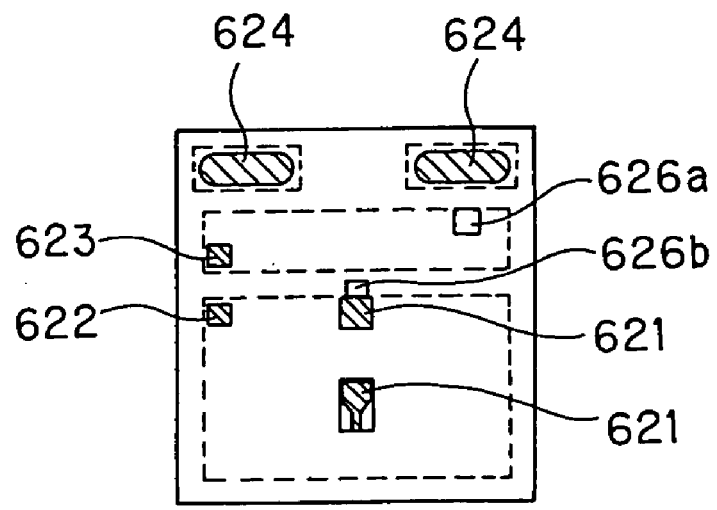
FIG. 56(A) is a plan view for illustrating the fabrication process for the structure of part of the thin-film magnetic head according to the invention.
Figure 56B:
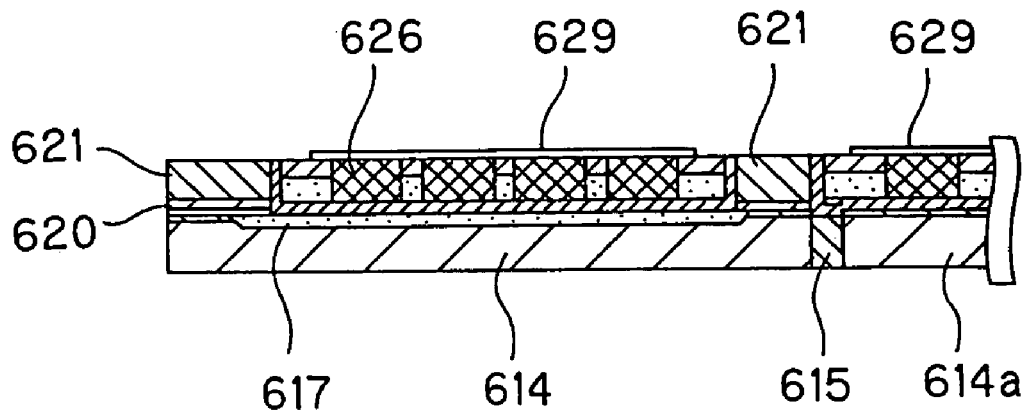
FIG. 56(B) is a schematic section of FIG. 56(A).

As depicted in FIGS. 56(A) and 56(B), an $Al_2O_3$ insulating film 629 is formed on the first layer portion 626 of the coil. To this end, a resist pattern is formed on a portion of that insulating film, from which the insulating film is to be removed, by the photoresist technique. After the formation of an $Al_2O_3$ film all over the surface, the liftoff technique is applied to form the $Al_2O_3$ insulating film on the first layer portion of the coil.

Notice that both ends 626*a* and 626*b* of the first layer portion 626 of the coil are exposed for connection to an external terminal and one end of the second layer portion of the coil that will be described later.

(21) Formation of the Second Layer Portion of the Coil

Figure 57A:
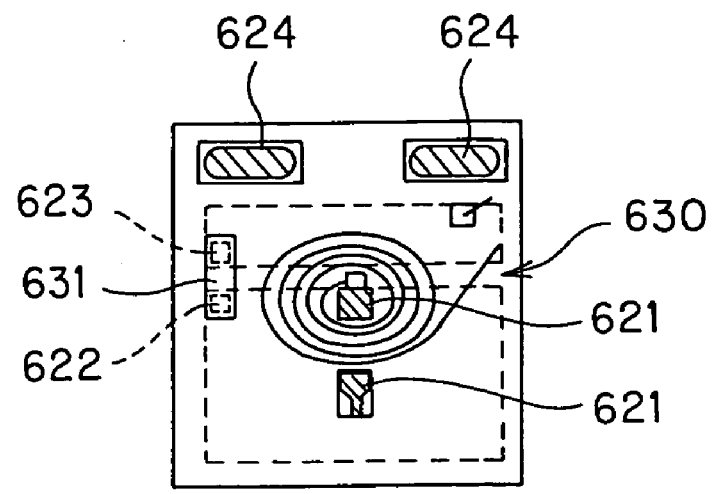
FIG. 57(A) is a plan view for illustrating the fabrication process for the structure of part of the thin-film magnetic head according to the invention.
Figure 57B:
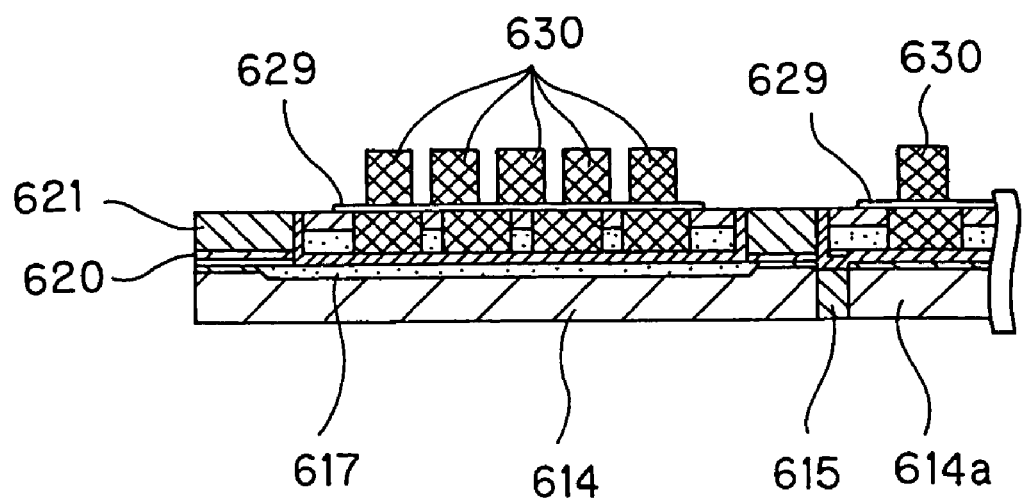
FIG. 57(B) is a schematic section of FIG. 57(A).

As depicted in FIGS. 57(A) and 57(B), the photo-resist technique is applied to form the second layer portion 630 of the coil on an insulating film 629. More specifically, after the formation of an underlay electrode film (plating undercoat film), not shown, a photoresist is used to prepare a coil pattern, after which a thick film 630 in a coil pattern is formed by plating, followed by stripping-off of the resist. Finally, an unnecessary portion of the underlay electrode film is milled off.

Of importance is that simultaneously with the formation of the coil pattern 630 at this step, the first junction portion 622 at the corner of the pole underlay film of the magnetic head and the second junction portion 623 at the corner of the pole underlay film of the heat sink portion are connected together by means of a connection bar 631 formed of the same material as the coil.

In other words, upon the formation of an upper magnetic pole layer 621 provided on a lower magnetic pole layer 614, connection sites for connecting the upper shield layer 612 and a heat sink layer 640 (614*a*) together are each formed. Then, these connection sites are connected together by means of the connection bar 631 formed of the same material as the coil-formation member, whereby the lower magnetic pole layer 621 and the substrate 602 are connected together via the heat sink layer 640, resulting in the achievement of the structure of part of the invention.

Figure 58A:
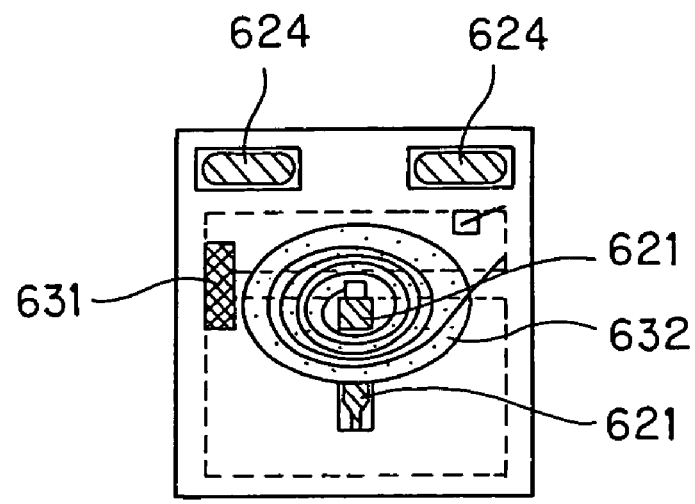
FIG. 58(A) is a plan view for illustrating the fabrication process for the structure of part of the thin-film magnetic head according to the invention.
Figure 58B:
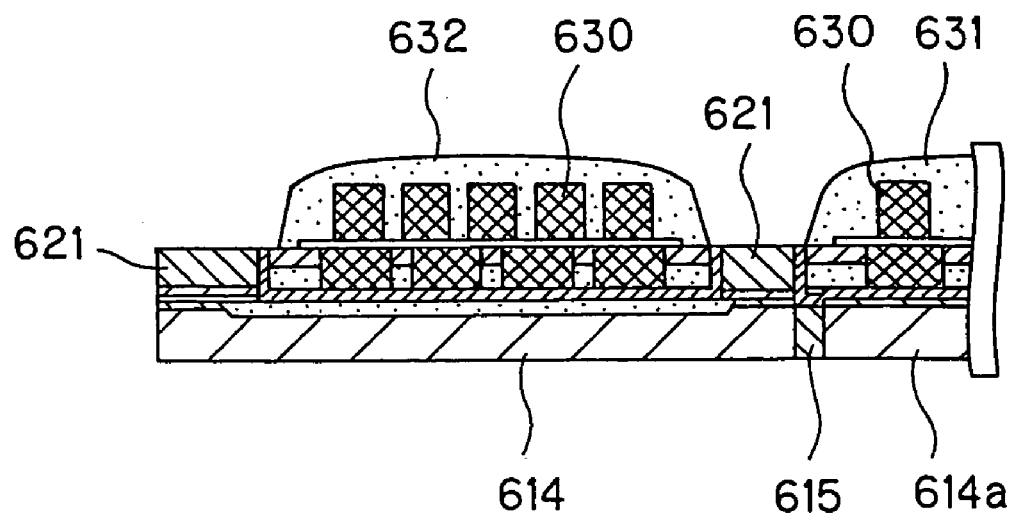
FIG. 58(B) is a schematic section of FIG. 58(A).

(22) Formation of the Interlayer Insulating Film of the Second Layer Portion of the Coil As depicted in FIGS. 58(A) and 58(B), an interlayer insulating film 632 is formed between adjacent windings of, and on, the second layer portion 630 of the coil, followed by annealing.

(23) Formation of the Yoke

Figure 59A:
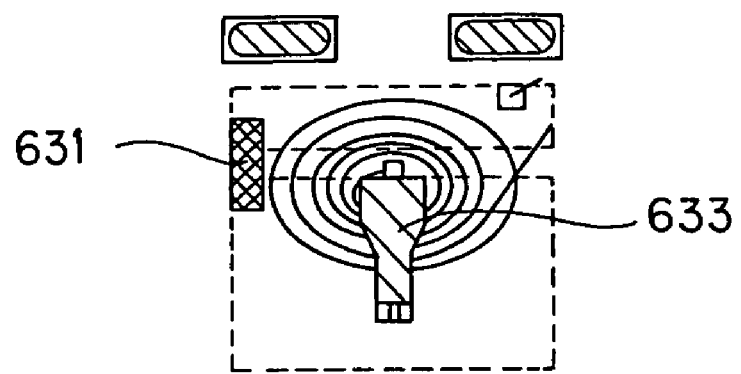
FIG. 59(A) is a plan view for illustrating the fabrication process for the structure of part of the thin-film magnetic head according to the invention.
Figure 59B:
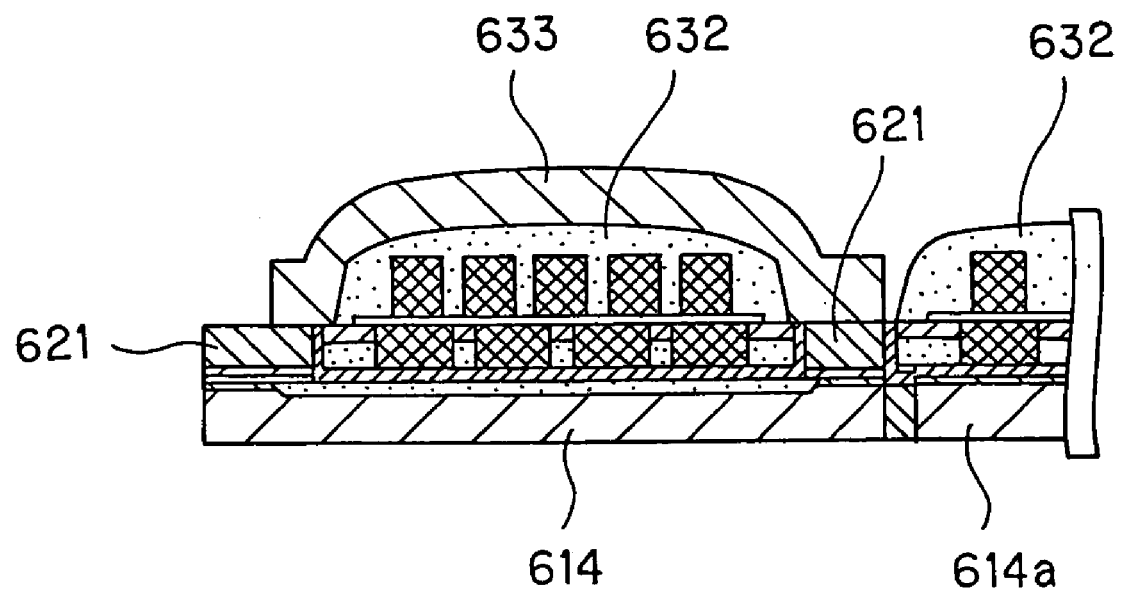
FIG. 59(B) is a schematic section of FIG. 59(A).

As depicted in FIGS. 59(A) and 59(B), a yoke 633 is formed on an interlayer insulating film 632 for connection with a pole 621. More specifically, after the formation of an underlay electrode film (plating undercoat film), not shown, a photoresist is used to prepare a yoke pattern, after which a thick film 633 in that yoke pattern is formed by plating. After the stripping-off of the resist, an unnecessary portion of the underlay electrode film is finally milled off.

After that, a leader electrode will be formed, although not explained.

Explanation of the Head Gimbal Assembly and the Hard Disk System

Embodiments of the head gimbal assembly and the hard disk system according to the invention are now explained.

First of all, a slider 810 built in the head gimbal assembly is explained with reference to FIG. 32. In the hard disk system, the slider 810 is located in opposition to a hard disk that is a disk form of rotationally driven recording medium. The slider 810 is composed primarily of a substrate 602 of FIG. 28 and a base member 811 having an overcoat layer 677.

The base member 811 is substantially in a hexahedral shape. One surface of the six surfaces of the base member 811 is in opposition to the hard disk. That one surface is provided with an ABS.

Figure 32:
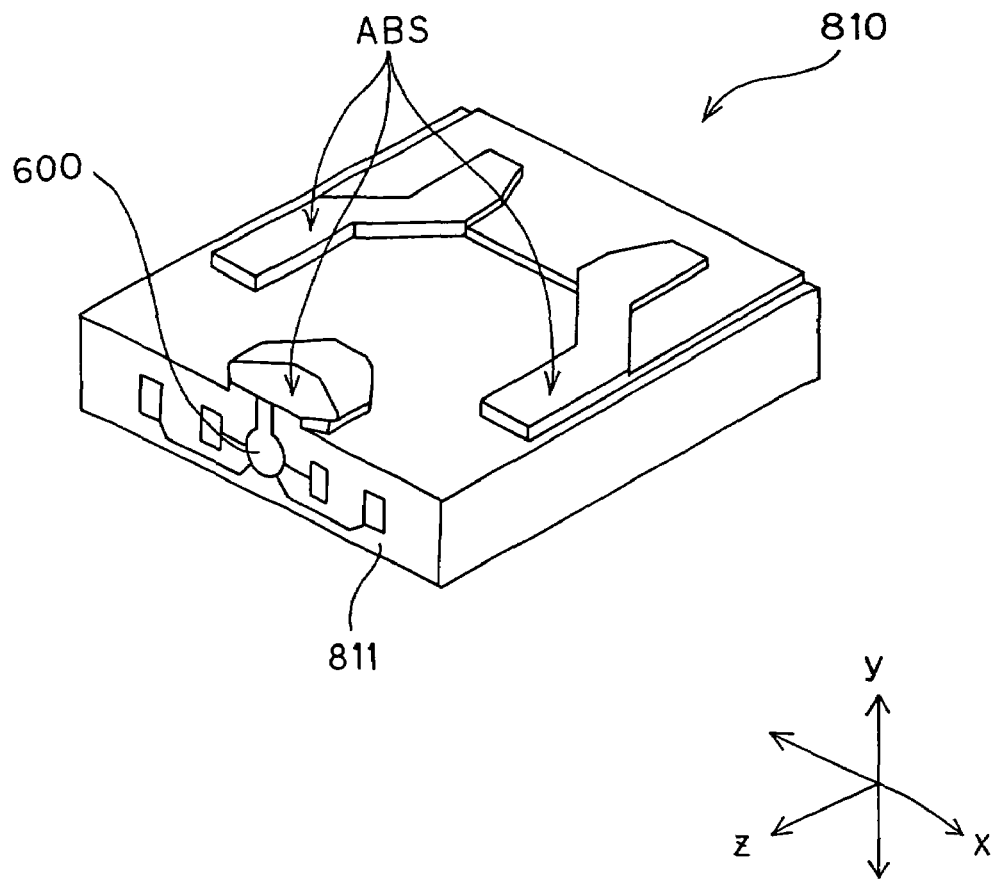
FIG. 32 is illustrative in perspective of a slider included in a head gimbal assembly according to one embodiment of the invention.

As the hard disk rotates in the z-direction in FIG. 32, it allows the slider 810 to receive downward lift in the y-direction from an air flow passing between the hard disk and the slider 810. By this lift, the slider 810 is levitated from the surface of the hard disk. Notice that the x-direction in FIG. 32 traverses the track on the hard disk.

A thin-film magnetic head 600 according to this embodiment is formed near the air exit end of the slider 810 (the left-lower end in FIG. 32).

The head gimbal assembly 820 according to this embodiment is now explained with reference to FIG. 33. The head gimbal assembly 820 comprises a slider 810, and a suspension 821 for resiliently supporting the slider 810. The suspension 821 comprises a leaf spring form of rod beam 822 formed typically of stainless steel, a flexure 823 which is provided at one end of the rod beam 822 and to which the slider 810 is joined to give a suitable degree of flexibility to it, and a base plate 824 provided at the other end of the rod beam 822.

The base plate 824 is to be attached to the arm 830 of an actuator for moving the slider 810 in the direction x that traverses the track on the hard disk 862. The actuator comprises the arm 830 and a voice coil motor for driving the arm 830. A portion of the flexure 823, to which the slider 810 is to be attached, is provided with a gimbal portion for keeping the attitude of the slider 810 constant.

The head gimbal assembly 820 is mounted to the arm 830 of the actuator. The head gimbal assembly 820 attached to one arm 830 is called a head arm assembly, and a stack with the head gimbal assembly 820 attached to each arm of a carriage having a plurality of arms is called a head stack assembly.

Figure 33:
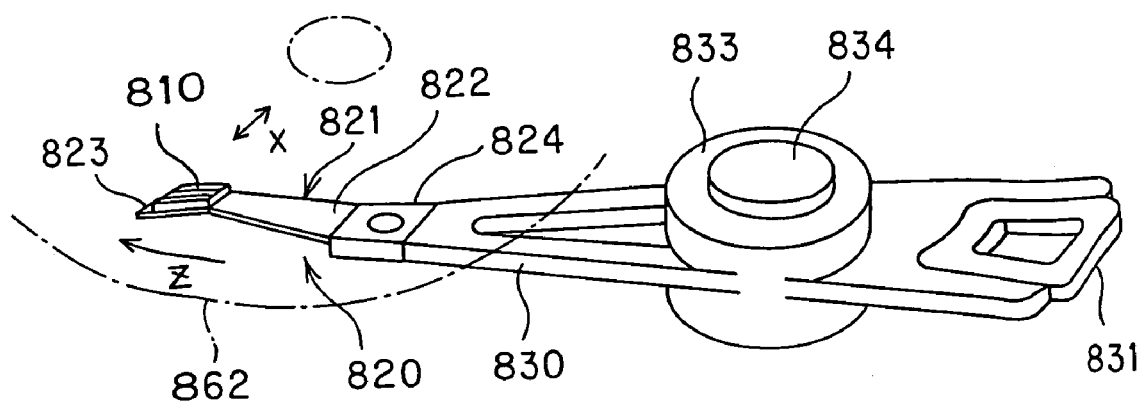
FIG. 33 is illustrative in perspective of a head arm assembly including a head gimbal assembly according to one embodiment of the invention.

FIG. 33 shows one exemplary head arm assembly, wherein a head gimbal assembly 820 is mounted to one end of an arm 830, and a coil 831 that becomes a part of a voice coil motor is attached to the other end of the arm 830. At an intermediate portion of the arm 830, there is located a bearing portion 833 attached to a shaft 834 for pivotally supporting the arm 830.

One exemplary head stack assembly and the hard disk system according to this embodiment are now explained with reference to FIGS. 34 and 35.

Figure 34:
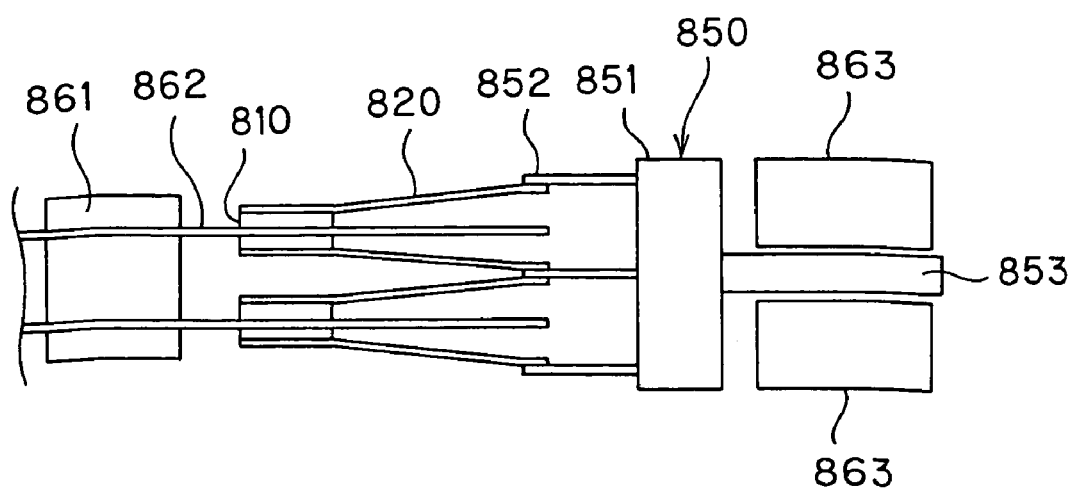
FIG. 34 is a plan view of part of a hard disk system according to one embodiment of the invention.
Figure 35:
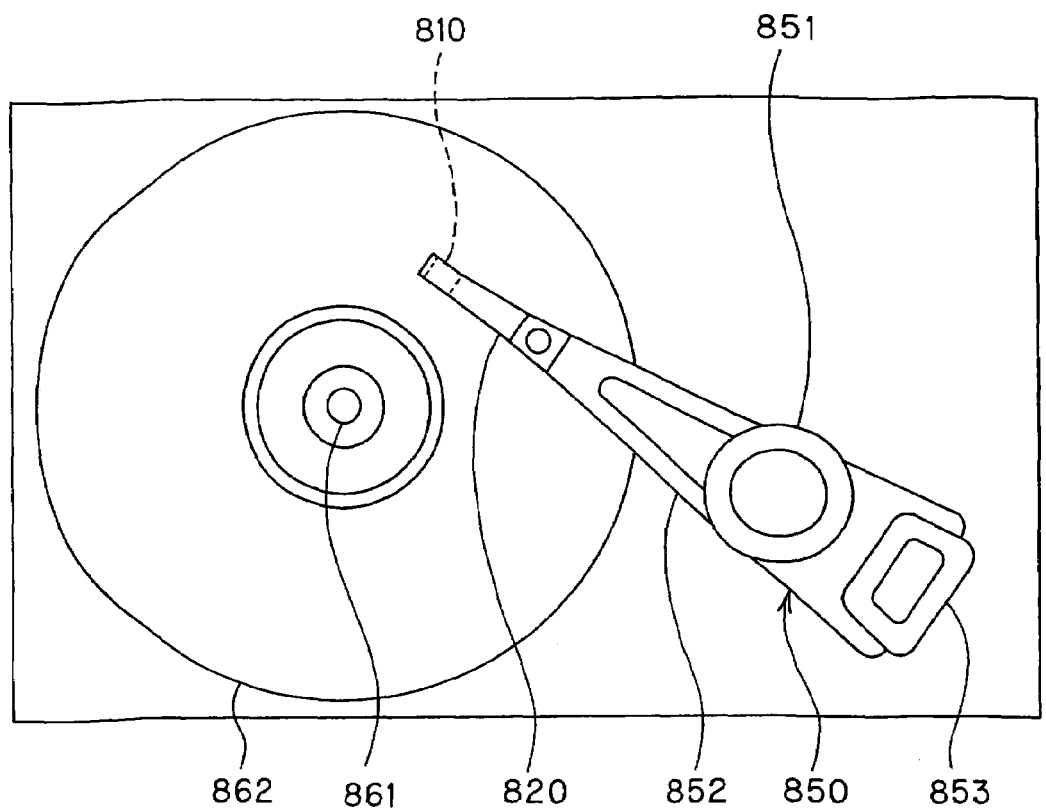
FIG. 35 is a plan view of a hard disk system according to one embodiment of the invention.

FIG. 34 is illustrative of part of the hard disk system, and FIG. 35 is a plan view of the hard disk system.

A head stack assembly 850 comprises a carriage 851 having a plurality of arms 852. The plurality of arms 852 are provided with a plurality of head gimbal assemblies in a mutually spaced, vertical alignment. On the side of the carriage 851 opposite to the arms 852, there is mounted a coil 853 that becomes a part of a voice coil motor. The head stack assembly 850 is built in the hard disk system.

The hard disk system comprises a plurality of hard disks 862 attached to a spindle motor 861. Two sliders 810 are located for each hard disk 861 in such a way as to oppose each other with the hard disk 862 positioned between them. The voice coil motor includes a permanent magnet 863 located at an opposite position with the coil 853 of the head stack assembly 850 interposed.

The head stack assembly 850 except the sliders 810 and the actuator correspond to a positioning device in the invention for supporting the sliders 810 and positioning them with respect to the hard disk 862.

With the hard disk system according to this embodiment, the actuator causes the slider 810 to move in the direction that traverses the track on the hard disk 862, thereby positioning the slider 810 with respect to the hard disk 862. The thin-film magnetic head built in the slider 810 allows a recording head device to record information on the hard disk 862 and a reproducing head device to reproduce the information recorded on the hard disk 862.

The head gimbal assembly and the hard disk system according to this embodiment have the same advantages as do the thin-film magnetic head according to the already stated embodiments.

EXAMPLES

The construction of the thin-film magnetic head according to the second group of the invention is now in further details with reference to one specific experimental example.

Experimental Example 1

Figure 30:
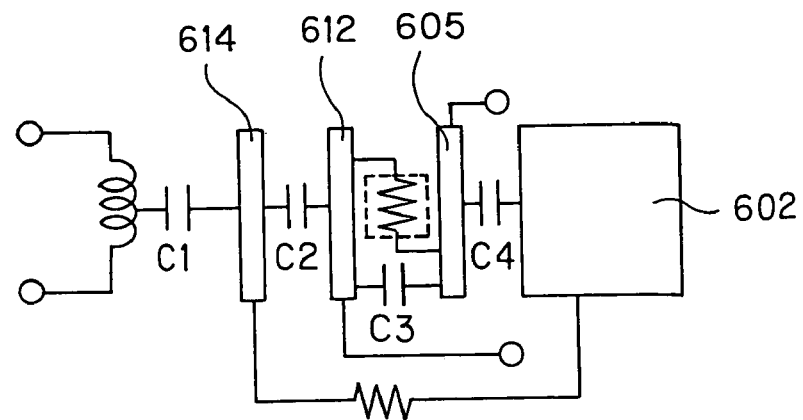
FIG. 30 is a phenomenal model illustration for explaining the advantage of, and the requirement for, the invention.

An experimental thin-film magnetic head sample shown in FIGS. 28 and 30 was prepared according to the following sample specifications.

In the order described below, AlTiC was formed as a substrate 602; $Al_2O_3$ as an underlay layer (with a varying thickness of 0.05 to 1.0 μm for experimentation shown in FIG. 31); a 2.0 μm thick permalloy as a lower shield layer; a 5 nm thick alumina as a lead gap layer; a 23 nm thick CoCrPt as a TMR device (for details of the layer arrangement, see below) and a hard magnetic layer (bias layer); a 5 nm thick alumina as a lead gap layer; a 1.9 μm thick permalloy as an upper shield layer; a 0.2 μm thick alumina as a separate shield gap layer; 1.9 μm thick permalloy as a lower magnetic pole layer; and a 0.1 μm thick alumina as a light gap film.

In addition, the upper magnetic layer (pole layer) was formed of CoFeNi such that the upper pole portion that was the distal end of the upper magnetic layer had a height of 1.2 μm and a width of 0.18 μm. An overcoat was formed of alumina in such a way as to have a total thickness of 30 μm.

The TMR device was formed with the following layer arrangement.

That is, a 7 nm thick Ir—Mn layer was formed as an antiferromagnetic layer; a 4 nm thick Co—Fe layer as a ferromagnetic layer (pinned layer); and an Al oxide film as a tunnel barrier layer. The ferromagnetic layer (free layer) was a multilayer film composed of, in order from the tunnel barrier layer side, a 4 nm thick Co—Fe layer and a 2 nm thick Ni—Fe layer.

In such an experimental thin-film magnetic head sample, a heat sink layer for letting heat generated in the head escape toward the substrate side was formed in the rear of the lower shield layer, upper shield layer and lower magnetic pole layer (in the opposite direction to the ABS that was a recoding/reproducing side surface) according to the scheme shown in the step-by-step process views of FIGS. 37-59. This heat sink layer was substantially connected by the connection bar to the lower magnetic pole layer for the write magnetic head, and the lower magnetic pole layer and the substrate were substantially connected together via the heat sink layer.

With the application of such an experimental thin-film magnetic head sample to the phenomenal model representation of FIG. 30, various thin-film magnetic head samples with an underlay film of varying thickness on the substrate and C2/C4=3.0, C2/C4=2.0, C2/C4=1.0 and C2/C4=0.66 were prepared to find what influences those parameters had on frequency versus noise relations.

Figure 31:
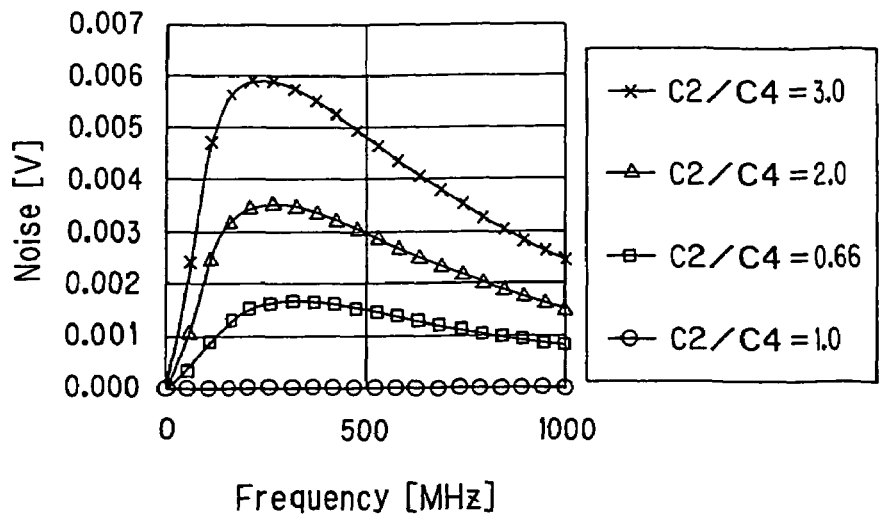
FIG. 31 is a graphical illustration that shows what influences the parameters of C2/C4=3.0, C2/C4=2.0, C2/C4=1.0 and C2/C4=0.66 have on frequency versus noise relations.

The results were plotted in the graph of FIG. 31.

From the results of FIG. 31, the advantages of the invention could be appreciated.

Those results show that it is preferable that the heat sink layer for letting heat generated in the head escape toward the substrate side is formed in the rear of the lower shield layer, upper shield layer and lower magnetic pole layer (in the opposite direction to the ABS that is a recoding/reproducing side surface), wherein the heat sink layer is substantially connected by the connection bar to the lower magnetic pole layer for the write magnetic head device and the lower magnetic pole layer and the substrate are substantially connected together via the heat sink layer, and that C2 and C4 are substantially equal to each other.

What is claimed is:

1. A thin-film magnetic head comprising a slider substrate, a reproducing device and a recording device, wherein:
    said slider substrate is of electric conductivity, and has a first insulating layer at one end face,
    said reproducing device comprises a first shield layer, a second insulating layer, a second shield layer and a magneto resistive effect device wherein said first shield layer, said second insulating layer and said second shield layer are adjacent to one another in this order on said first insulating layer,
    said magneto resistive effect device is interposed between said first shield layer and said second shield layer, and buried therearound with said second insulating layer, with said first shield layer and said second shield layer as electrode layers,
    said recording device has a coil and a magnetic circuit,
    said coil is insulated and supported,
    said magnetic circuit is to guide a magnetic flux occurring by a current passing through said coil, and has a magnetic layer opposite to said second shield layer via a third insulating layer,
    a parasitic capacity occurring with said first insulating layer as a capacity layer between said slider substrate and said first shield layer remains substantially equal to a parasitic capacity occurring with said third insulating layer as a capacity layer between said magnetic layer and said second shield layer, and
    said magnetic layer and said slider substrate are connected together by a resistance.

2. A thin-film magnetic head as recited in claim 1, wherein said resistance has a resistance value of 100 Ω or lower.

3. A thin-film magnetic head as recited in claim 1, wherein said magneto resistive effect device is of a structure wherein a sense current is passed in a perpendicular direction to film plane.

4. A thin-film magnetic head as recited in claim 1, wherein said magnetic layer and said slider substrate are connected together by a resistance layer extending through an insulating layer.

5. A thin-film magnetic head as recited in claim 1, wherein said recording device is a perpendicular recording device.

6. A thin-film magnetic head as recited in claim 1, wherein C2 and C4 have a substantially identical value, provided that C4 is a parasitic capacity occurring between said slider substrate and said first shield layer, and C2 is a parasitic capacity occurring between said magnetic layer and said second shield layer by making a connection between said magnetic layer and said slider substrate.

7. A thin-film magnetic head as recited in claim 1, wherein a value of C2/C4 that is a C2/C4 ratio ranges from 0.6 to 1.4 inclusive, provided that C4 is a parasitic capacity occurring between said slider substrate and said first shield layer, and C2 is a parasitic capacity occurring between said magnetic layer and said second shield layer by making a connection between said magnetic layer and said slider substrate.

8. A head gimbal assembly comprising a thin-film magnetic head and a suspension, wherein:
   said suspension supports said thin-film magnetic head, and
   said thin-film magnetic head comprises a slider substrate, a reproducing device and a recording device, wherein:
   said slider substrate is of electric conductivity, and has a first insulating layer at one end face,
   said reproducing device comprises a first shield layer, a second insulating layer, a second shield layer and a magneto resistive effect device wherein said first shield layer, said second insulating layer and said second shield layer are adjacent to one another in this order on said first insulating layer,
   said magneto resistive effect device is interposed between said first shield layer and said second shield layer, and buried therearound with said second insulating layer, with said first shield layer and said second shield layer as an electrode layer,
   said recording device has a coil and a magnetic circuit,
   said coil is insulated and supported,
   said magnetic circuit is to guide a magnetic flux occurring by a current passing through said coil, and has a magnetic layer opposite to said second shield layer via a third insulating layer,
   a parasitic capacity occurring with said first insulating layer as a capacity layer between said slider substrate and said first shield layer remains substantially equal to a parasitic capacity occurring with said third insulating layer as a capacity layer between said magnetic layer and said second shield layer, and
   said magnetic layer and said slider substrate are connected together by a resistance.

9. A hard disk comprising a head gimbal assembly and a magnetic disk, wherein:
   said magnetic disk cooperates with said head gimbal assembly for recording and reproduction of magnetic recordings, and
   said head gimbal assembly comprises a thin-film magnetic head and a suspension, wherein:
   said suspension supports said thin-film magnetic head, and
   said thin-film magnetic head comprises a slider substrate, a reproducing device and a recording device, wherein:
   said slider substrate is of electrical conductivity, and has a first insulating layer at one end face,
   said reproducing device comprises a first shield layer, a second insulating layer, a second shield layer and a magneto resistive effect device wherein said first shield layer, said second insulating layer and said second shield layer are adjacent to one another in this order on said first insulating layer,
   said magneto resistive effect device is interposed between said first shield layer and said second shield layer, and buried therearound with said second insulating layer, with said first shield layer and said second shield layer as an electrode layer,
   said recording device has a coil and a magnetic circuit,
   said coil is insulated and supported,
   said magnetic circuit is to guide a magnetic flux occurring by a current passing through said coil, and has a magnetic layer opposite to said second shield layer via a third insulating layer,
   a parasitic capacity occurring with said first insulating layer as a capacity layer between said slider substrate and said first shield layer remains substantially equal to a parasitic capacity occurring with said third insulating layer as a capacity layer between said magnetic layer and said second shield layer, and
   said magnetic layer and said slider substrate are connected together by a resistance.

* * * * *